United States Patent
Neff

(10) Patent No.: US 10,197,190 B1
(45) Date of Patent: Feb. 5, 2019

(54) BI-DIRECTIONAL CABLE GUARD

(71) Applicant: Scott E. Neff, Broken Arrow, OK (US)

(72) Inventor: Scott E. Neff, Broken Arrow, OK (US)

( * ) Notice: Subject to any disclaimer, the term of this patent is extended or adjusted under 35 U.S.C. 154(b) by 0 days.

(21) Appl. No.: 16/014,771

(22) Filed: Jun. 21, 2018

(51) Int. Cl.
*F16L 3/10* (2006.01)
*H02G 3/04* (2006.01)

(52) U.S. Cl.
CPC .......... *F16L 3/1075* (2013.01); *H02G 3/0418* (2013.01); *H02G 3/0456* (2013.01)

(58) Field of Classification Search
CPC .... H02G 3/0418; H02G 3/0456; F16L 3/1075
See application file for complete search history.

(56) References Cited

U.S. PATENT DOCUMENTS

| | | | |
|---|---|---|---|
| 2,836,447 A | | 5/1958 | Wright |
| 4,603,737 A | | 8/1986 | Spikes |
| 4,615,543 A | | 10/1986 | Cannon |
| D317,298 S | * | 6/1991 | Schmidt ........................ D13/154 |
| 5,379,836 A | | 1/1995 | Jordan |
| D369,589 S | * | 5/1996 | Neff ............................ D13/154 |
| 6,023,027 A | * | 2/2000 | Neff .................... E21B 17/1035 138/110 |
| 6,571,046 B1 | | 5/2003 | Hickey |
| 6,588,714 B2 | | 7/2003 | Blane |
| 6,929,065 B2 | | 8/2005 | Cannon |
| 7,237,607 B2 | | 7/2007 | Angman |
| 8,251,153 B1 | | 8/2012 | Long et al. |
| 8,875,792 B2 | * | 11/2014 | Whitelaw ........... E21B 17/1035 166/345 |
| 8,899,088 B1 | | 12/2014 | Hazen |

(Continued)

OTHER PUBLICATIONS

Downhole Products, Grippy Cable Protector [online], [retrieved Jan. 20, 2017], retrieved from the internet, <URL: http://www.downhole.org/grippy-cable.php>, pp. 1-2 showing Grippy Protector with Flat Channel and Round Channel and taper pin.

(Continued)

*Primary Examiner* — Timothy Thompson
*Assistant Examiner* — Amol Patel
(74) *Attorney, Agent, or Firm* — The Overton Law Firm, P.C.; Tommy D. Overton, Jr.

(57) ABSTRACT

A cable guard (20) for enclosing and protecting at least one cable (34) extending alongside a tube (28) comprising, a base (22), a ring (24), and a u-bolt (124), the base (22) has hinge receivers (72 and 74) to receive hinge pins (106 and 108) for rotatably and removably connecting base (22) and ring (24), and the ring (24) includes u-bolt receivers (70 and 71) for rotatably and removably connecting u-bolt (124) and ring (22), the ring (22) includes ring rotational stops (200 and 202) to prevent over rotation and uncontrollable detachment of the base (22) and ring (24); the base (22) includes u-bolt slots (116 and 118) and the ring (24) includes u-bolt leg receivers (144 and 146) for cooperating with the u-bolt slots (116 and 118) and receiving the u-bolt legs (140 and 142) in the base (24), whereby the cable guard (20) is assembled, at least one cable (34) is enclosed, the cable guard (20) is mounted, and the u-bolt (124) is tensioned by tightening the nuts (148 and 150) and as tension increases along with respective reactive forces the cable guard (20) is frictionally engaged to tube (28).

35 Claims, 71 Drawing Sheets

(56) References Cited

U.S. PATENT DOCUMENTS 9,512,685 B2* 12/2016 Nguy .................. E21B 17/1035
2015/0083462 A1 3/2015 Yoshida et al.

OTHER PUBLICATIONS

Sunry Petroleum Equipment Co. Ltd., Control Line Protectors—Clamps [online], [retrieved Jan. 20, 2017], retrieved from the internet, <URL: http://www.sunrypetro.com/protector.html>, pp. 3-4 describing applications as stamped or cast configured for flat, round, or square cables and showing assembled and mounted Control Line Protectors.

Haliburton, Control Line Clamps and Protectors [online], [retrieved Jan. 20, 2017], retrieved from the internet, <URL: http://www.haliburton.com>, p. 1 describing Taperlock Clamps, Anchor Ring Clamps, and Control Line Protectors and showing Control Line Protector and Control Line Clamp.

Forum Energy Technologies, Control Line Clamps and Protectors [online], [retrieved Jan. 20, 2017], retrieved from the internet, <URL: http://www.f-e-t.com/products/completions/protection-systems/>, p. 1-2 including videos for overview and manufacturing and listing links for Installation Kits. Cross Coupling Protector, and other protectors.

S.U.N. Engineering, Inc. Cable Protector model No. 2875_23-pound and Protectolizer Model 3525_protectolizer dated Jan. 30, 2017, pp. 1-2 showing a Cable Protector and Protectolizer, published by S.U.N. Engineering, Inc., Tulsa, Oklahoma.

S.U.N. Engineering, Inc. Cable Protector model No. 3500-eubl-b32tn dated Jun. 2, 2017, p. 1 showing a base for a Cable Protector, published by S.U.N. Engineering. Inc., Tulsa, Oklahoma.

S.U.N. Engineering, Inc. Cable Protector model No. 2875-eu1f-r23 fairfield dated Apr. 18, 2018, p. 1 showing a base for a Cable Protector, published by S.U.N. Engineering, Inc., Tulsa, Oklahoma.

S.U.N. Engineering, Inc. Cable Protector dated Feb. 1, 2018, p. 1-2 showing a base and ring for a cable protector made of an acrylic, published by S.U.N. Engineering, Inc., Tulsa, Oklahoma.

S.U.N. Engineering, Inc. Cable Protector model No. 3500-eulf-rtn protector dated Jun. 2, 2017, p. 1 showing ring for a Cable Protector corresponding generally to bases shown in non-patent literature Nos. 6 and 7, published by S.U.N. Engineering, Inc., Tulsa, Oklahoma.

S.U.N. Engineering, Inc. Cable Protector model No. 2875-eu4f-b23 protector dated Jun. 2, 2017, p. 1 showing a base for a Cable Protector, published by S.U.N. Engineering, Inc., Tulsa, Oklahoma.

* cited by examiner

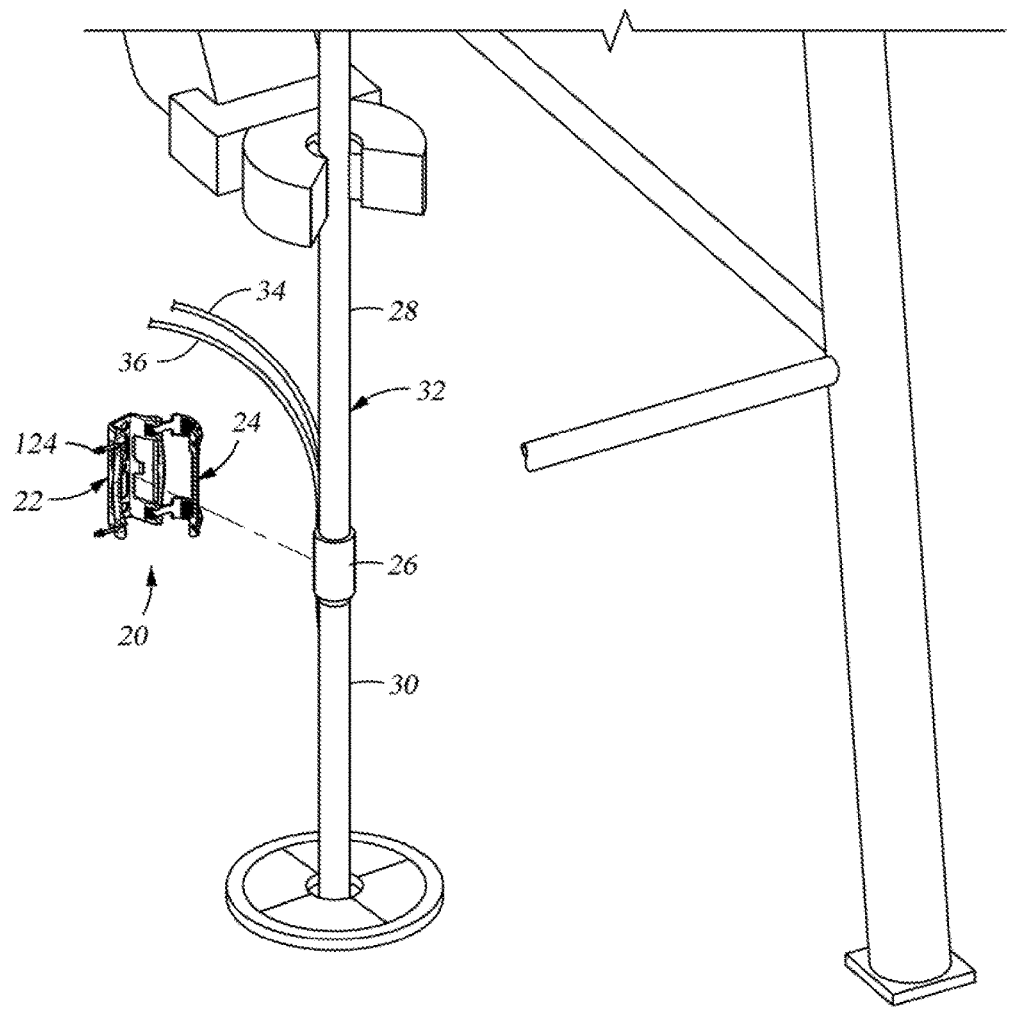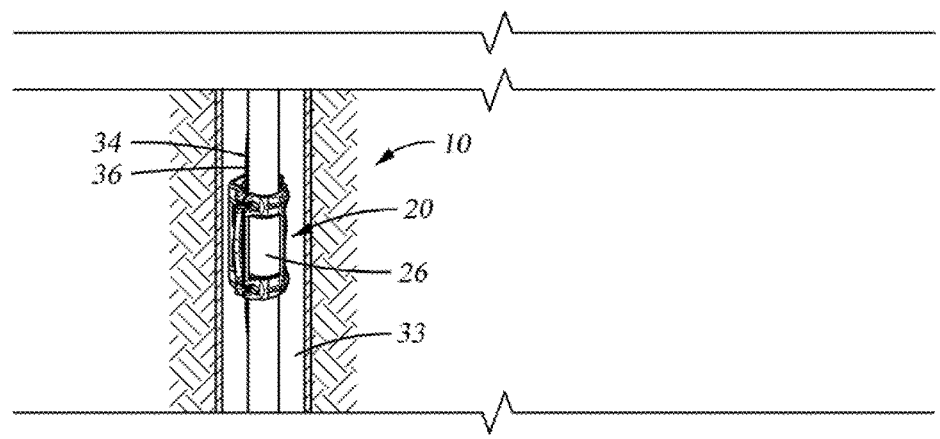
Fig. 1

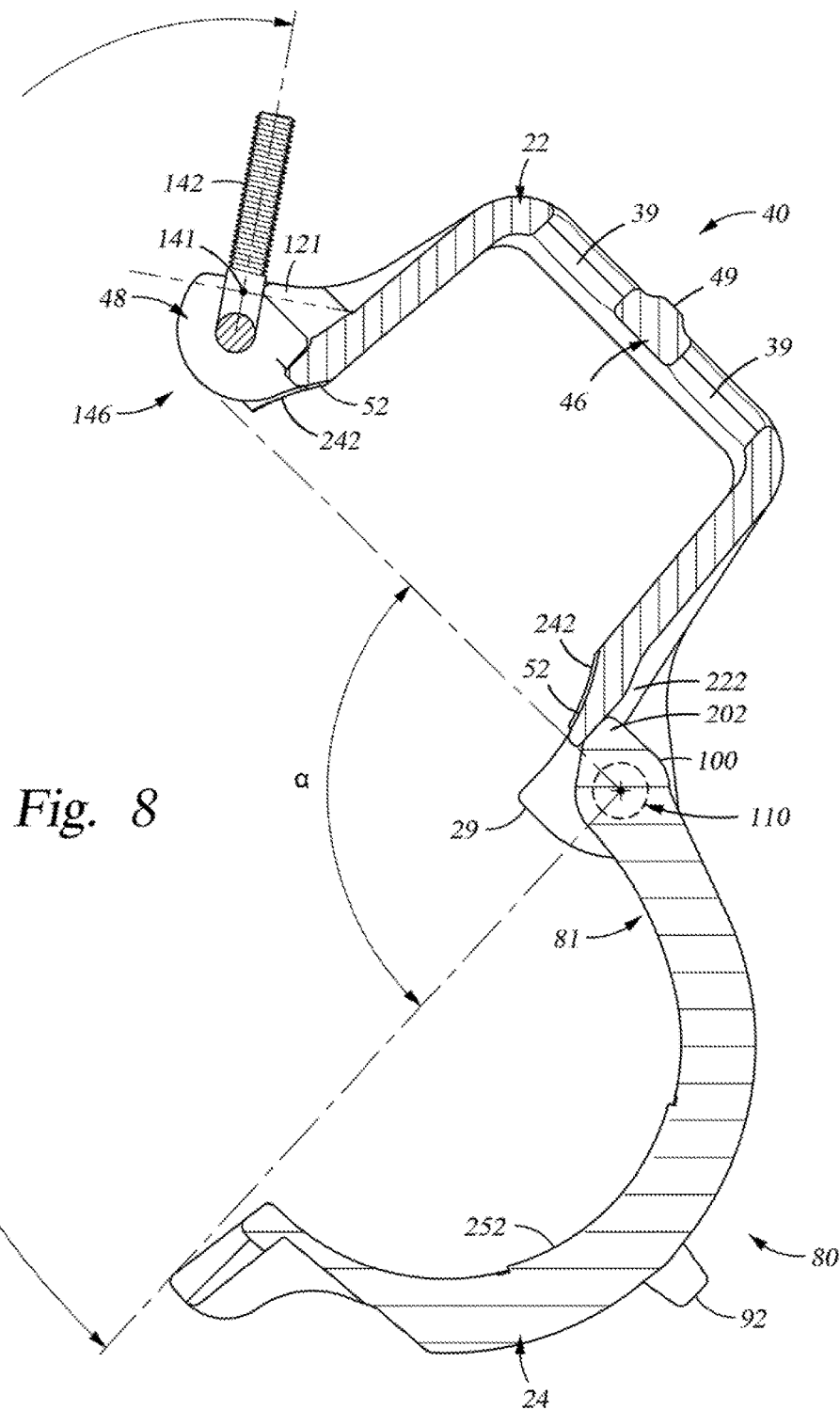

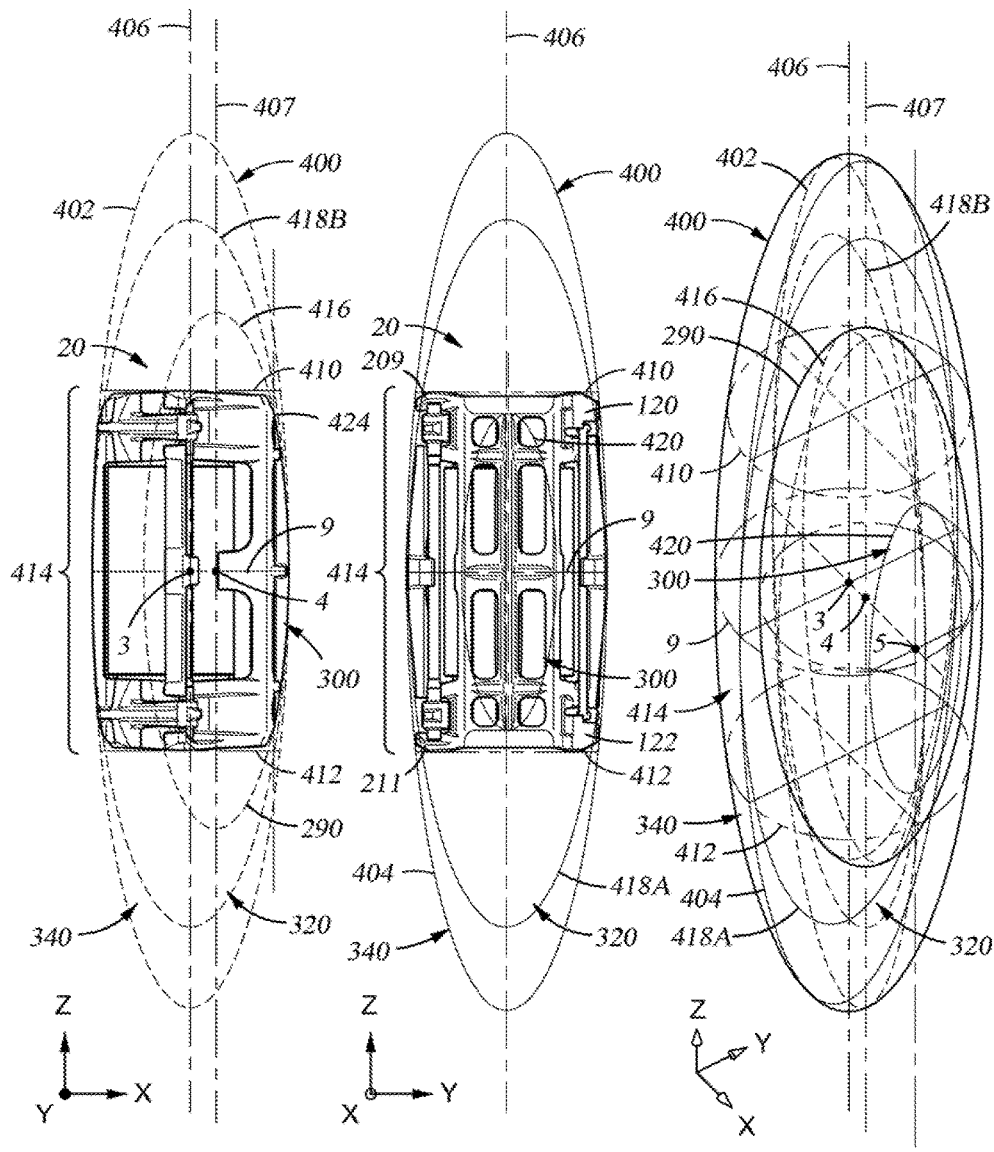
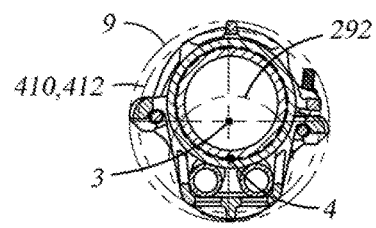
Fig. 18C   Fig. 18D   Fig. 18E
Fig. 18F

BI-DIRECTIONAL CABLE GUARD

CROSS REFERENCE TO RELATED APPLICATIONS

The following application contains subject matter related to the present invention: 1) application Ser. No. 08/642,575 filed on or about Mar. 30, 2006; which is incorporated by reference in its entirety.

FEDERALLY SPONSORED RESEARCH

Not Applicable.

SEQUENCE LISTING OR PROGRAM

Not Applicable.

BACKGROUND OF THE INVENTION

1. Field of the Invention

This present invention relates generally to improvements in protective devices, and, more particularly, to improvements in cable guards for protecting cables along tubes and couplings in a tubing string.

2. Description of the Related Art

Cable guards have been known for many years. Generally, cable guards are manufactured as fabricated, cast, molded, and/or stamped apparatuses and include a set of parts for assembly and installation. Installation parts typically include bolts, nuts, taper pins or other fasteners for assembly and to secure the cable guard to a tubing string. Assembly parts typically include a base, clamp, screws, inserts, set screws, and malleable elements or other similar elements to protect and secure cables.

Typically, cable guards are used to protect cables extending along a tubing string to downhole equipment. The tubing string normally originates with downhole equipment attached to a tube and is extended down a well bore as tubes are added to the tubing string. Assembled cable guards are attached to a tubing string to protect cables running from the surface to downhole equipment as the tubing string is extended. As downhole equipment and cable guards travels inside a casing, forces may damage cable guards and cables, loosen taper pins, and damage or crack corners, hinges, and blunt edges.

Cable guards are set forth in U.S. patents. U.S. Pat. No. 4,615,543 discloses a cable protector joined by hinges and taper pins. Taper pins require special equipment for assembly and mounting and taper pins may loosen during use. U.S. Pat. No. 6,023,027 ("'027 patent") sets forth a cable guard that includes a base and a clamp that are hingedly connected. Unfortunately, the hinge rod may be bent as it is bowed and/or pried with levers over a projection during assembly; or, after assembly, as the clamp and base are rotated to open the cable guard by over rotating the base where the outside of the base and clamp leverage against each other urging hinge portions out of the hinge grooves and further bending the hinge rod. Consequently, when the base and clamp are rotated to close the cable guard, the bent hinge rod may pass around the projection and the base and clamp uncontrollably detach from each other. Similarly, the u-bolt that tensions this guard, may uncontrollably detach in at least two (2) ways: 1) the u-bolt may slide substantially parallel to the longitudinal axis of the cable guard and one leg of the u-bolt moves up and over a base end while the other leg falls off the other base end causing the u-bolt to pop out of the projection, or 2) the u-bolt is bent from over rotation or prying and uncontrollably detaches from the base in a manner similar to the hinge rod. Finally, U.S. Pat. No. 9,512,685 describes a modular unit having a protector shell and at least one removable insert with gaps sized to grippingly engage a cable. However, like guard in the '027 patent, this guard also has sharp edges and elements that are subject to damage, cracking, and breakage. Finally, this guard also includes pins, set screws, and bolts and fasteners with malleable elements that create opportunities for installation errors and failures or separation of the inserts and modular unit that may damage a well or equipment.

Several patents describe cable guards with gripping elements to prevent movement or increase holding forces on a tube. FIG. 10 in the '027 patent shows a rectangular array of projecting, gripping elements in the clamp. U.S. Pat. No. 4,615,543 describes raised elements protruding from an interior surface to increase holding forces. U.S. Pat. No. 2,836,447 describes driving hardened teeth into a pipe with impact blows. Separately manufactured hardened griping elements may detach, damage tubing, and require several manufacturing steps, complex tooling, and/or a separate core for manufacturing as a ductile iron casting.

While most of the related art includes at least two (2) taper pins, bolts, or other fasteners, other known devices have a short body that does not enclose a coupling and includes a single T-bolt that is rotatably connected to the body that slides into a slot for securing the cable guard to tubing.

The related art has shortcomings. First, apparatuses have multiple interconnecting and interengaging parts and some require at least one removable insert. Next, the related art is made in multi-step and multi-part manufacturing processes and may require additional machining, trimming, or notching and assembly before shipping. Third, cable guards require manufacturing and/or assembly of a set of parts of various materials or material properties or specially hardened elements. Fourth, assembly, sliding, and over rotation may bend the hinge rod and/or u-bolt and cause the base and clamp and/or u-bolt to uncontrollably detach. Fifth, inserts and separately hardened gripping elements require separate manufacturing steps and may become separated from cable guards and damage well equipment. Sixth, the related art also requires new molds or tooling to manufacture each combination of cross section and size and related inserts. Seventh, inserts, taper pins, set screws, and bolts and fasteners with malleable elements make the cable guards complex and costly. Eighth, taper pins require special power crimping equipment to assemble or mounting to tubing that increases assembly and installation complexity, and cable guards manufactured by stamping are less rigid and are subject to deformation and require costly shop space and press equipment. Finally, the related art includes sharp edges and elements that are subject to damage, breakage, cracking, and failures and related cable damage.

3. Summary of the Invention

Accordingly, a need has arisen for a cable guard that overcomes the shortcomings. Generally, in accordance with the exemplary embodiments, the present invention provides an integrally formed, as defined below, cable guard comprising a base and a ring that are rotatably and removably connected and interchangeable with serrated flange nuts for quick installation and removal. Accordingly, an object of the present invention is to provide a base and ring that are integrally formed, easily manufactured in a predetermined length, size, and configuration, shipped directly from a manufacturing facility, assembled at a distribution facility or job site, and installed without any additional, trimming, notching, or cutting, except to the extent that a user desires to customize the cable guard or join it in tandem or side-by-side relation to other cable guards. Other objects include providing a structure that is reusable and/or includes interchangeable bases and rings that accommodate different configurations of cables, as defined below, and accommodates needs of users; and provides a structure that includes compressible non-slip teeth for resisting longitudinal and rotational movement of the cable guard on tubes. Accordingly, the present invention contemplates adaptation to tubes, tubing strings, couplings, and other structures where users need to attach and protect cables in a structure where the base and ring are interchangeable and re-usable.

Next, another object is to provide a structure where the base and ring are easily rotatably and detachably connected with ring rotational stops that prevent the base and ring and/or u-bolt from detaching and to reduce the likelihood of personal injuries. It is also an object to provide a structure for easy installation and removal that does not require the use of hammers or impact blows to improve the gripping force to the tubing.

One solution to breakage, cracking, and failures and cable damage is to provide a structure that is designed to deform, resist crushing and tearing, and protect cables that has an outside shape and elements capable of bi-directionally guiding the cable guard and transitioning irregularities in a well bore. The present invention provides a substantially ellipsoidal structure where points on the surface of the mounted cable guard are points on ellipsoids that bi-directionally guide. Next, a base longitudinal stiffener and a plurality of base cross-sectional stiffeners and other elements are points on the ellipsoids, and with the pair of crushing resistors allow the cable guard to deform easily until crushing resistors contact the tubing string and/or coupling to provide additional structural support that resists additional crushing of the central rib and crushing or damage to the cables. Base bumpers, ring bumpers, and hinge pin covers and other elements also cooperate to bi-directionally guide the cable guard and protect the u-bolt and hinge pins to prevent other objects or casing irregularities from contacting, breaking, or dislodging the hinge pins or u-bolt or other elements. Finally, the present invention may include tearing resistors, and where adapted for relatively small casings, tearing resistors and receptacles may be included that prevent stress risers, to resist fracturing and tearing.

Next, with regard to special equipment for assembly, manufacturing and/or assembly of a set of parts of various materials or material properties or specially hardened elements, and inserts, pins, set screws, and bolts and fasteners with malleable elements, are eliminated because the present invention provides a less complex base and ring that may be manufactured as an integrally formed ductile iron sand casting that provides for easy assembly and interchangeable rings and bases and installation with readily available equipment. Specialty equipment is not required for assembly or mounting of the present invention because an air-operated impact wrench and/or torque wrench tightens the serrated flange nuts and tensions the u-bolt. Advantageously, inserts, pins, set screws, and bolts and fasteners with malleable elements are not required because the base and ring of the present invention may be integrally formed with elements to fit cables and/or gripping elements for gripping cables.

Finally, separately and specially hardened elements for improving the griping forces between cable guards and tubes are not required because another solution to improving gripping forces between cable guards and tubes is to make elements of the present invention softer than the tubes and adapt elements for partially mating and frictionally engaging a portion of the tubes and/or include compressible teeth that may be adapted to yield and deform to conform to the surface irregularities, ovality, drift, and other deformations in tubes.

Next, to overcome shortcomings related to the bending of the hinge rod and/or u-bolt, over rotation, and uncontrollable detachment of the base and ring, and the u-bolt, the present invention may include rotational stops that prevent installation of the hinge rod and u-bolt in certain relative positions, limit contact between the base and ring, over rotation, and uncontrollable detachment.

The present invention is also easily assembled and may include a combination of abutments, hinge abutment receivers, and hinge receivers, that cooperate with the hinge pin covers, hinge rod, and hinge rod engaging projection that allow a user to place the abutments in a relative position to the hinge receivers with the hinge rod resting on the hinge rod engaging projection to simply strike one of the abutments that eliminates the use of levers and minimizes bending of the hinge rod to prevent uncontrollable detachment. The present invention may also include supports along a hinge receiving rib and a u-bolt receiving rib adapted for supporting and preventing bending of the hinge rod and u-bolt and the uncontrollable detachment of the base and ring and u-bolt. Companies, employees, contractors, and insurers will appreciate the benefits of rotational stops, supports, and other elements that reduce the likelihood of personal injuries. The lengths of hinge receiving rib 44, central rib 46, and u-bolt receiving rib 48 are selected with respect to the length of coupling 26, if any, to be enclosed and to define a structure that is adapted for protectively enclosing the cables and/or coupling 26, if any, that are to be enclosed. The minimum length of hinge receiving rib 44, central rib 46, and u-bolt receiving rib 48 must be longer than coupling 26 for mounting across coupling 26, if any.

Users and well owners will appreciate that the present invention is reusable and that the base and ring are interchangeable. The base and/or ring can be replaced to accommodate larger cable and/or a plurality of cables for other equipment as the conditions vary based on completions, workovers, and maintenance, primary, secondary, tertiary and other methods of recovery and other similar changes that affect production.

Distributors and users will find the present invention advantageous because it does not require complex assembly, and it may be shipped direct from a manufacturing facility and assembled in the field to minimize storage, transportation, and labor costs.

Other objects and advantages will become obvious to those skilled in the art from a review of the specification and drawings that other forms may be made within the scope of the present invention.

BRIEF DESCRIPTION OF THE DRAWINGS

A better understanding of the invention can be obtained when the detailed description of exemplary embodiments set forth below is considered in conjunction with the attached drawings in which:

FIG. 1 is a perspective view of a first embodiment of the present invention being aligned and mounted on a tubing string and enclosing and protecting cables in a well bore.

FIG. 8 is an end view of an assembled cable guard in the fully open position showing the rotatably and removable connection of the base and ring being with the first ring rotational stop contacting the first step preventing over rotation and uncontrollable detachment.

FIG. 18C is a side view of a first embodiment of the present invention mounted on a tubing string showing ellipses and ellipsiods, and for clarity the tubing string on which the present invention is mounted is not shown and ellipses in the xz-plane are shown with dashed lines for reference in FIGS. 18E and H-J.

FIG. 18D is a side view of a first embodiment of the present invention mounted on a tubing string showing ellipses and planes of a second base partial ellipsoid with the base and the second base partial ellipsoid in the foreground and the ring and the ring partial ellipsoid in the background; and, for clarity, the tubing string on which the present invention is mounted is not shown, and ellipses in the yz-plane are shown with solid lines for reference in FIGS. 18E and H-J.

FIG. 18E is a perspective view of a first embodiment of the present invention mounted on a tubing string showing the first base partial ellipsoid, second base partial ellipsoid, ring partial ellipsoid, and a fourth ellipsoid that touches and encloses the ring and base.

FIG. 18F is an end view of a first embodiment of the present invention mounted on a tubing string showing the design circle, clearance circle, and cross sections through ellipsoids.

FIG. 48 is a cross-sectional view at the u-bolt slot of a base, ring, and assembled cable guard mounted on a tubing string enclosing and protecting cables.

DETAILED DESCRIPTION OF THE EXEMPLARY EMBODIMENTS

Figure 2:
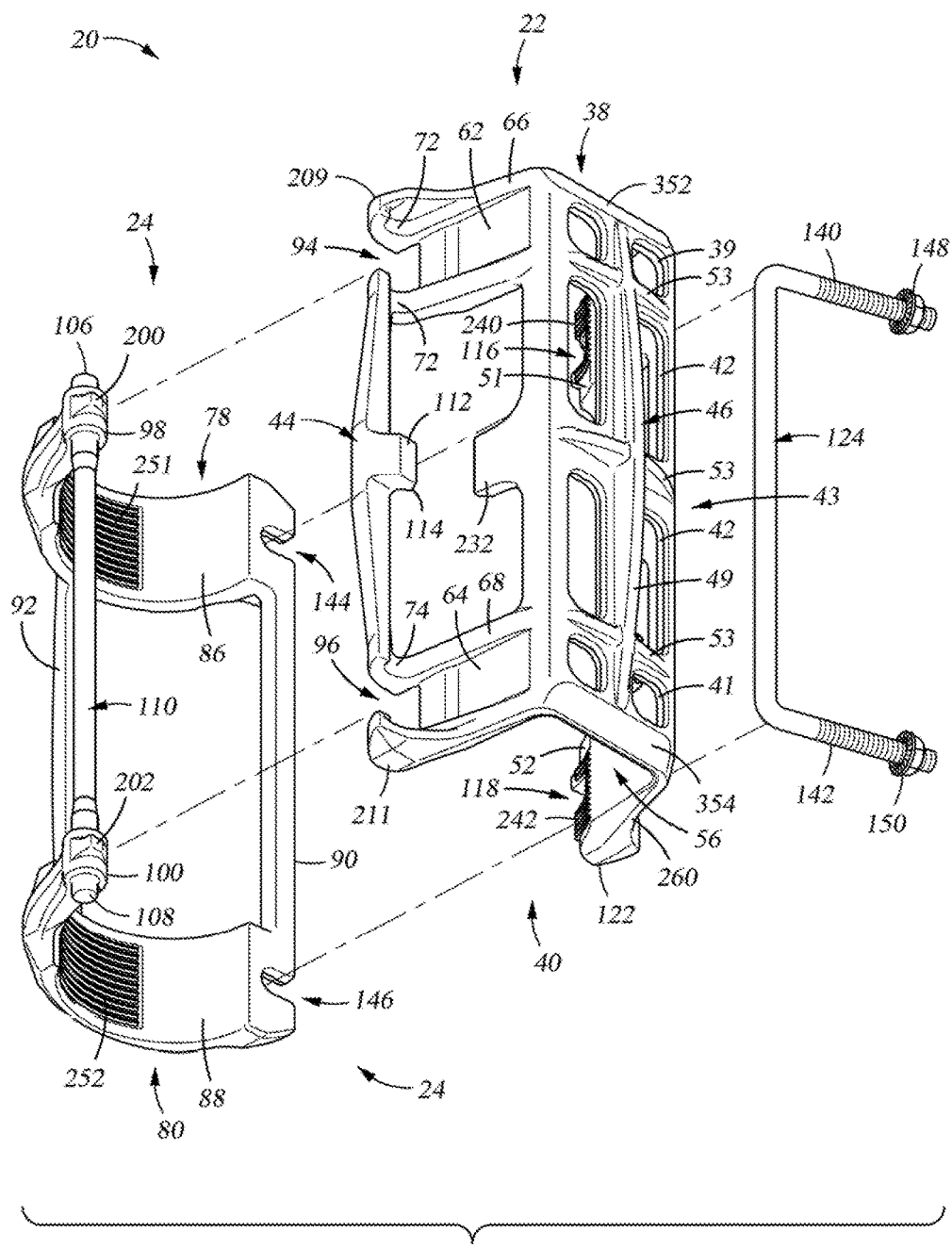
FIG. 2 is a perspective view of one embodiment of the present invention showing the base, ring, and u-bolt with dashed lines indicating the alignments of the rotatably and removable connection of the base and ring and the u-bolt and u-bolt engaging projection.

Referring to FIG. 1, a rig is engaged to a first tube 28 and a second tube 30, the tubes 28 and 30, that are removably connected to each other by a coupling 26 comprising a tubing string 32, and while coupling 26 is shown in the figures with squared ends, in practice coupling 26 may be integral and smoothly transition to tubes 28 and 30. FIG. 1 also shows a first cable 34 and a second cable 36, the cables 34 and 36, and a cable guard 20 enclosing cables 34 and 36 installed along tubing string 32. Referring to FIG. 1, below the deck, a first embodiment of a cable guard 20 is deployed in a well bore 33. Typically, a well system 10 comprises tubing string 32 and cables 34 and 36 along tubing string 32, including cable guards 20 secured to the tubing string 32 that protect cables 34 and 36 extending to downhole equipment.

In general, referring to FIG. 1, the present invention is comprised of a base 22 and a ring 24 that are rotably and removably connected to each other and adapted for mounting on tubing string 32, and a u-bolt 124 having threaded legs with nuts, described below, that is rotably and removably connected to base 22; and, alternatively, in a second embodiment, u-bolt 124' is rotably and removably to ring 24', for securing cable guard 20' to tubing string 32'. Referring to FIG. 1, cable guard 20 is installed around coupling 26. The present invention may also be mounted on a tube and/or connected in tandem for protecting cables.

While the terms tube 28 and tubes 28 and 30 and tubing string 32 are related to each other as a tubing string 32 is comprised of tubes 28 and 30 and couplings 26, all embodiments of the present invention are capable of protecting cables 34 and 36 by mounting present invention on a tube 28 or on tubes 28 and/or 30 across a coupling 26. Similarly, the term cable 34 or cables 34, 36, a third cable 37, and data cable, described below, is not intended to be limited to a singular cable and may include a plurality of cables, and cables are not limited by type, kind, or use and the term includes items that may be used to transmit and receive fluids, signals, commands, forces, and/or provide power and control, and other similar items and may also be referred to as instrument cables, control cables, power and data cables, sensor cables, and video and broadcast cables. While the present invention is adapted for mounting on round tubes, it may be adapted for mounting on tubes 28 and 30 of any cross-sectional shape.

For purposes of the present description and claims, where the term "integrally formed" is used, it is intended to breathe life into the claims and shall mean that base 22 and ring 24 or base 22' and ring 24' of the present invention are each made of a continuous, non-segmented, and unitary construction where all elements of each are joined together upon the exit from a mold or tooling, and each is not made by a structural integration such as welding, gluing, bolting, fastening, riveting, screwing or otherwise similarly structurally integrating any elements. The term "integrally formed" does not mean that the present invention is not stamped and does not mean that it cannot be trimmed, notched, machined, or customized or that the present invention cannot be altered by heat treating, forging, machining, grinding, drilling or punching holes or slots or other similar modification. By example, and not in limitation, if an order does not meet foundry or tooling minimums, and the design changes relate to the size of the cables 34, 36, and 37, existing tooling may be used, and the inside of base 22 and/or ring 24 and base 22' and/or ring 24' may be machined to accommodate design changes.

Figure 3:
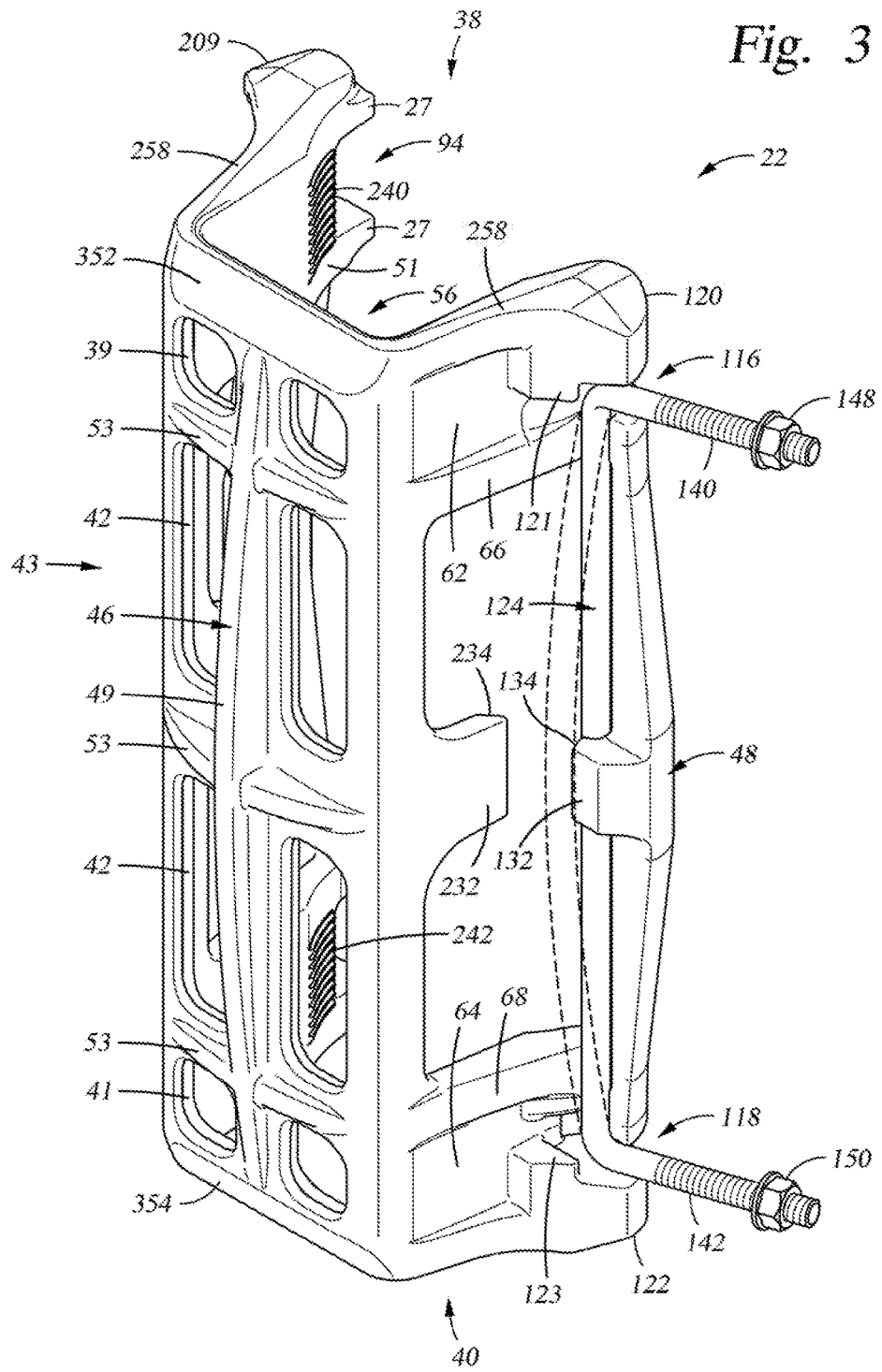
FIG. 3 is an isometric view of the base and u-bolt shown in FIG. 2 with the u-bolt installed in the u-bolt engaging projection.

In all embodiments, when mounted, the present invention defines a structure adapted for mounting on tubes 28 and 30 and/or enclosing a coupling 26 for protecting cables along a tubing string 32 as shown in FIG. 3 and in all figures generally to a downhole electrical pump or other tools or equipment that are not shown.

Referring to FIG. 1, the annular space between casings and tubes 28 and 30 and/or coupling 26 may vary, and the sizing and elements of the present invention is generally based on cable type, sizing, and configuration and the dimensions of the casing, tubing string 32, and/or coupling 26. All embodiments of the present invention must fit within a design circle 8 having a casing center 3 shown by a dashed line in FIG. 17 that represents the inside surface of the casing having a casing center 2.

Figure 17:
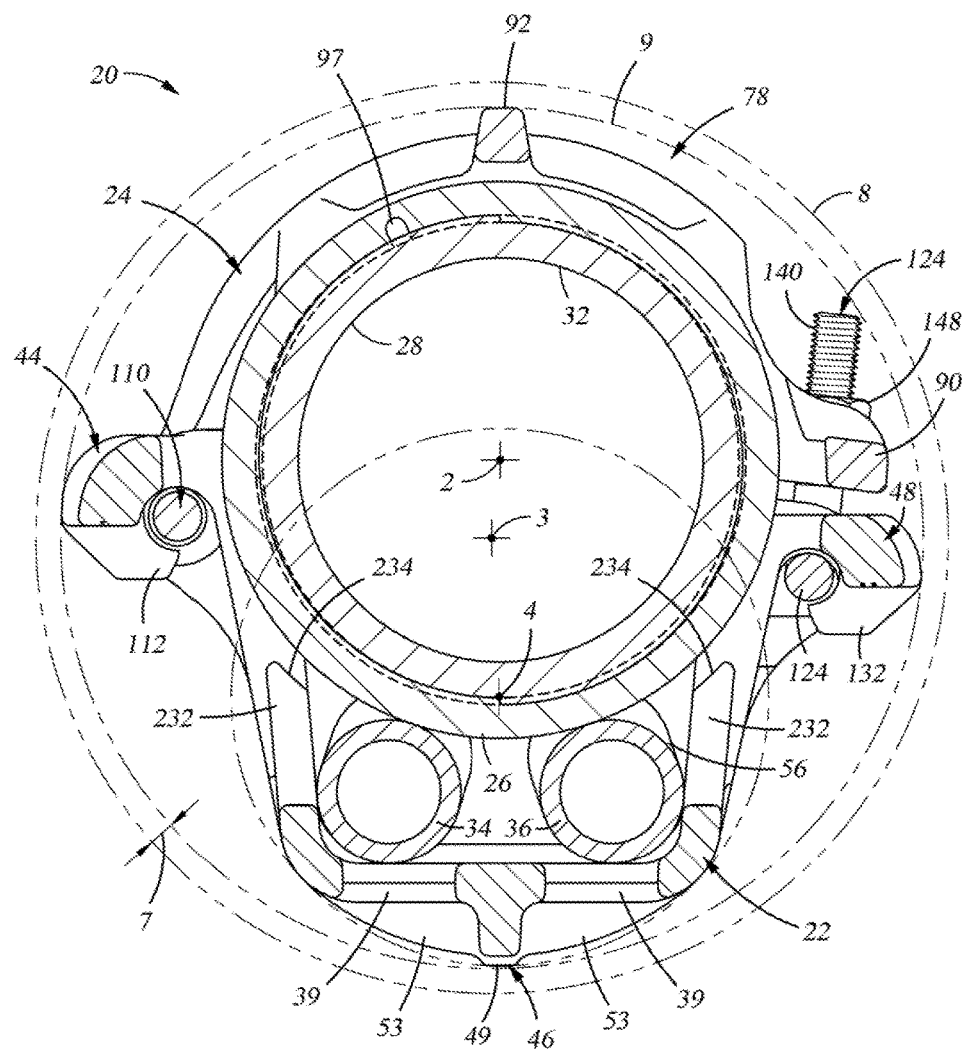
FIG. 17 is a cross-sectional view of a base, ring, and assembled cable guard mounted on a tubing string enclosing and protecting cables that also shows a typical design circle, clearance circle, and ellipsoids contacting points on the surface of the base and ring.

Referring to FIG. 17, the general design process begins with design circle 8. First, in general, the decision to use the first embodiment or the second embodiment turns on whether design circle 8 is larger than about four inches (4"). Typically, the first embodiment is used where design circle 8 is larger than about four inches (4"). Next, the types and sizes of cables 34, 36, and 37 affect the design of base 24 or 24'. For example, the types and sizes of power cables may vary among flat electrical submersible pump cable, flat with capillary tube electrical submersible pump cable, round electrical submersible pump cable, and/or motor flat lead cable; advantageously, the present invention includes elements that may be adapted for protecting various types and sizes of cables 34, 36, and 37.

Next, in FIG. 17, an annular clearance 7 is defined by the uniform distance between design circle 8 and a clearance circle 9 shown by dashed lines touching at least points on elements of the present invention. For example, in FIG. 17, clearance circle 9 represents a cross section through ellipsoids, described below, touching points on: 1) a hinge receiving rib 44, 2) a u-bolt receiving rib 48, 3) a central ring connecting rib 92, and/or 4) a base longitudinal stiffener 49, each described below. The annular clearance 7 may vary depending on the drift of the casing and is preferably a minimum of about one-eighth inch (⅛"), and in some cases, annular clearance 7 may be about thirty thousandths of an inch (0.0030"), and the design of the present invention may produce an offset in casing center 3 and tubing string center 2 as shown in FIG. 17. These offsets may arise from differing material strengths and dimensions of u-bolt 124 and hinge rod 110 and other elements and from using existing tooling to manufacture interchangeable replacements.

FIGS. 1-34, and 68 show a cable guard 20 in accordance a first embodiment of the present invention. The cable guard 20 comprising a base 22, a ring 24, and a u-bolt 124 is illustrated in FIG. 2, assembled in FIGS. 4 and 5, and mounted in FIG. 10. Referring to FIGS. 1, 2, 4, and 5, base 22 and ring 24 are rotatably and removably connected and adapted for mounting across a coupling 26. The base 22 and ring 24 are interchangeable and replaceable for differing configurations for enclosing a coupling 26 and frictionally and/or compressingly engaging tubing string 32. Advantageously, a user could pull a tubing string 32, remove cable guards 20 and replace base 22 and re-use ring 24 to accommodate changes in a well or well equipment and/or cables 34, 36, and 37.

Figure 14:
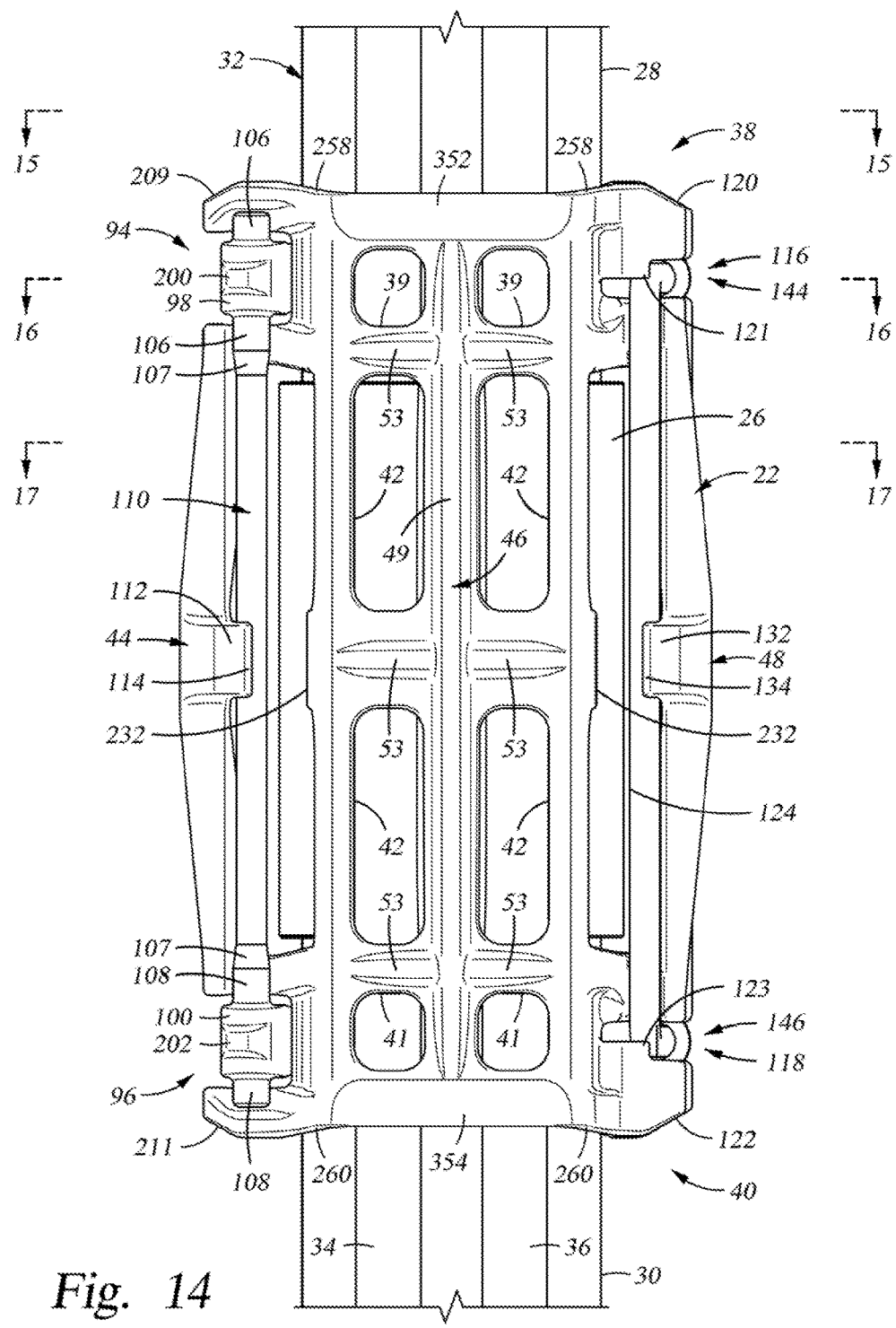
FIG. 14 is a side view of a base and assembled cable guard mounted on a tubing string enclosing and protecting cables of the side opposite FIG. 12.
Figure 15:
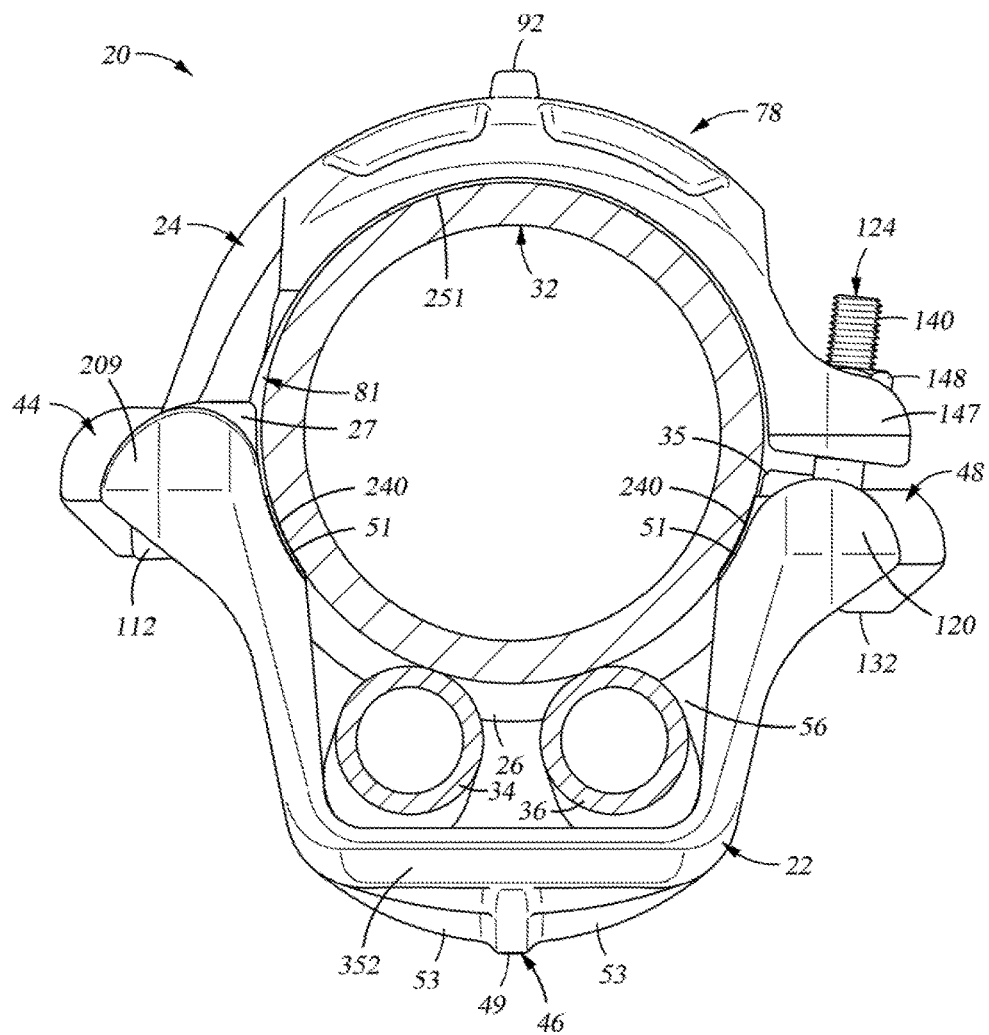
FIG. 15 is a cross-sectional view through the tubes and an end view of a base, ring, and assembled cable guard mounted on a tubing string enclosing and protecting cables that also shows the closing gap as an area where the ring inner surfaces are spaced apart from the tubes.

Referring to FIGS. 1-5, 7-9A, 10-11, 14, and 17, u-bolt 124 has a first leg 140 and a second leg 142, the u-bolt legs 140 and 142, that are threaded to receive a first nut 148 and a second nut 150, the nuts 148 and 150. Nuts 148 and 150 are threaded onto u-bolt legs 140 and 142 to secure base 22 to ring 24 when cable guard 20 is mounted as shown in FIG. 14. While FIG. 4 and others show hex head nuts and flat washers, nuts 150 and 152 are preferably a serrated flange nut as shown in FIGS. 2 and 3.

Figure 18A:
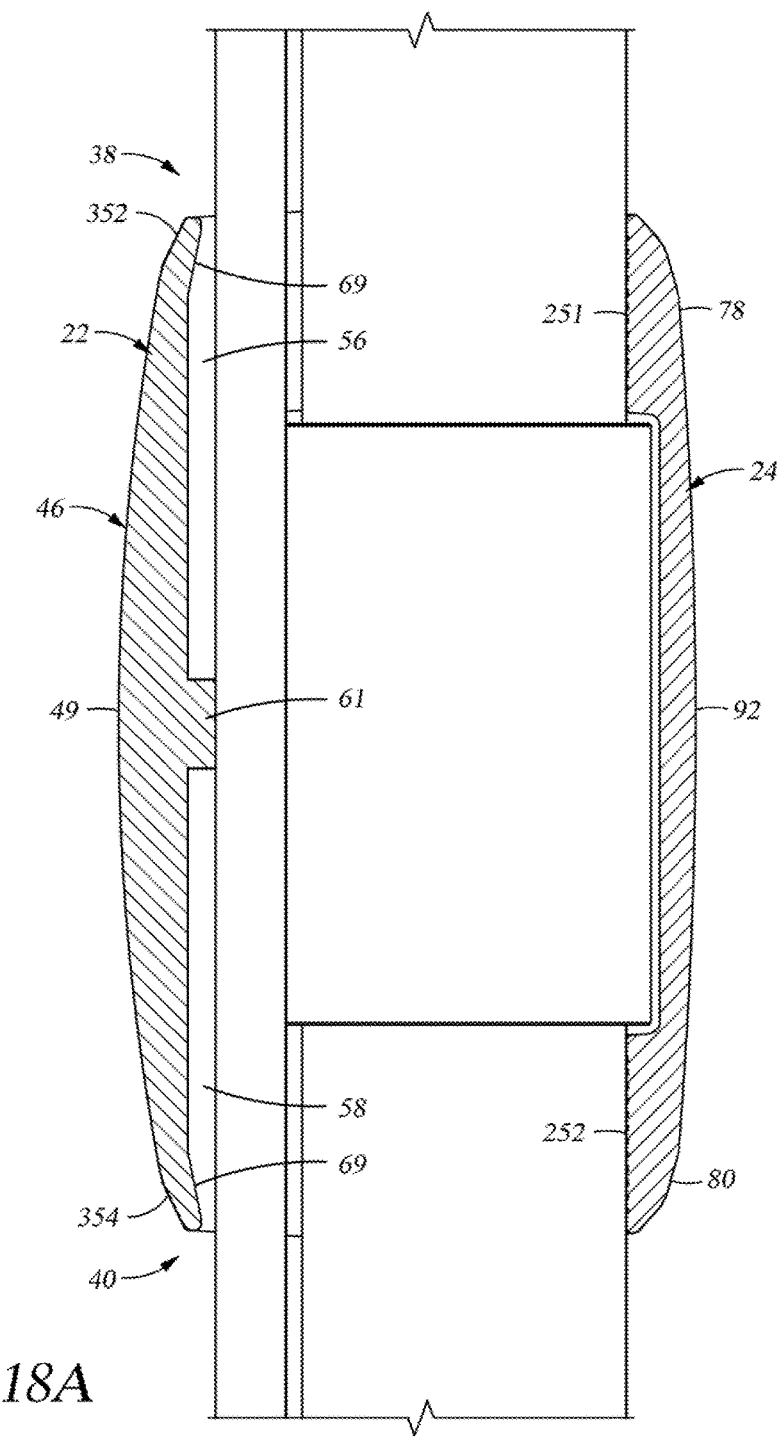
FIG. 18A is a cross-sectional view of a first embodiment of the present invention mounted on a tubing string enclosing and protecting cables with the adjustment pad biasing cables against the coupling with the ring compressible non-slip teeth compressingly engaged to the tubes.
Figure 18B:
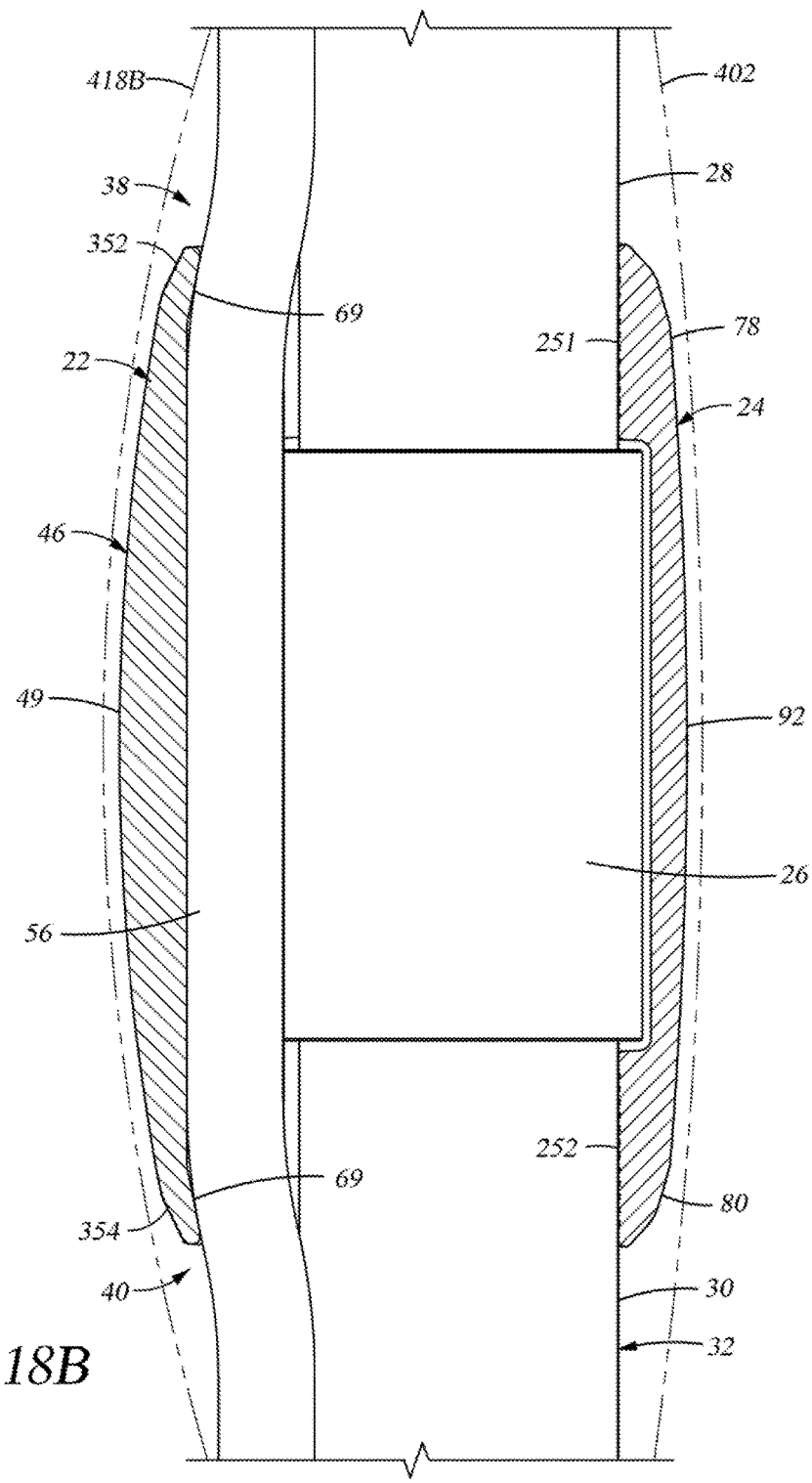
FIG. 18B is a cross-sectional view of a first embodiment of the present invention mounted on a tubing string enclosing and protecting cables with portions of ellipsoids shown by the dashed lines separated from the surfaces of elements of the base and ring for clarity as well as the cable biasing slope biasing the cables against the coupling and tubes and creating a curvature in the cables with the ring compressible non-slip teeth compressingly engaged to the tubes.

Referring to FIGS. 2-26, base 22 is comprised of a first base end 38 and a second base end 40, the base ends 38 and 40, and a base connection assembly 43 for connecting base ends 38 and 40 comprising a hinge receiving rib 44, a central rib 46, and a u-bolt receiving rib 48. Preferably, as shown in FIGS. 2-5 and 14, first base end 38 and second base end 40 have a generally arcuate shape and may be of any shape adapted for engaging round tubes 28 and 30, protecting cables 24, 36, and 37, and bi-directionally guiding cable guard 20; however, the present invention may be adapted for engaging tubes 28 and 30 of any cross-sectional shape. The base ends 38 and 40 are adapted for partially mating with a portion of tubes 28 and 30 or tubing string 32 and across coupling 26, if any. Preferably, the length of central rib 46 provides about one-eighth (⅛") to one-quarter (¼") inch clearance between base ends 38 and 40 on each side of coupling 26, if any, as shown in FIGS. 10 and 18A-B.

Figure 27:
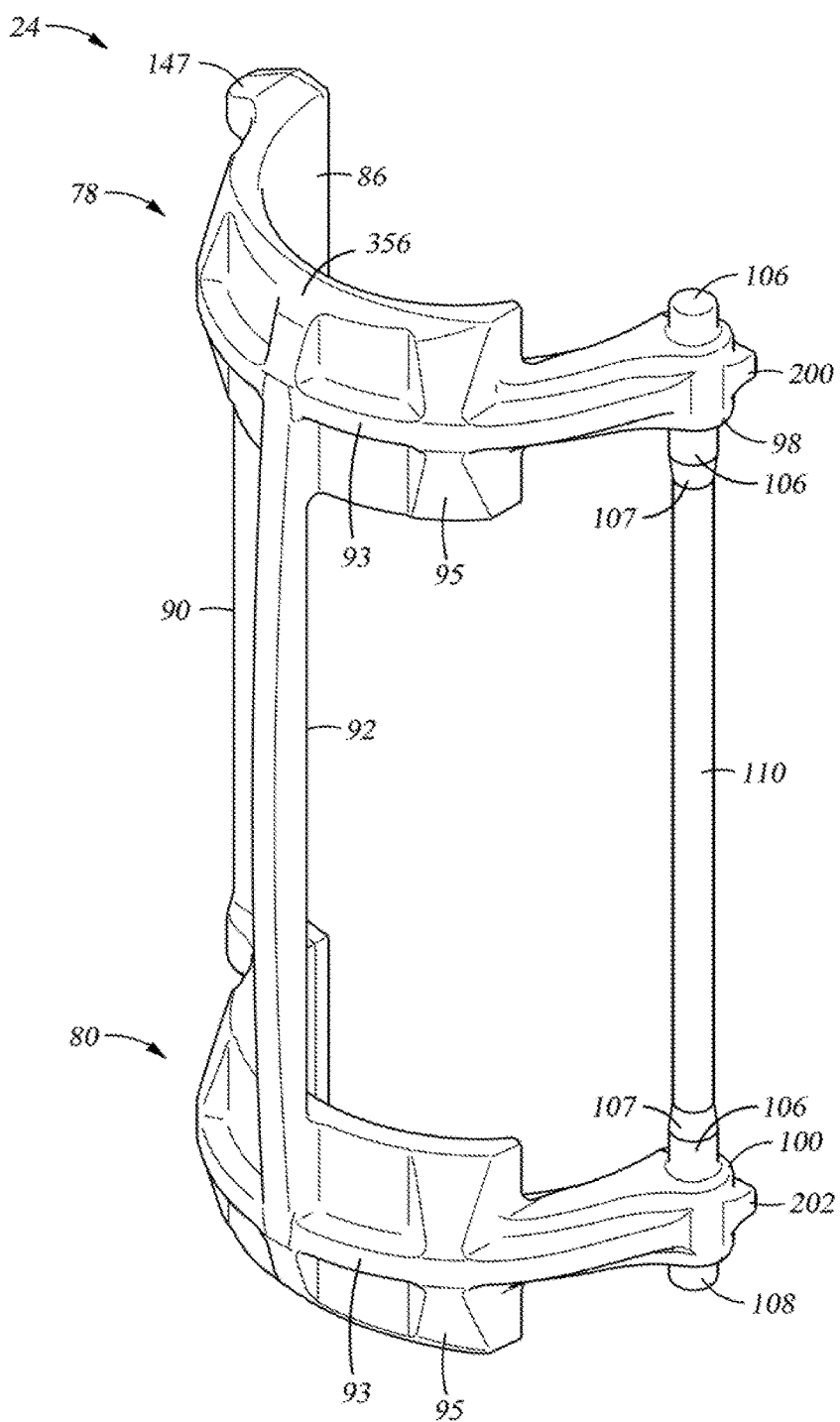
FIG. 27 is an isometric view of a ring.
Figure 28:
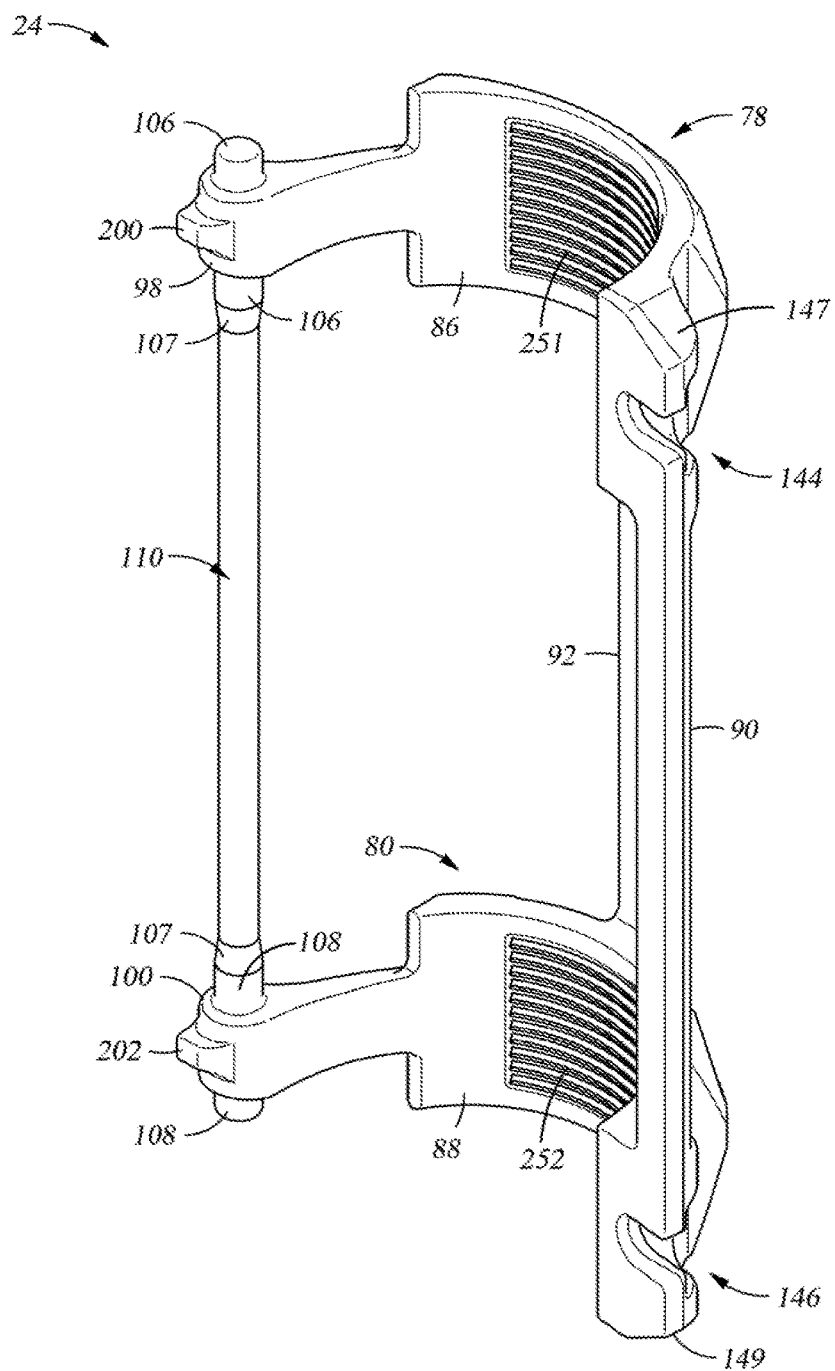
FIG. 28 is an isometric view of a ring.

Referring to FIGS. 2, 4-5, 8, 10-13, 15-18, and 27-34, ring 24 is comprised of a first ring section 78 and a second ring section 80, the ring sections 78 and 80, and a connecting rib 90, a central ring connecting rib 92, and a hinge rod 110 for connecting ring sections 78 and 80. Preferably, central ring connecting rib 92 is centrally positioned between connecting rib 90 and hinge rod 110 and extends outwardly from and/or away from tubes 28 and 30 and/or coupling 26 when mounted, and partially across ring sections 78 and 80 as shown in FIGS. 2 and 27; however, central ring connecting rib 92 may be at any position suitable for connecting ring sections 78 and 80. The central ring connecting rib 92 might not be used in relatively small casings because the design circle 8 may be too small.

Figure 10:
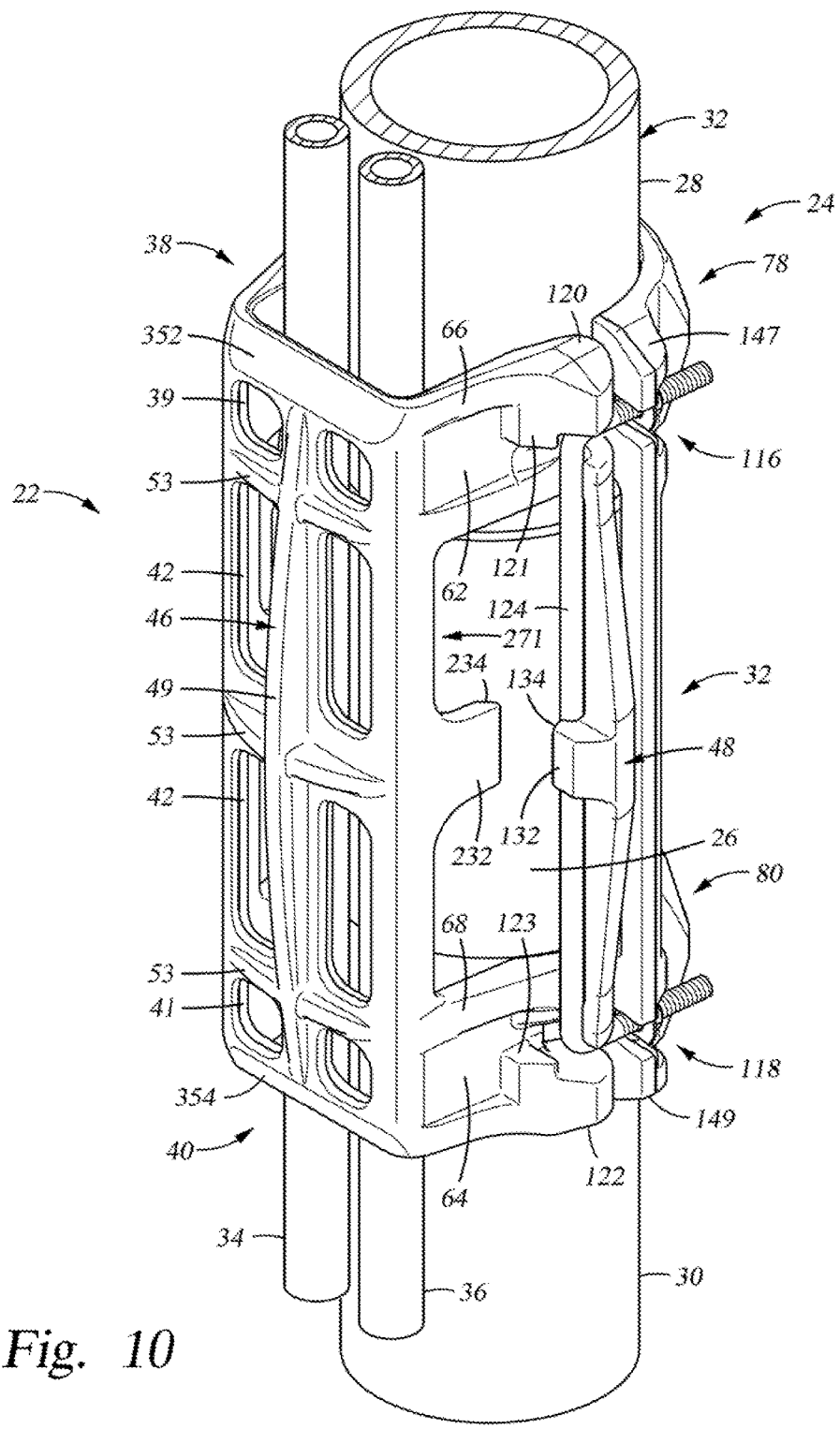
FIG. 10 is a perspective view of a cable guard mounted on a tubing string enclosing and protecting cables.

Referring to FIGS. 1, 4, 10, and 15, when cable guard 20 is mounted as shown in FIG. 10, ring sections 78 and 80 extend about portions of the tubes 28 and 30 or the tubing string 32 and adapted for partially mating with a portion of the outside surface of tubes 28 and 30 or tubing string 32 and co-acting with base 22 to engage portions of tubes 28 and 30, tubing string 32, and/or across coupling 26, if any.

Figure 23:
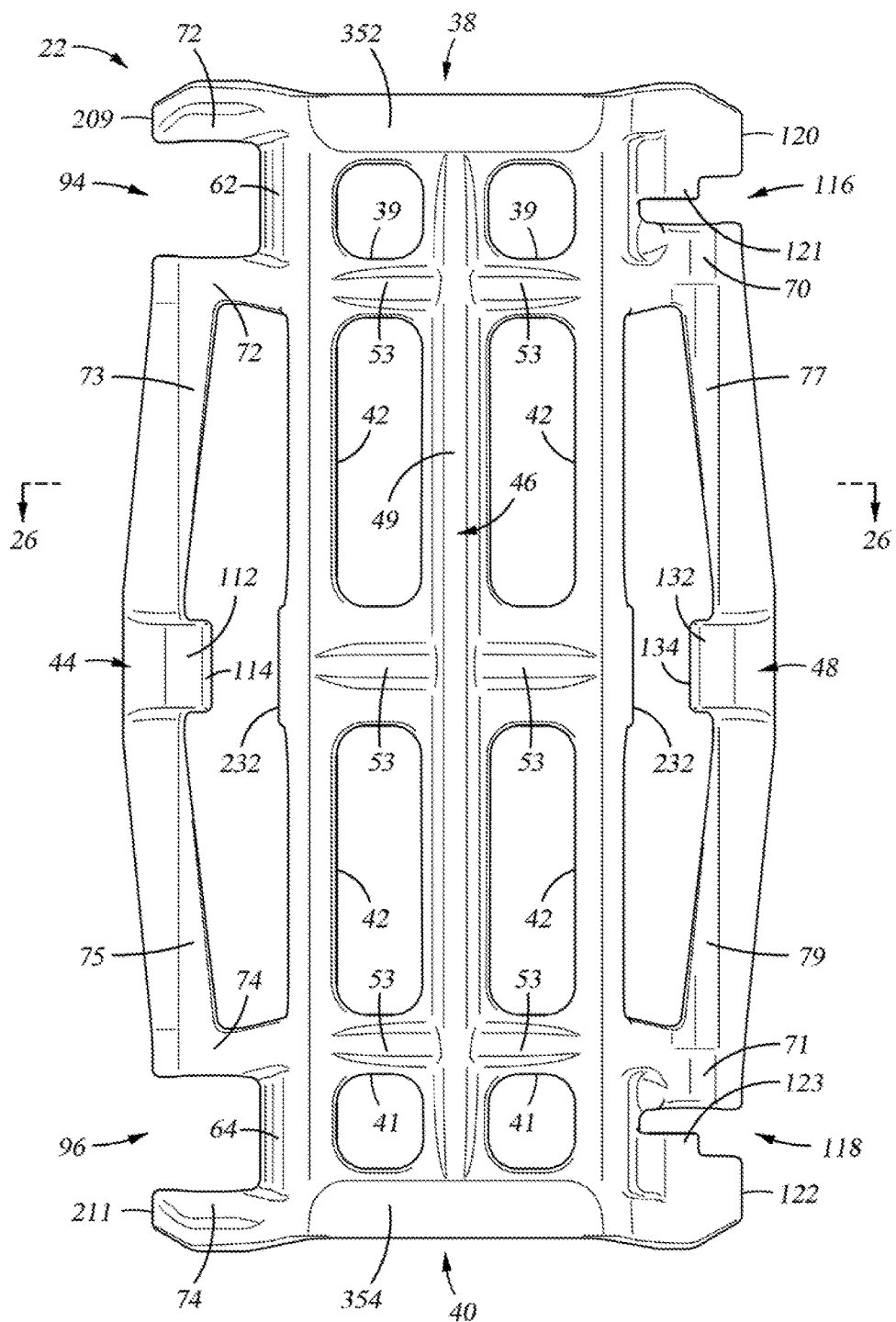
FIG. 23 is a top view of a base.
Figure 24:
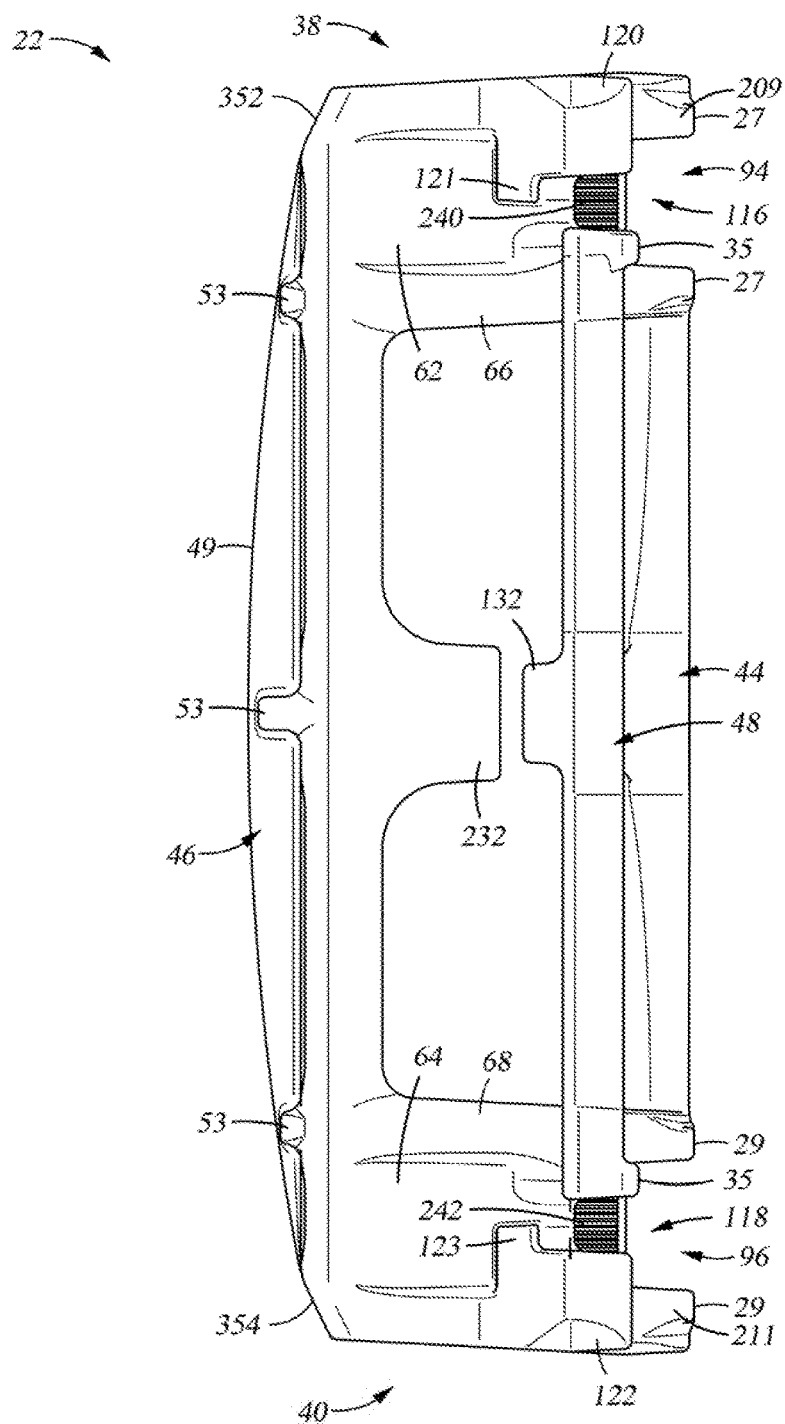
FIG. 24 is a side view of a base.
Figure 25:
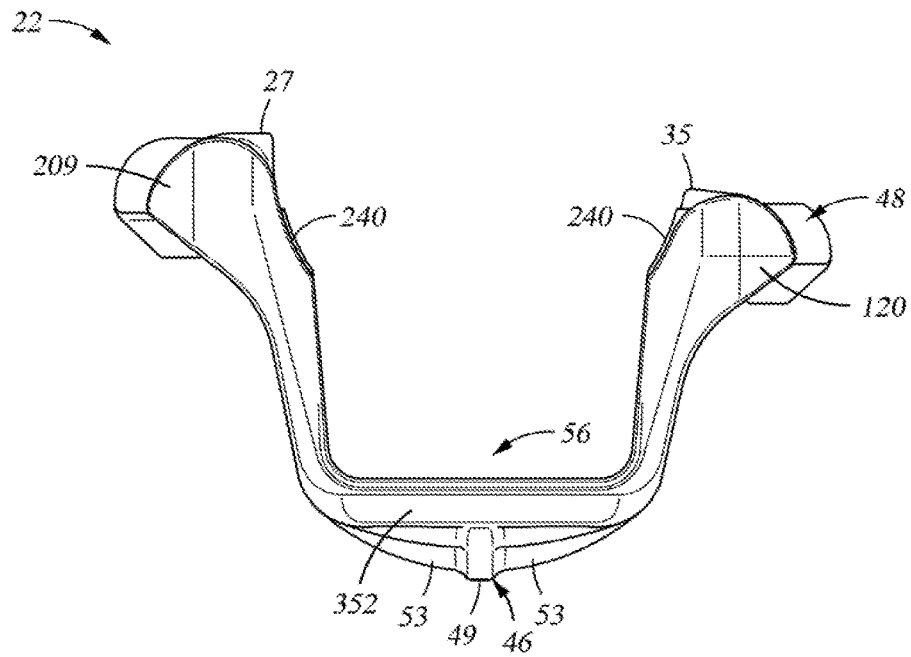
FIG. 25 is an end view of a base.
Figure 26:
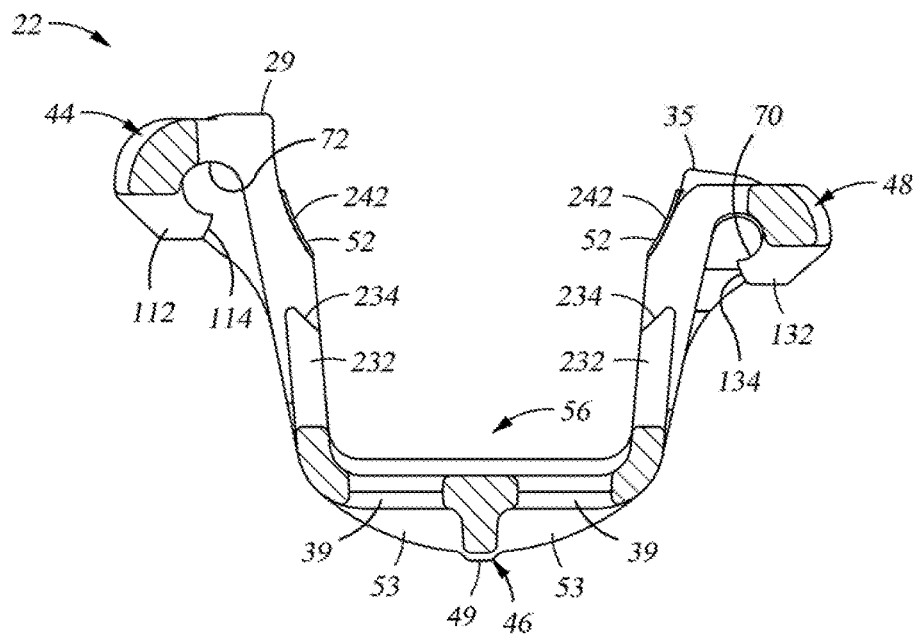
FIG. 26 is a cross-sectional view of a base.

Each of base 22 and ring 24 include surfaces for mating and engaging tubes 28 and/or 30 or tubing string 32. Referring to FIGS. 2-5, 8, 15, 19-21, and 23, first base end 38 has a first base end inner surface 51 and second base end 40 has a second base end inner surface 52, the base inner surfaces 51 and 52, as shown in FIG. 23, and first base end 38 has a first base end outer surface 66 and second base end 40 has a second base end outer surface 68, as shown in FIG. 21. The outer surfaces 66 and 68 extend outward from base inner surfaces 51 and 52, respectively. Similarly, referring to FIGS. 2, 4, 8, 10, 15-16, 28, 33-34, first ring section 78 includes a first ring inner surface 86, and second ring section 80 includes a second ring inner surface 88, the ring inner surfaces 86 and 88. Preferably, base inner surfaces 51 and 52 and ring inner surfaces 86 and 88 are adapted for partially mating and frictionally engaging a portion of tubes 28 and 30 and resisting longitudinal and/or rotational movement when the present invention is mounted as shown in FIGS. 1, 10-15, and 18A-B. Referring to FIGS. 8, 25, and 26, while base 22 may deform and draw as it cools in a ductile iron casting, preferably, base inner surfaces 51 and 52 have a radius that is slightly smaller than the radius of tubes 28 and 30. Each of base inner surfaces 51 and 52 and ring inner surfaces 86 and 88 may also include other raised elements that improve the gripping force.

Referring to FIGS. 2-7, 10, 14, 22, and 24, first base end 38 has a first base end face 352 and a first base end taper 258 and second base end 40 has a second base end face 354 and a second base taper 260, the base end tapers 258 and 260 and the base end faces 352 and 354, respectively, for bi-directionally guiding. Preferably, as shown in FIGS. 5, 6, 7, and 10, base end tapers 258 and 260 extend substantially around base ends 38 and 40 opposite central rib 46, and while base end faces 352 and 354 may extend downward substantially around base ends 38 and 40, preferably, base end faces 352 and 354 are substantially centered in base ends 38 and 40 opposite central rib 46 and extend downward from outer surfaces 66 and 68 to the central portion of base end tapers 258 and 260, respectively.

Referring to FIGS. 2-7, 12-15, 19-21, and 23-25, first base end 38 has a first base bumper 120 and second base end 40 has a second base bumper 122, the base bumpers 120 and 122, extending from tapers 258 and 260 angularly away from base ends 38 and 40 and/or away from tubes 28 and 30 and/or coupling 26 when mounted, respectively, for shielding u-bolt 124 and bi-directionally guiding cable guard 20. While bumpers 120 and 122 may extend with any angular, curvilinear, or arcuate shape, referring to FIGS. 4, 5, and 12, preferably, bumpers 120 and 122 extend angularly and transition to tapers 258 and 260. Advantageously, bumpers 120 and 122 prevent objects or irregularities in the casing from contacting, breaking, and/or dislodging u-bolt 124; and, like other elements that reduce or prevent uncontrollable detachment of u-bolt 124, reduce the likelihood of personal injuries.

The base ends 38 and 40 also include elements for rotating u-bolt 124. Referring to FIGS. 2-5, 10-12, 14, 19, 21, and 23-24, first base end 38 includes a first u-bolt slot 116 and second base end 40 includes a second u-bolt slot 118, the u-bolt slots 116 and 118, each substantially centered and extending inwardly in base ends 38 and 40 adjacent to bumpers 120 and 122, respectively, for rotating u-bolt legs 140 and 142 through base ends 38 and 40. Preferably, referring to FIG. 11, u-bolt slots 116 and 118 are substantially u-shaped and may be of any shape suitable for rotating u-bolt legs 140 and 142.

In FIGS. 2-7, 12-15, 19, 20-21, and 23-25, first base end 38 also includes a first hinge pin cover 209 and second base end 40 includes a second hinge pin cover 211, the hinge pin covers 209 and 211, each substantially opposite bumpers 120 and 122 and extending from tapers 258 and 260 angularly away from base ends 38 and 40 and/or away from tubes 28 and 30 and/or coupling 26 when mounted, adjacent to abutment receivers 94 and 96, respectively, for stiffening base ends 38 and 40 and shielding the rotatably and removable connection of base 22 and ring 24. While hinge pin covers 209 and 211 may extend with any angular, curvilinear, or arcuate shape, preferably, referring to FIGS. 7 and 12, hinge pin covers 209 and 211 extend from tapers 258 and 260 angularly away from base ends 38 and 40. In FIG. 14, showing the mounted cable guard 20, hinge pin covers 209 and 211 cooperate with bumpers 120 and 122 and other elements to bi-directionally guide cable guard 20. Advantageously, hinge pin covers 209 and 211 prevent irregularities from contacting, breaking, and/or dislodging hinge pins 106 and 108, described below; and, like other elements that reduce or prevent uncontrollable detachment of base 22 and ring 24, reduce the likelihood of personal injuries.

Referring to FIGS. 2-6, 12-14, and 19-24, first base end 38 includes a first abutment receiver 94 and second base end 40 includes a second abutment receiver 96, the abutment receivers 94 and 96, each substantially opposite u-bolt slots 116 and 118, respectively, and extending inwardly in base ends 38 and 40 adjacent to hinge pin covers 209 and 211, respectively. Preferably, abutment receivers 94 and 96 are as shown in FIGS. 5 and 23 and are adapted for aligning and receiving ring 24 into base 22.

Figure 19:
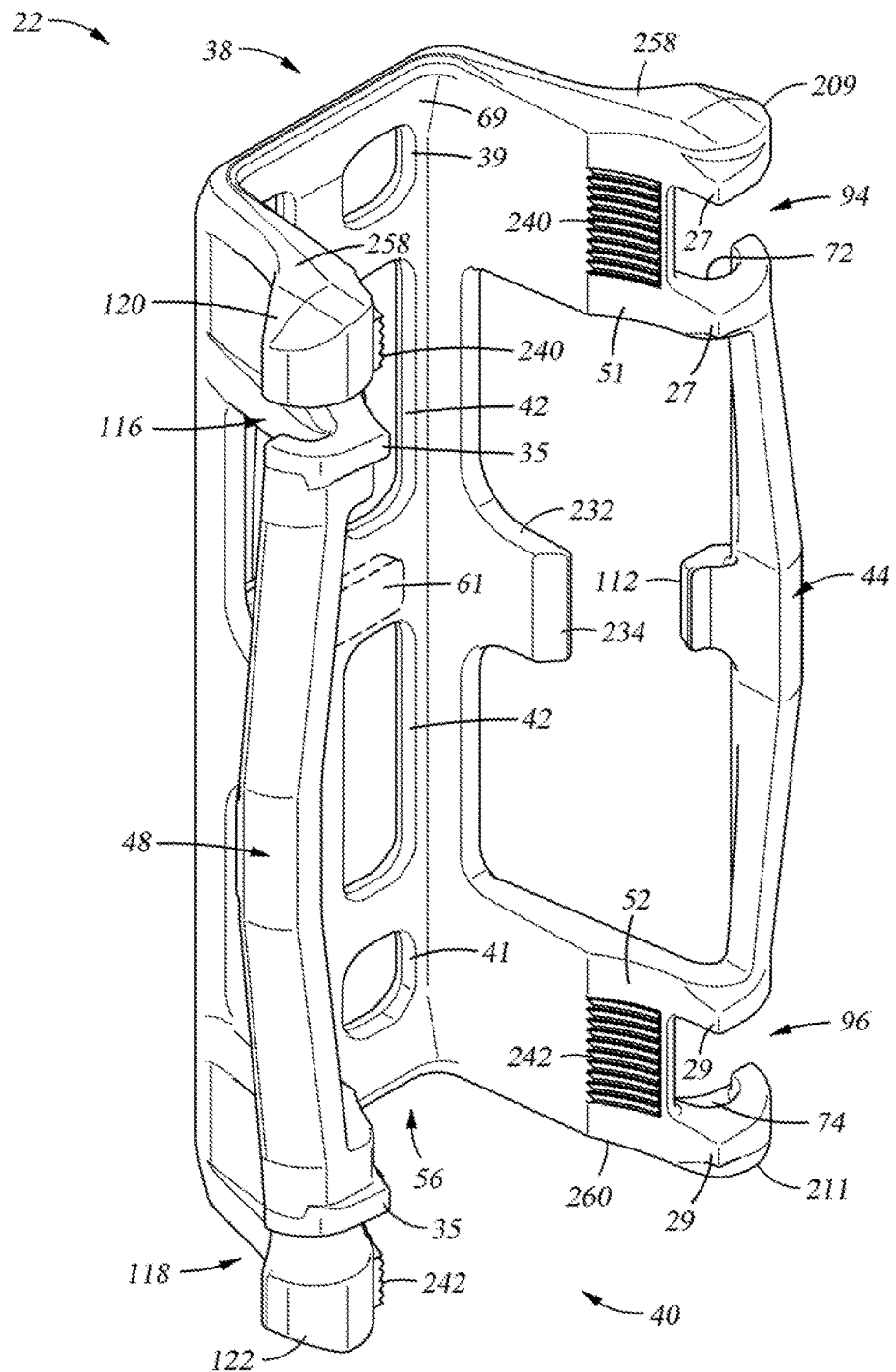
FIG. 19 is an isometric view of a base.
Figure 20:
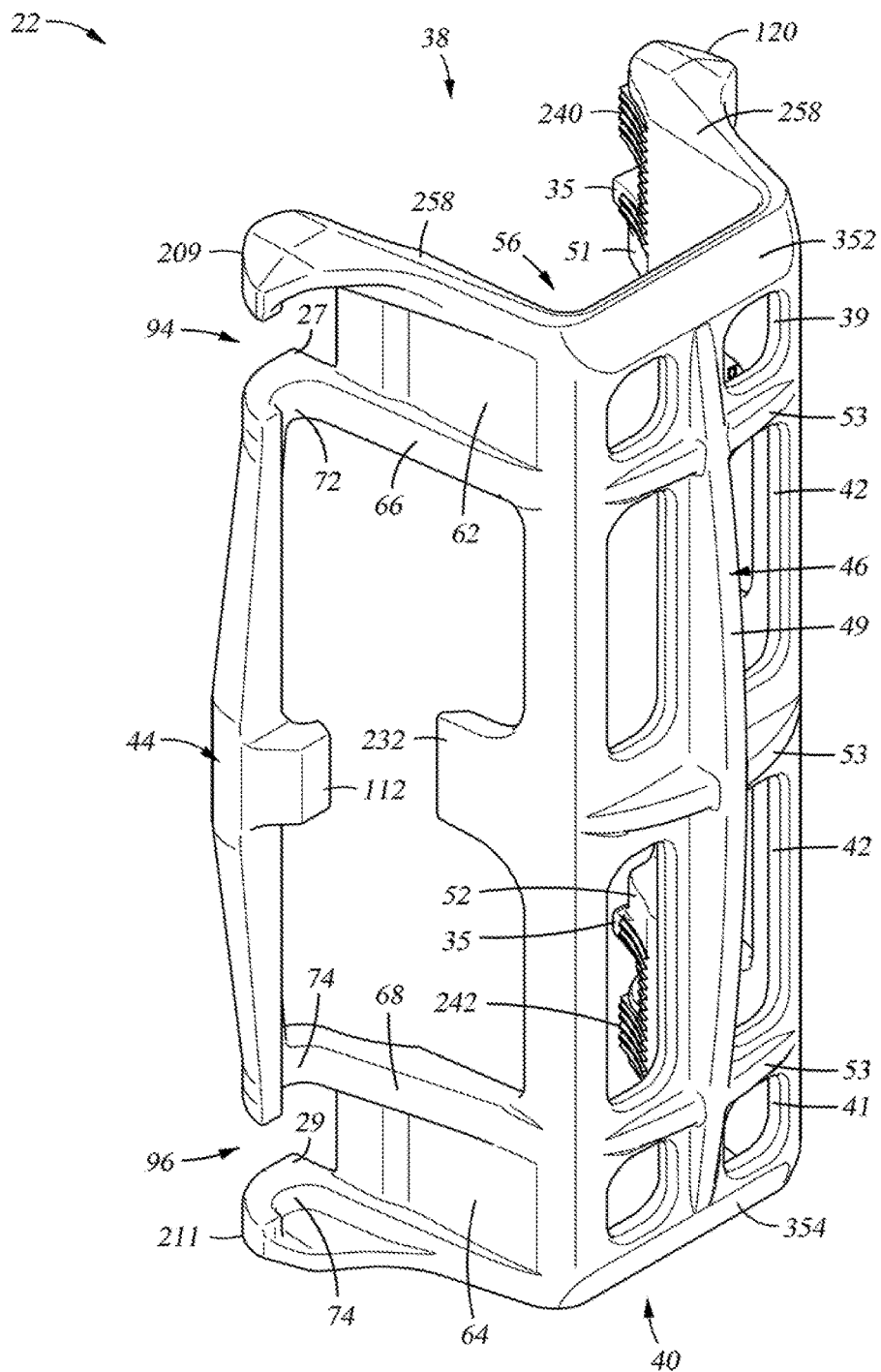
FIG. 20 is an isometric view of a base.
Figure 21:
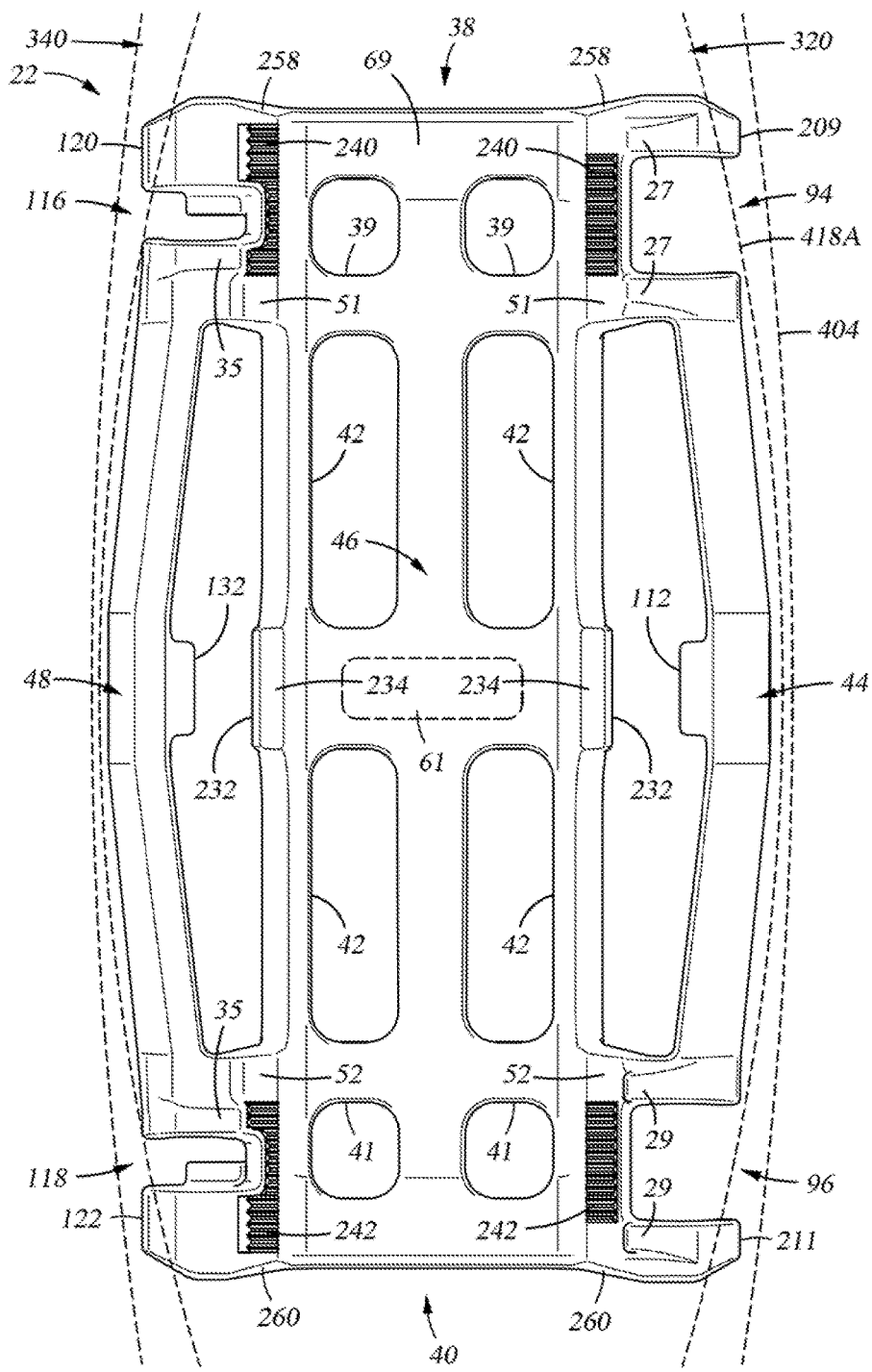
FIG. 21 is bottom view of a base that also shows portions of ellipsoids shown by the dashed lines separated from the surfaces of elements of the base for clarity with the base bumpers and hinge pin covers extending outside of the second base partial ellipsoid.

In FIGS. 2-6, 7, 10, 19-20, 23, and 26, first base end 38 has a first base end hinge pin receiver 72 and second base end 40 has a second base end hinge pin receiver 74, the hinge pin receivers 72 and 74, adapted for rotatably and removably connecting base 22 and ring 24. Preferably, as shown in FIGS. 20 and 23, hinge pin receivers 72 and 74 extend substantially perpendicularly away from base ends 38 and 40 and/or away from tubes 28 and 30 and/or coupling 26 when mounted, on each side of abutment receivers 94 and 96 have an arcuate shape extending substantially coaxially from hinge pin covers 209 and 211 to hinge receiving rib 44. Similarly, in FIGS. 23 and 26, first base end 38 has a first base end u-bolt receiver 70 and second base end 40 has a second base end u-bolt receiver 71, the u-bolt receivers 70 and 71, adapted for receiving and rotatably and removably connecting u-bolt 124. Preferably, as shown in FIGS. 20 and 23, u-bolt receivers 70 and 71 extend substantially perpendicularly away from base ends 38 and 40 and/or away from tubes 28 and 30 and/or coupling 26 when mounted, and adjacent to u-bolt slots 116 and 118 and co-axially along base ends 38 and 40 toward each other.

Figure 13:
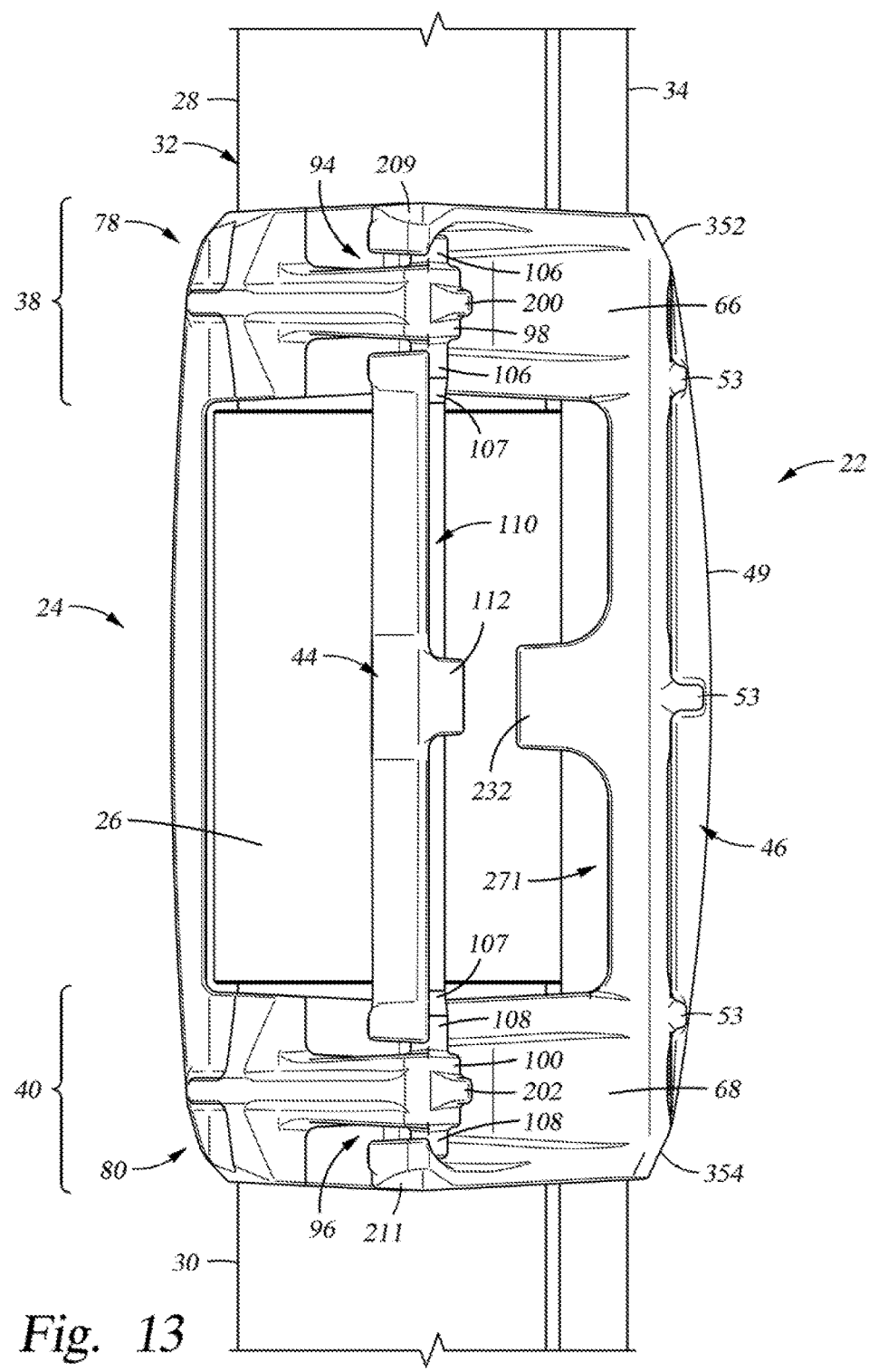
FIG. 13 is a side view of an assembled cable guard mounted on a tubing string enclosing and protecting cables of the side opposite FIG. 11.

Generally, referring to FIG. 2, hinge receiving rib 44, a central rib 46, and a u-bolt receiving rib 48 connect base ends 38 and 40. Preferably, referring to FIGS. 2-5, 10, 11, 13-18, 20-26, central rib 46 is substantially u-shaped and centrally positioned between hinge receiving rib 44 and u-bolt receiving rib 48 and extends substantially perpendicular to and between base ends 38 and 40; however, central rib 46 may be of any shape and position suitable for connecting base ends 38 and 40. Referring to FIGS. 19, 21, 23, preferably, u-bolt receiving rib 48 extends between u-bolt receivers 70 and 71 and hinge receiving rib 44 extends between hinge receivers 72 and 74, and hinge receiving rib 44 is shorter than u-bolt receiving rib 48. Referring to FIG. 13, hinge receiving rib 44, u-bolt receiving rib 48, and central rib 46 may be of any length and configuration and extend to any portion of base ends 38 and 40 that suitably connects base ends 38 and 40.

Referring to FIGS. 2-5, 9A, 10-11, 20, 22-24, and 35, first base end 38 may include a pair of first lightering channels 62 and second base end 40 may include a pair of second lightering channels 64, the lightering channels 62 and 64, for reducing weight, stiffening base ends 38 and 40, aligning base 22 and ring 24 for assembly, and protecting the rotatable and removable connections of base 22 and ring 24 and u-bolt 124. Preferably, as shown in FIGS. 2 and 23, each pair of lightering channels 62 and 64 are substantially centered in base ends 38 and 40, and extending substantially opposite each other from abutment receivers 94 and 96 and u-bolt slots 116 and 118, respectively.

Referring to FIGS. 2-5, 7, 10, 14, and 19-21, central rib 46 may include a plurality of central rib slots 42, and first base end 38 may include a pair of first base end slots 39 and second base end 40 may include a pair of second base end slots 41, the base end slots 39 and 41. Preferably, as shown in FIG. 10, plurality of central rib slots 42 have a substantially rectangular shape and base end slots 39 and 41 have a substantially square shape, located on each side of the longitudinal axis of central rib 46 or a base longitudinal stiffener 49, described below, and extending substantially between cross-sectional stiffeners 53; however, plurality of central rib slots 42 and base end slots 39 and 41 may be at any position and be of any shape that provides for inspection of cables 34, 36, and 37 when the present invention is mounted and/or reduces weight and costs.

Figure 12:
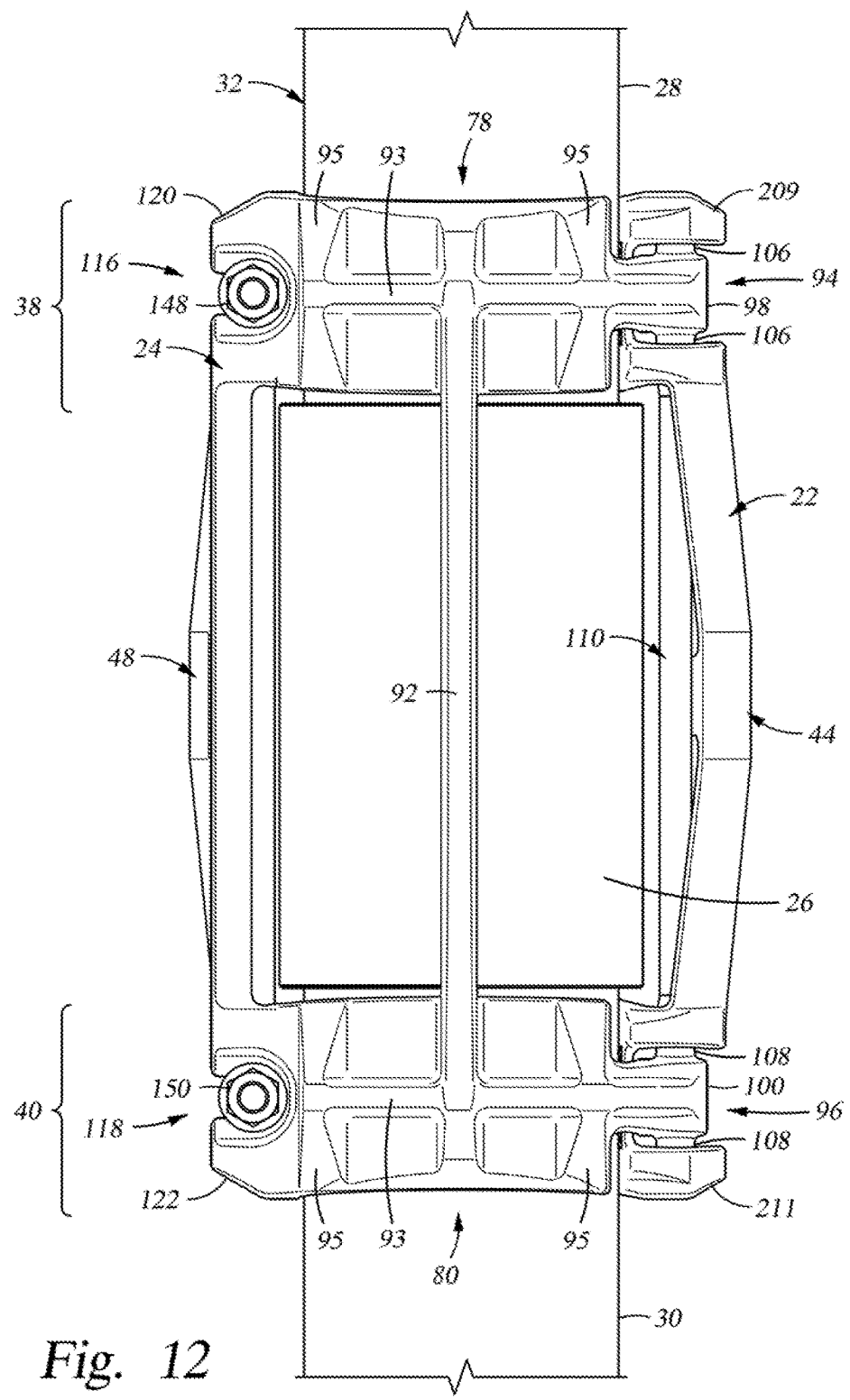
FIG. 12 is a side view of assembled cable guard mounted on a tubing string enclosing and protecting cables with the ring in foreground and base in background.

Elements may be included to provide flexibility, resist bending, and prevent crushing of central rib 46 and damage to cables 34, 36, and 37. Referring to FIGS. 13, 14, 17, and 23, central rib 46 may include a pair of crushing resistors 232. Referring to FIGS. 13, 14, 17, and 23, pair of crushing resistors 232 are substantially opposite each other, substantially centered between base ends 38 and 40, and extending substantially perpendicular inwardly from central rib 46 and/or toward tubes 28 and 30 and/or coupling 26 when mounted. While pair of crushing resistors 232 are shown in FIGS. 13 and 14 having a substantially rectangular cross section, pair of crushing resistors 232 may be of any shape and extend at any angle to central rib 46 that is adapted for providing flexibility, resisting bending by contacting tubes 28 and 30 and/or coupling 26, and preventing crushing of central rib 46 and crushing or damage to the cables 34, 36, and 37. While crushing resistors 232 are shown in FIG. 12 positioned opposite each other, crushing resistors 232 may be any relative configuration or offset from each other, and preferably, pair of crushing resistors 232 are configured as shown in FIGS. 13, 14, and 17. Referring to FIGS. 13, 14, and 17, the distal end of each of pair of crushing resistors 232 may also include a bearing face 234 adapted for matingly contacting outside surface of tubes 28 and 30 and/or coupling 26 to transmit forces, resist bending, and prevent damage. Preferably, as shown in FIG. 17, to provide flexibility, pair of crushing resistors 232 and/or bearing faces 234 are not in contact with coupling 26 and pair of crushing resistors 232 are adapted to be within substantially about one-eighth inch (⅛") of the outside surface of coupling 26.

Next, referring to FIGS. 2-5, 7-8, 10, 13, and 14, base 22 may include a base longitudinal stiffener 49 extending outwardly from base 22 between base end faces 352 and 354 and/or a plurality of base cross-sectional stiffeners 53. Preferably, referring to FIG. 14, base longitudinal stiffener 49 is substantially centered in base ends 38 and 40 and central rib 46 and extends substantially between base end faces 352 and 354, and plurality of base cross-sectional stiffeners 53 are spaced apart and extend outwardly from base 22 and/or away from tubes 28 and 30 and/or coupling 26 when mounted, and substantially perpendicular to base longitudinal stiffener 49 for stiffening base ends 38 and 40 and central rib 46 and preventing crushing of base ends 38 and 40 and central rib 46 and crushing or damage to cables 34, 36, and 37 and bi-directionally guiding. Referring to FIG. 14, preferably, base longitudinal stiffener 49 and plurality of base cross-sectional stiffeners 53 have an elliptical or curvilinear shape adapted for cooperating with other elements of the present invention for bi-directionally guiding; however, base longitudinal stiffener 49 and plurality of base cross-sectional stiffeners 53 may be of any cross-sectional shape and length suitable for stiffening and preventing crushing and crushing or damage to cables 34, 36, and 37. For example, base longitudinal stiffener 49 between base end faces 352 and 354, and plurality of base cross-sectional stiffeners 53 might not extend across base ends 38 and 40. The base longitudinal stiffener 49 and plurality base cross-sectional stiffeners 53 might not be used in all applications or in combinations with each other or cooperation with the below-described pair of crushing resistors 232 or in relatively small casings because the design circle 8 may be too small; or, alternatively base longitudinal stiffener 49 and plurality of base cross-sectional stiffeners 53 may be included in central rib 46 and may not extend partially across base ends 38 and 40 or between base end faces 352 and 354.

Figure 4:
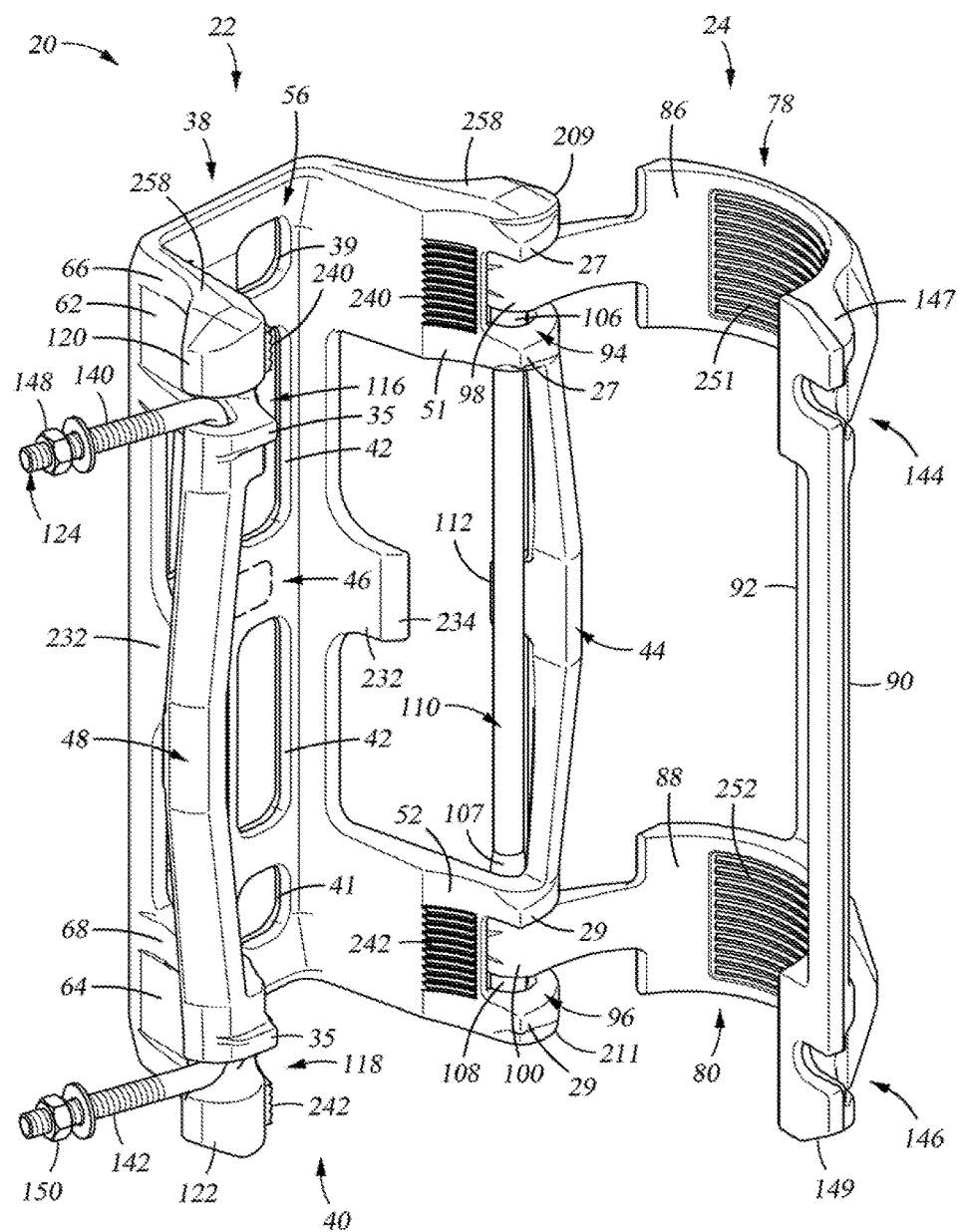
FIG. 4 is an isometric view of the inside of an assembled cable guard operatively opened to receive a tubing string and protect cables in accordance with the present invention, showing the base, ring, and u-bolt and the rotatably and removable connection of the base and ring and u-bolt and u-bolt engaging projection.
Figure 5:
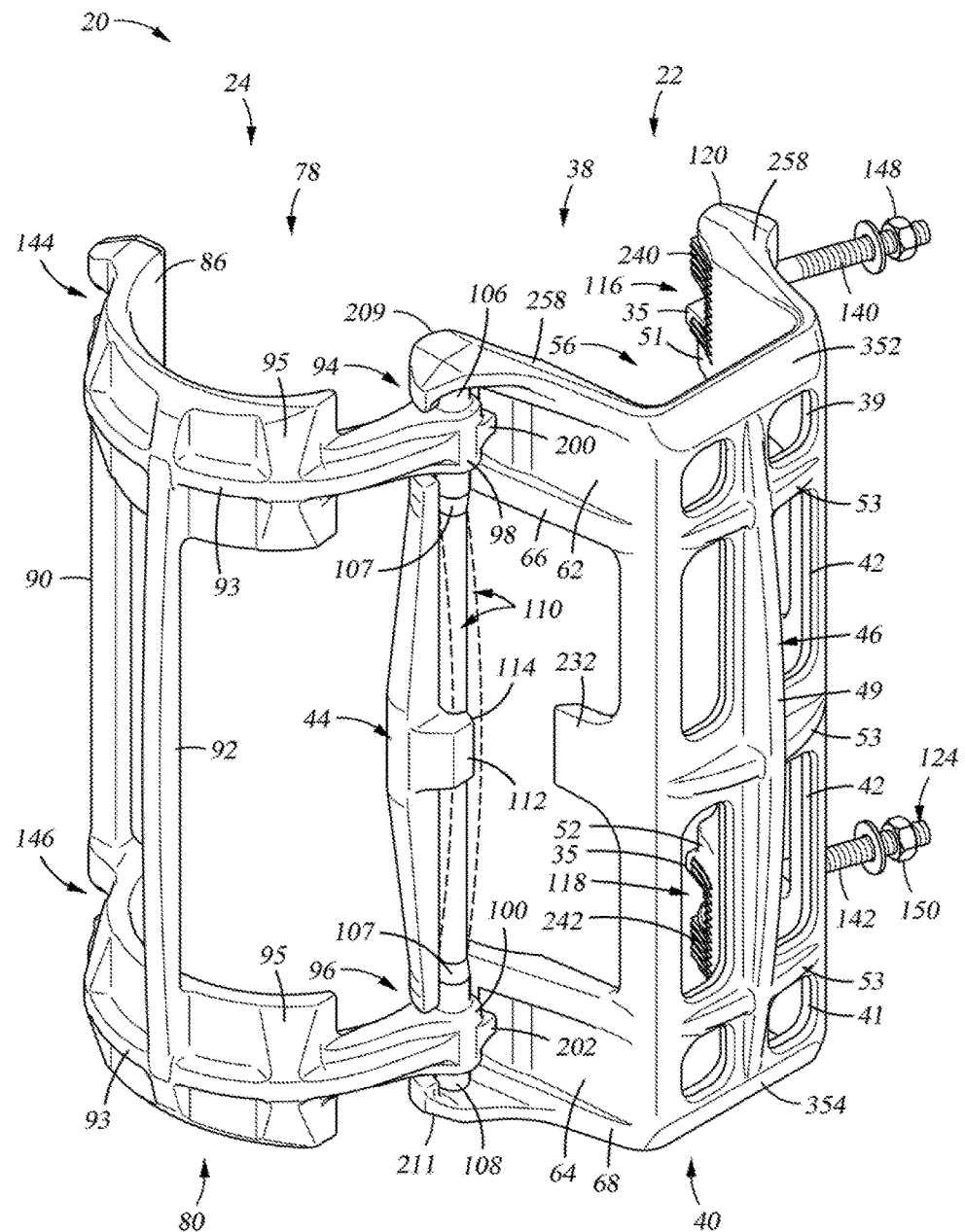
FIG. 5 is an isometric view of the outside of an assembled cable guard operatively opened to receive a tubing string and protect cables in accordance with the present invention showing the base, ring, and u-bolt and the rotatably and removable connection of the base and ring and u-bolt and u-bolt engaging projection and the hinge rod in position for a balanced assembly.
Figure 6:
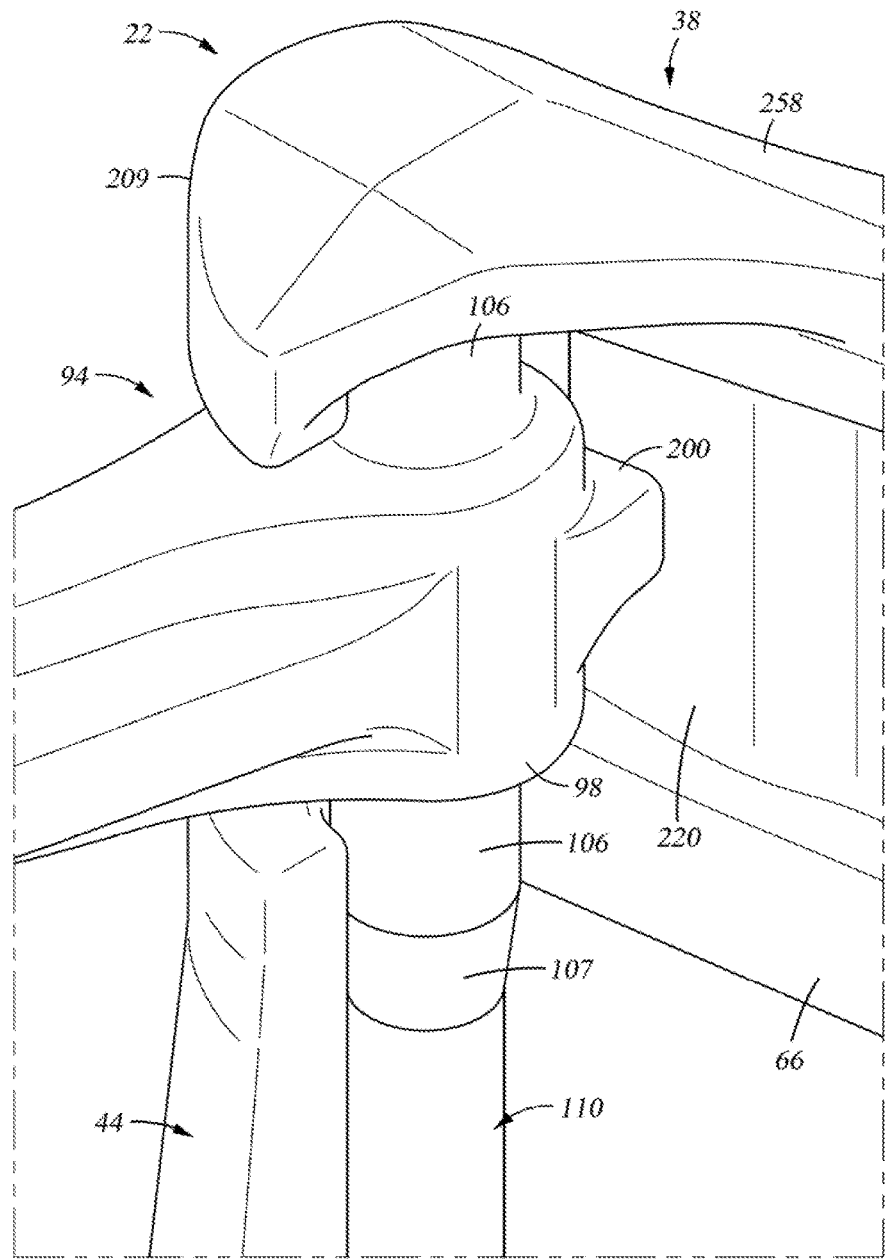
FIG. 6 is an isometric enlarged view of an assembled cable guard as shown in FIG. 5 showing the rotatably and removable connection of the base and ring with the first ring rotational stop contacting the first step and preventing over rotation of the ring and base.
Figure 7:
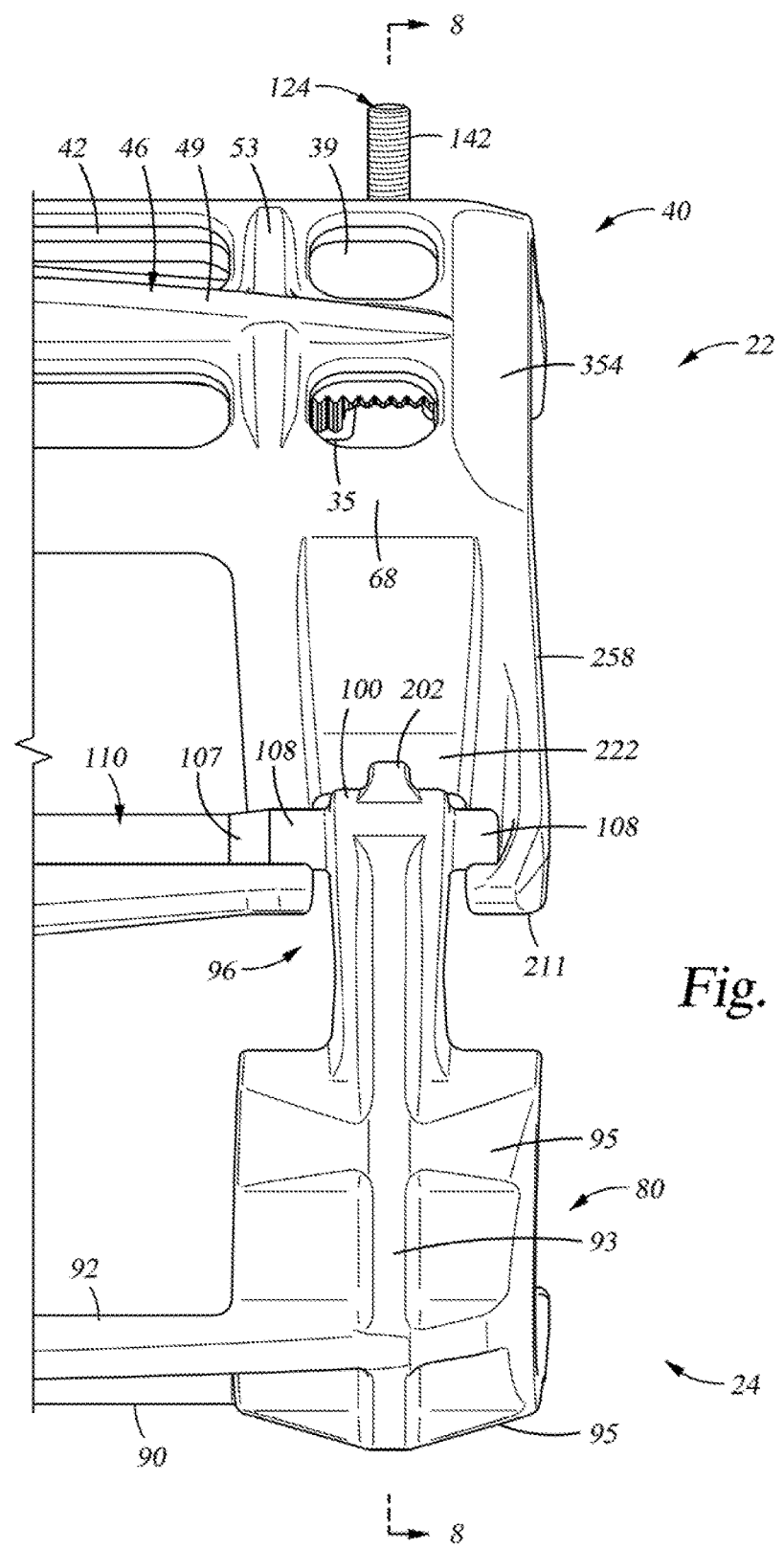
FIG. 7 is an orthographic view of an assembled cable guard as shown in FIG. 5 showing the rotatably and removable connection of the base and ring with the second ring rotational stop contacting the second step and preventing over rotation of the ring and base.

Additionally, referring to FIGS. 2-5, 15, 16, 17, 18A-B, 19, first base end 38 has a first base end primary cable protecting channel 56 and second base end 40 has a second base end primary cable protecting channel 58, the primary channels 56 and 58, substantially centered in and extending through base ends 38 and 40. Referring to FIGS. 6 and 7, preferably, primary channels 56 and 58 are substantially u-shaped and smoothly transition to central rib 46, as shown in FIG. 4. However, primary channels 56 and 58 may be non-symmetrical, off-center or offset from central rib 46 or each other, and have any shape that is adapted for protecting cables 34, 36, and 37.

Figure 41:
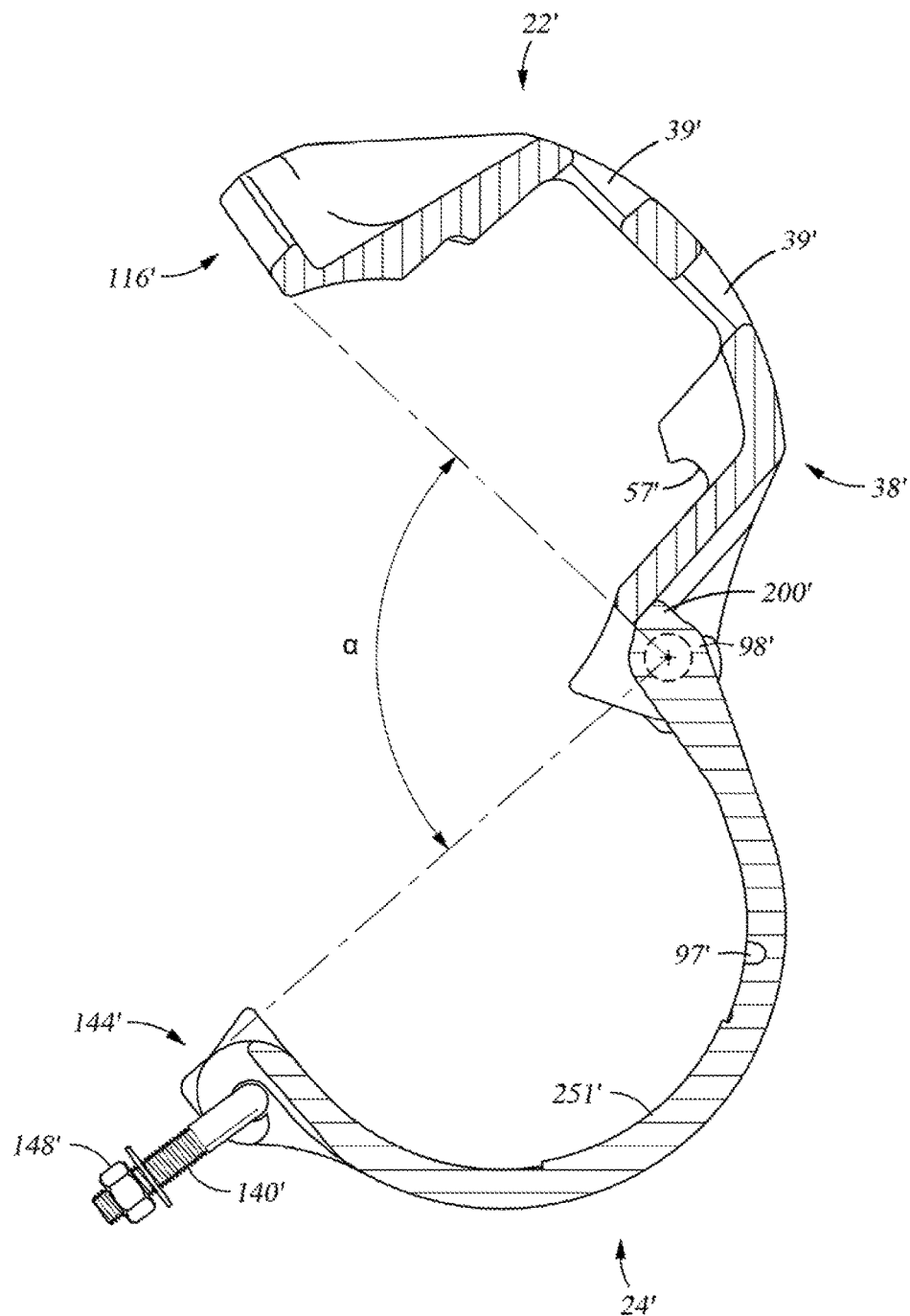
FIG. 41 is a is an end view of an assembled cable guard in the fully open position showing the opening angle, the rotatably and removable connection of the base and ring, the first ring rotational stop contacting the first base end, and the first u-bolt leg contacting the u-bolt rotational stop in accordance with the present invention.
Figure 42:
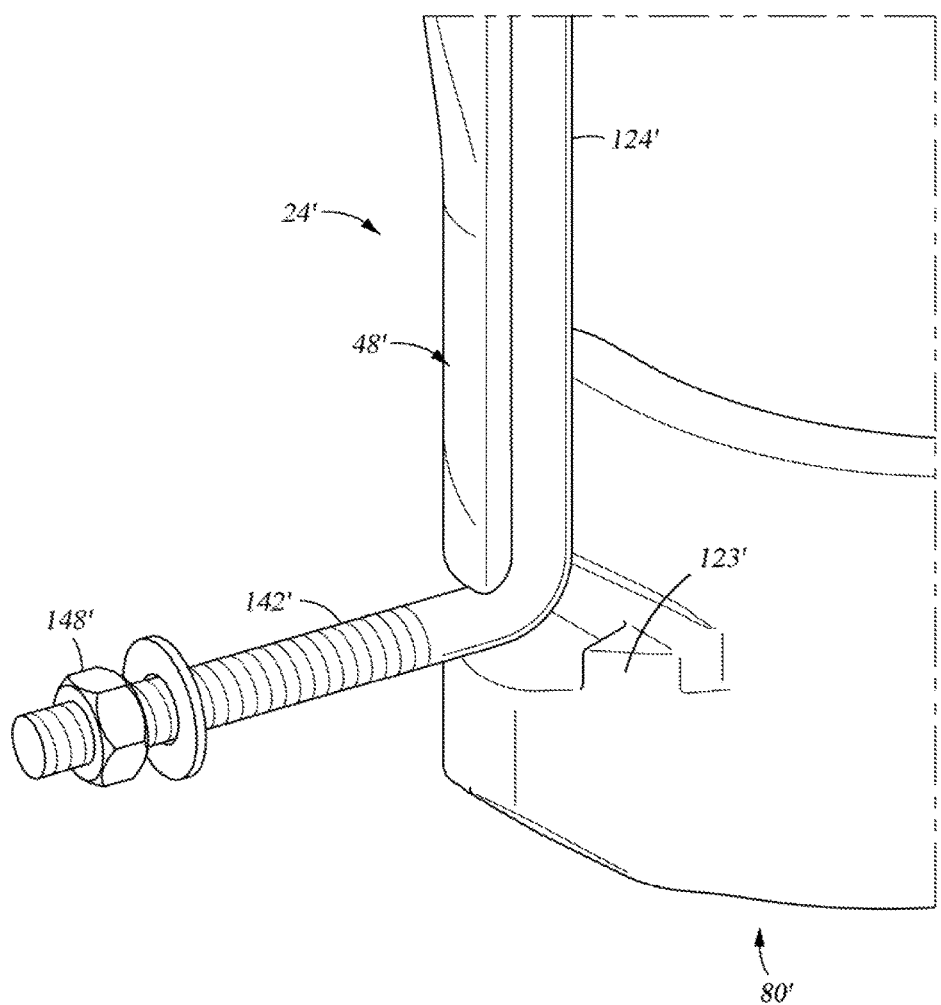
FIG. 42 is an isometric detail view of the second ring section showing the u-bolt and u-bolt rotational stops and tangent of the second u-bolt leg.
Figure 52:
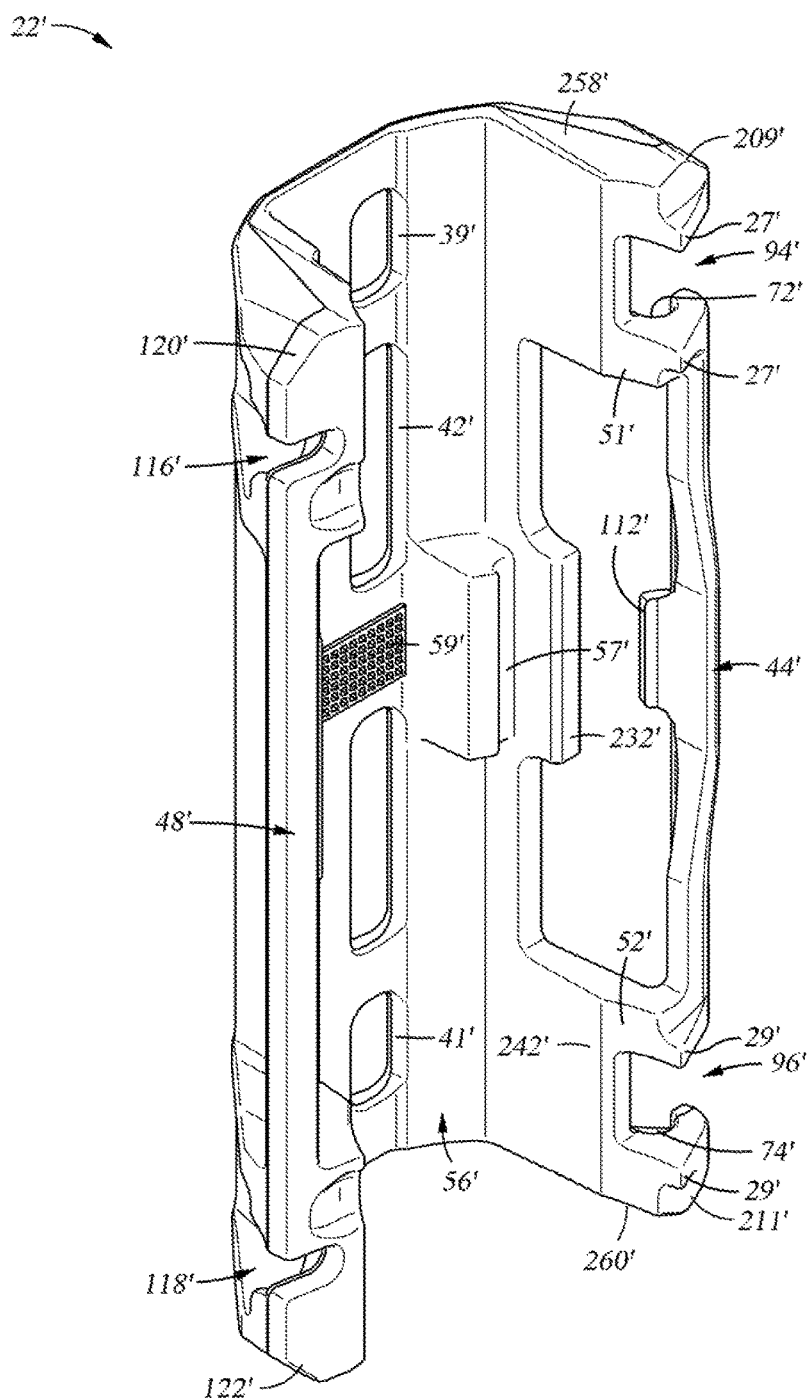
FIG. 52 is an isometric view of a base that also shows the location of a third channel for protecting cables.
Figure 53:
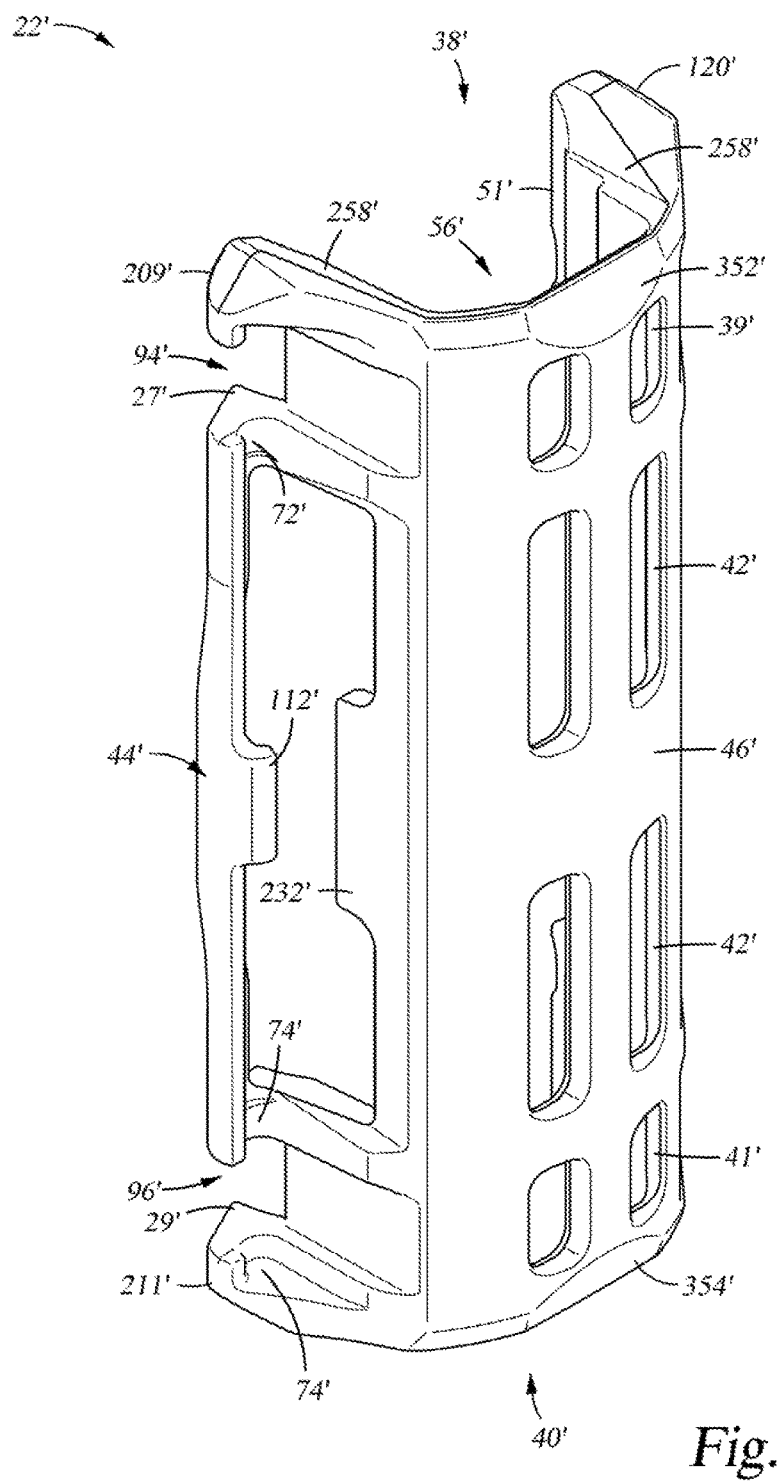
FIG. 53 is an isometric view of a base.
Figure 54:
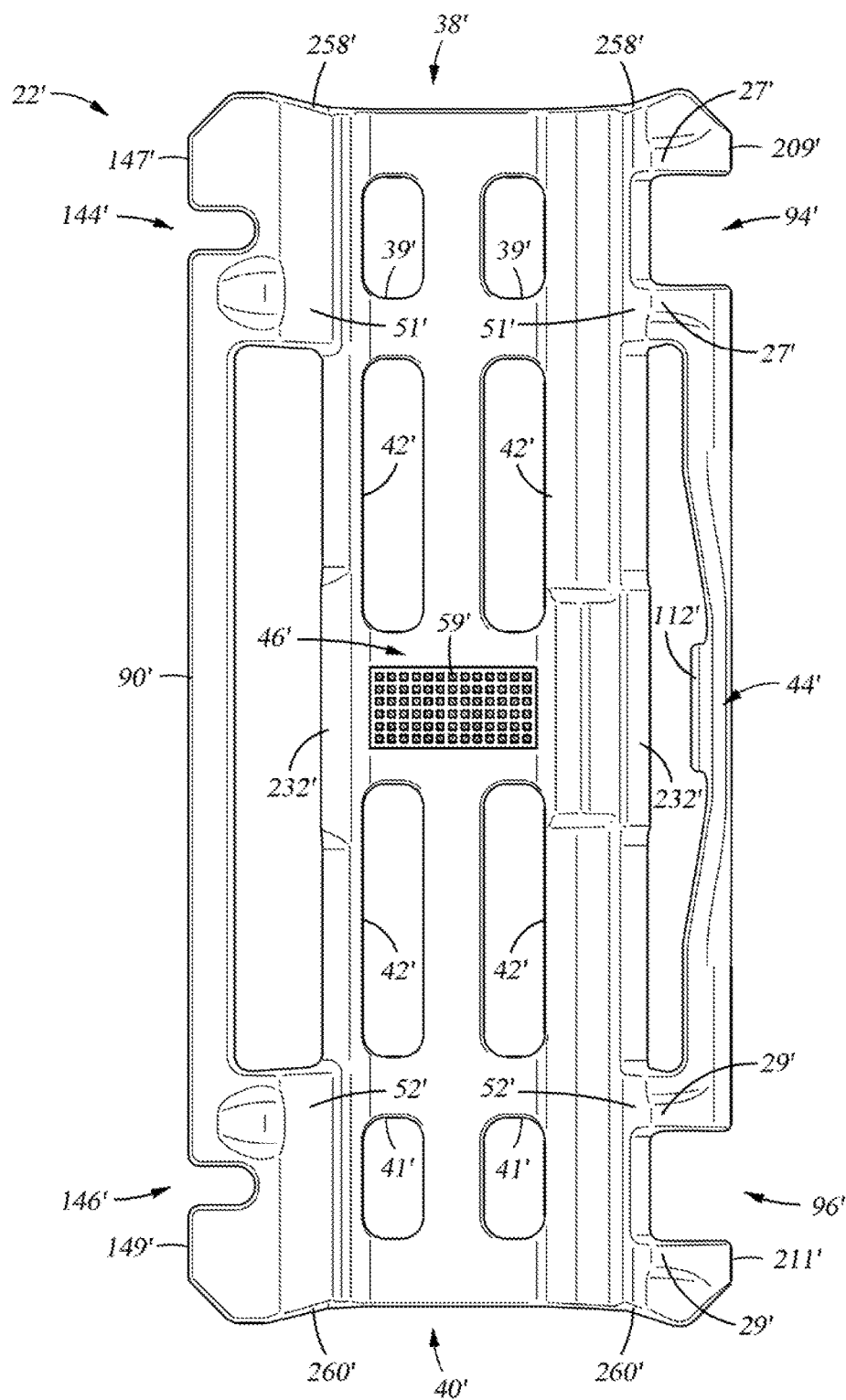
FIG. 54 is a bottom view of a base.
Figure 55:
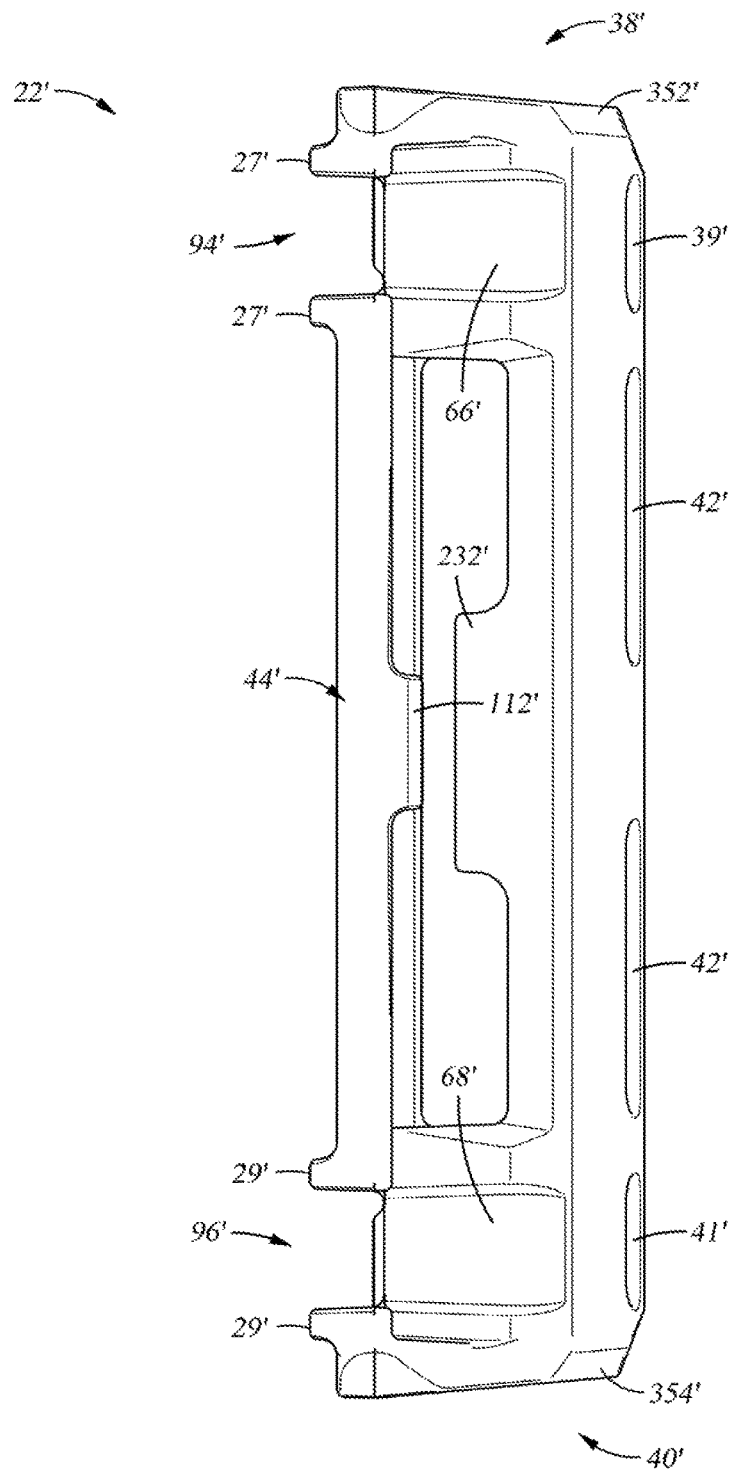
FIG. 55 is a side view of a base.
Figure 56:
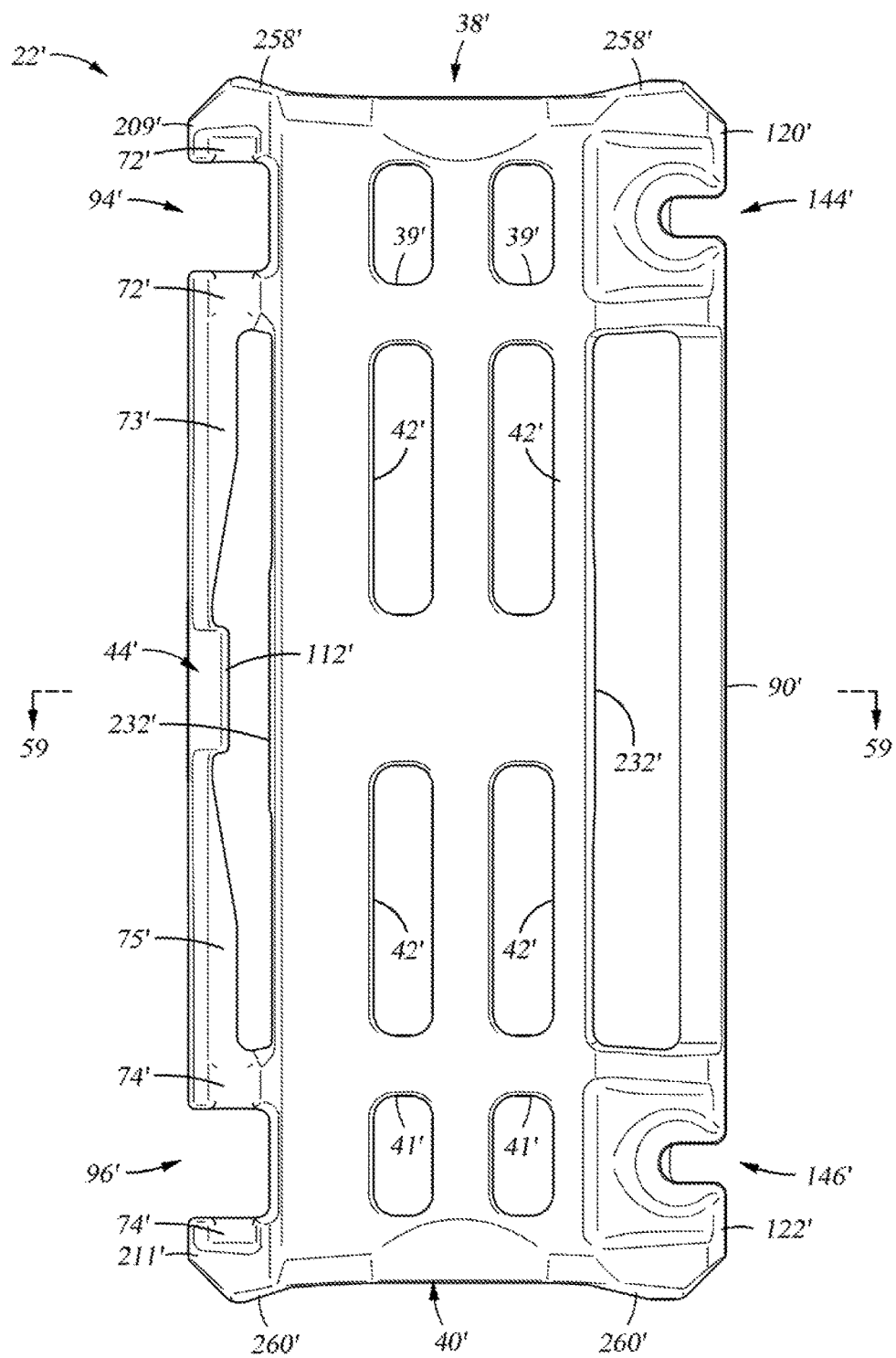
FIG. 56 is a side view of a base.
Figure 57:
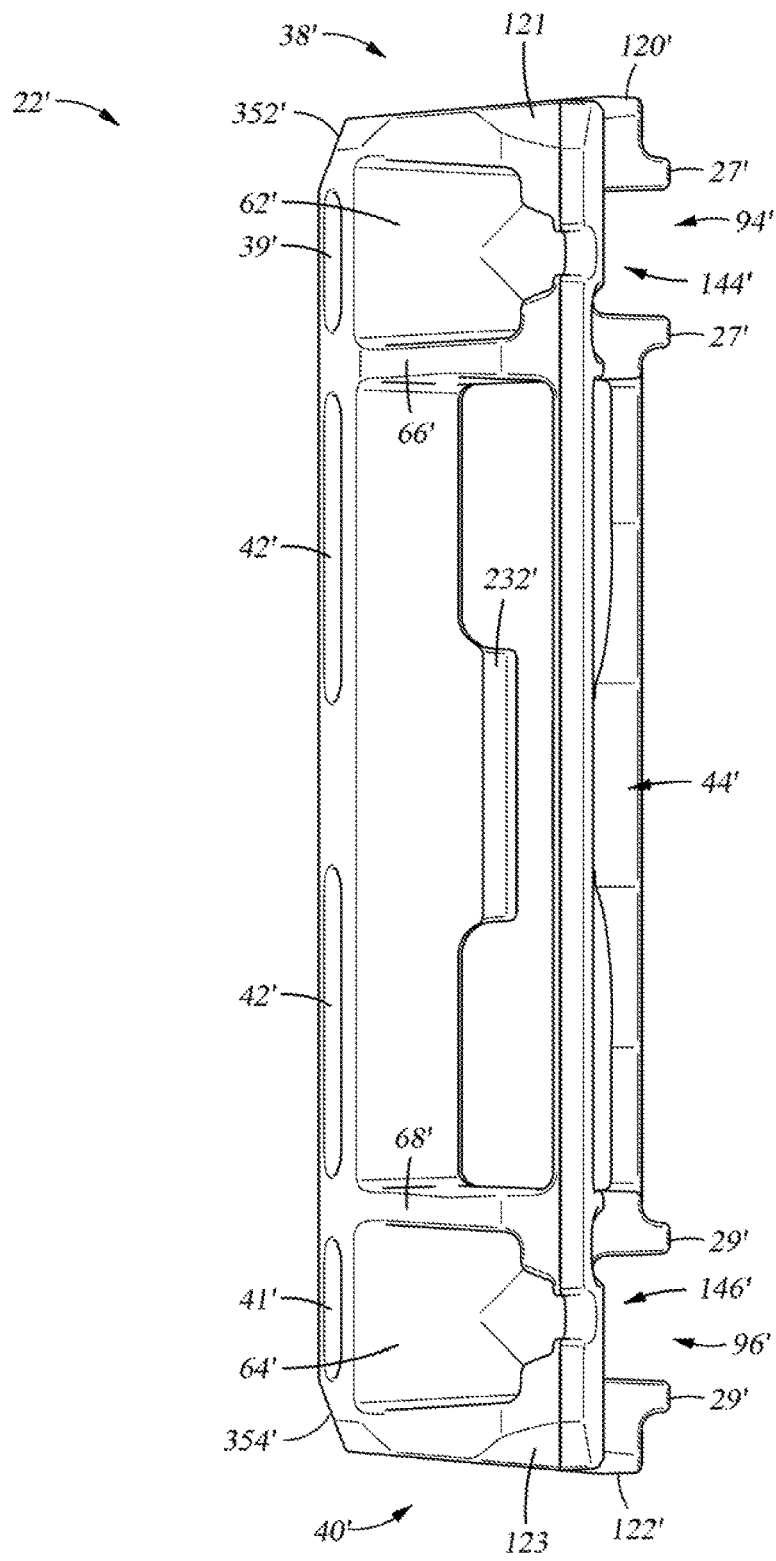
FIG. 57 is a side view of a base.
Figure 58:
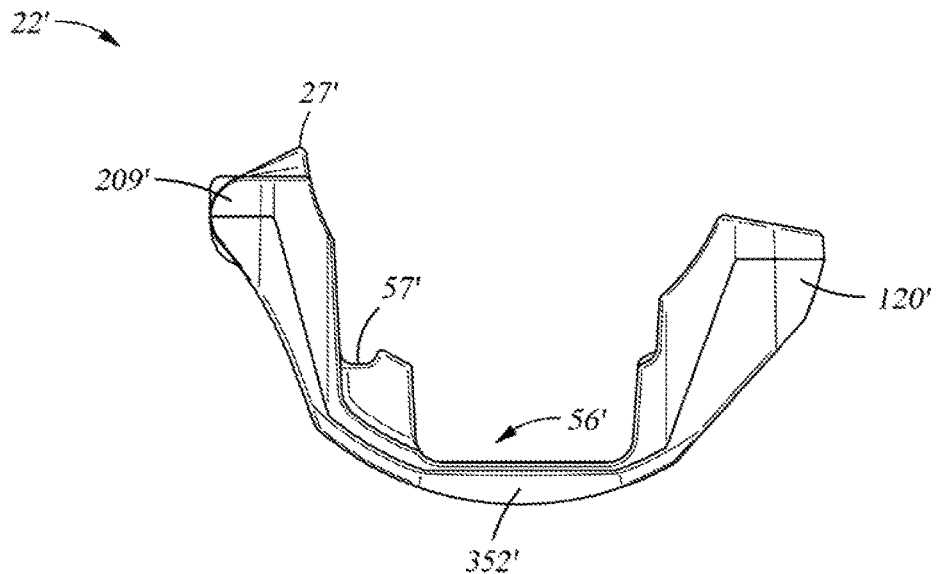
FIG. 58 is an end view of a base.
Figure 59:
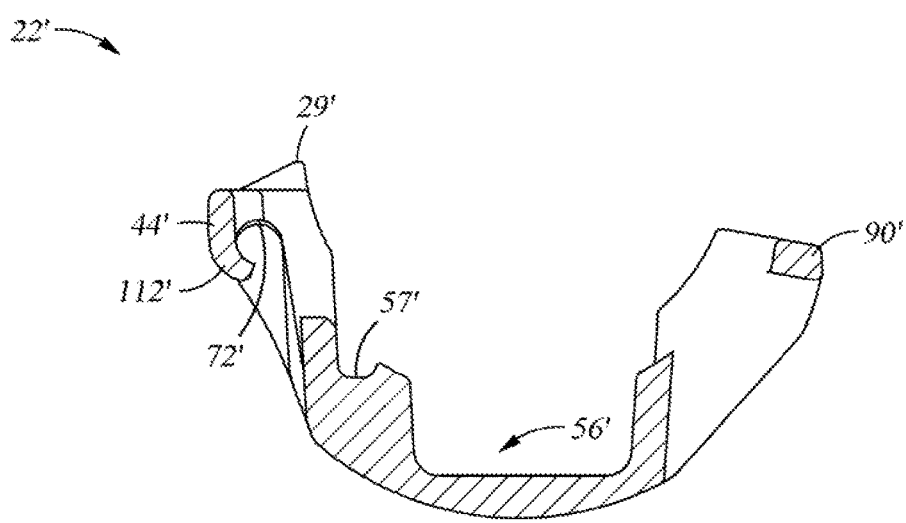
FIG. 59 is a cross-sectional view of a base.
Figure 60:
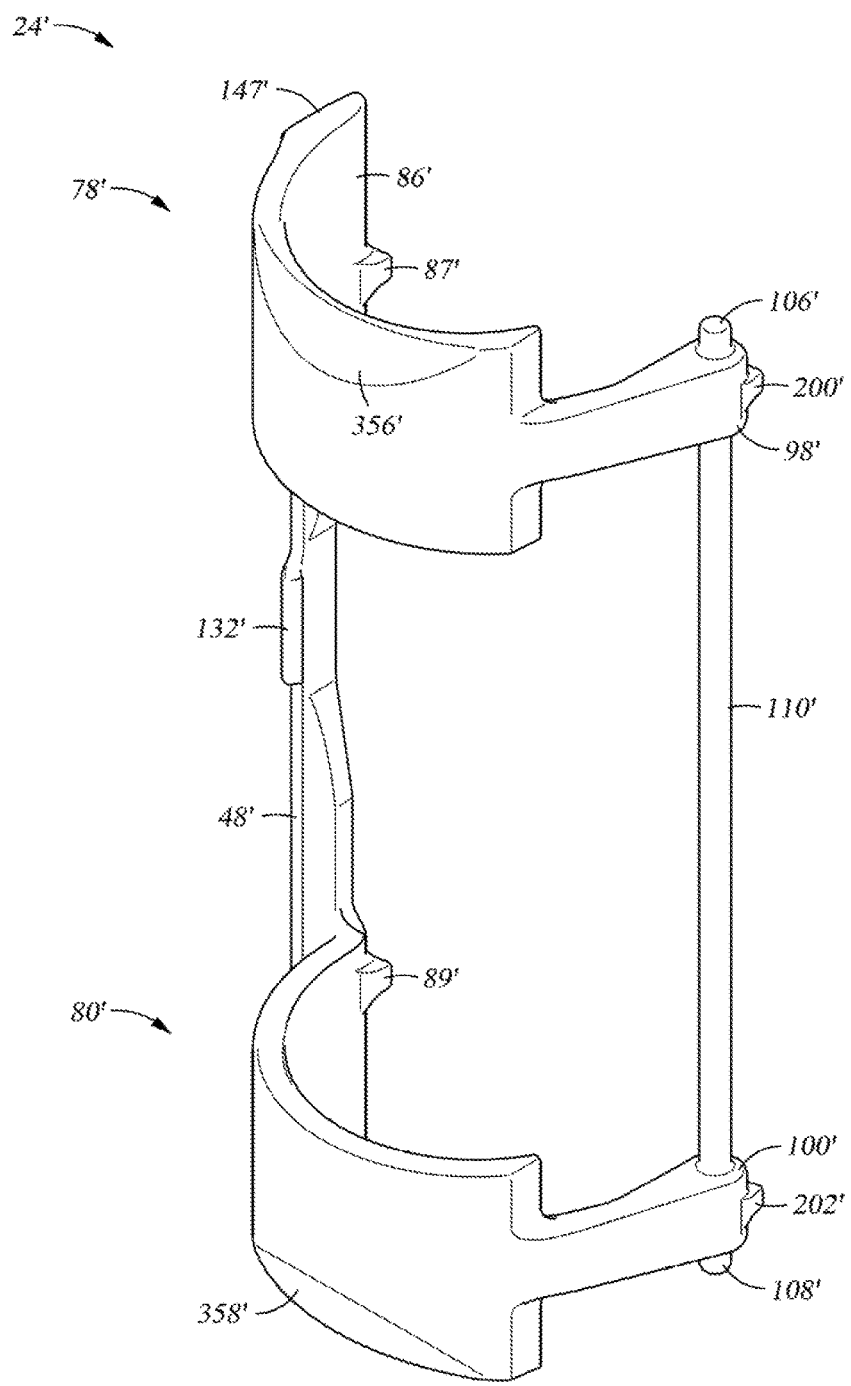
FIG. 60 is an isometric view of a ring.
Figure 61:
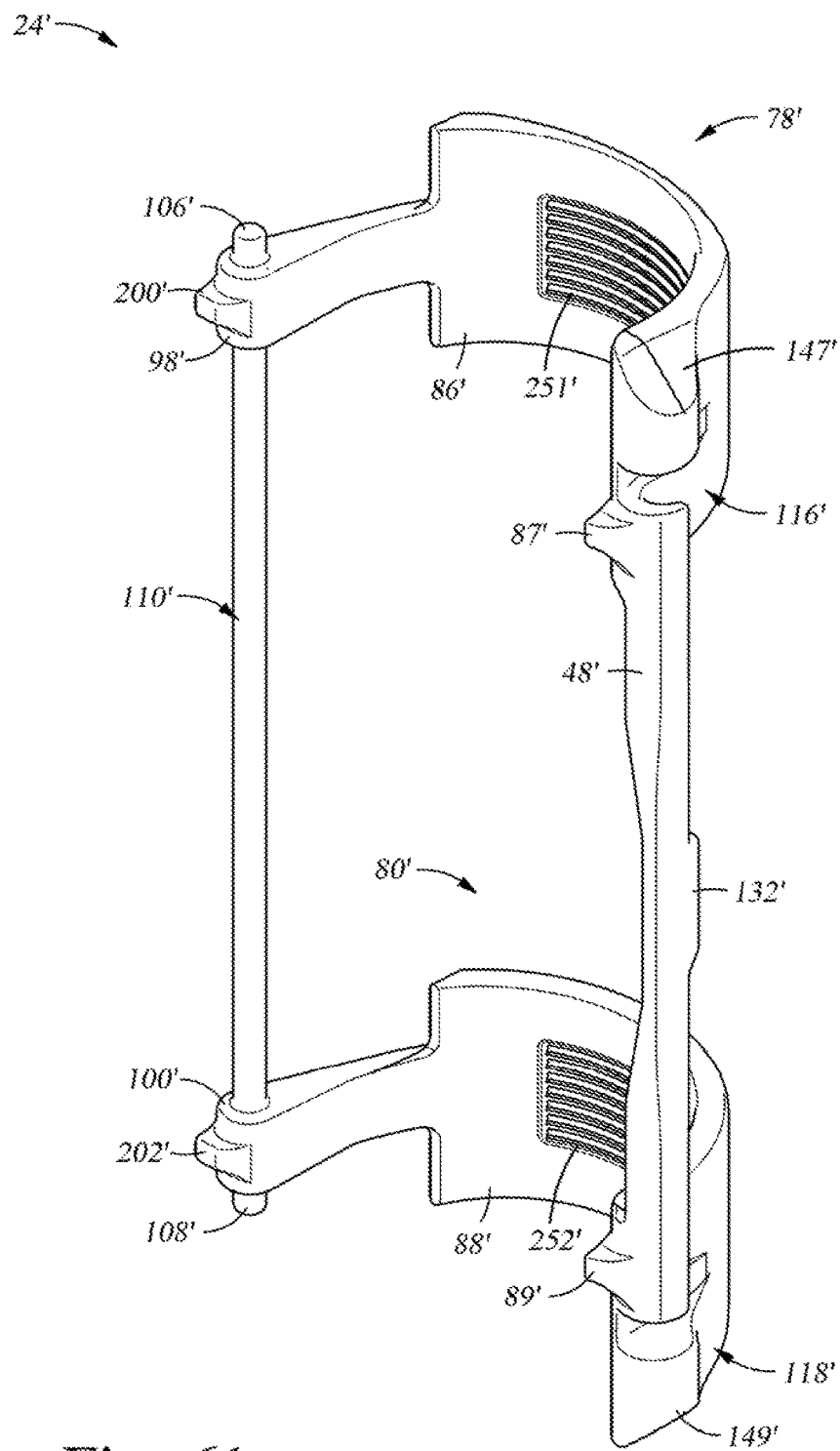
FIG. 61 is a bottom view of the inside of a ring.
Figure 68:
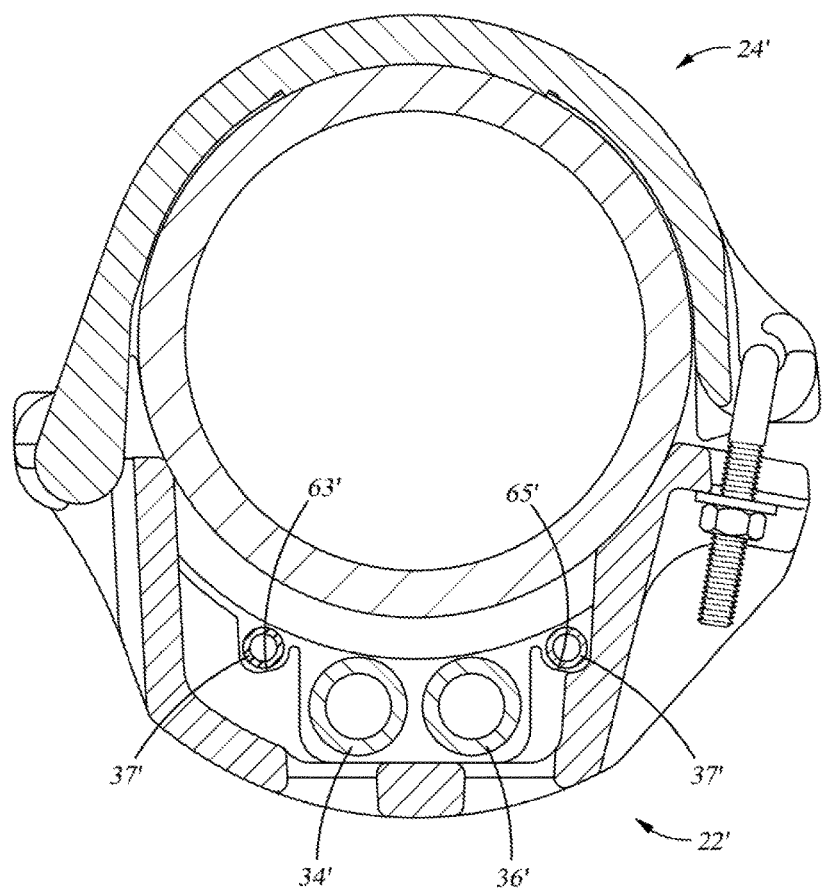
FIG. 68 is a cross-sectional view of a base showing an alternate embodiment of primary and secondary channels for protecting cables that may be used in the first and second embodiment of the present invention.

Referring to FIGS. 41, 52, and 68, first base end primary cable protecting channel 56 may include a third secondary channel 63' and second base end primary cable protecting channel 58 may include a fourth secondary channel 65', the secondary channels 63' and 65', and, referring to FIGS. 41, 52, and 68, shown in a different embodiment of the present invention, and central rib 46 may also include a third channel 57' for separating and protecting cables, 34, 36, and 37. Referring to FIGS. 41, 52, and 68, preferably, secondary channels 63' and 65' extend substantially parallel to and at least partially along primary channels 56 and 58. Referring to FIG. 41, third data channel 57', shown in a different embodiment, preferably extends substantially parallel to and at least partially along central rib 46. While FIG. 68 shows secondary channels 63' and 65' spaced apart and substantially opposite each other, secondary channels 63' and 65' may be located at any position in primary channels 56 and 58. The secondary channels 63' and 65', third channel 57', and primary channels 56 and 58 may be included in either of the first embodiment or second embodiment and each may have different cross-sectional shapes and coaxial alignment is not required. Users may have a preference to create curvature and bias cables by varying the cross-sectional shape and alignment of primary channels 56 and 58, secondary channels 63' and 65', and third channel 57'. While FIG. 68 shows secondary channels 63' and 65' and FIG. 41 shows third channel 57' having substantially unequal legged u-shape where the longitudinal axis of each is substantially parallel to the longitudinal axis of primary channels 56 and 58, the axis of each may be oriented in any position relative to the other and may have any cross-sectional shape that is adapted for providing separation and protection of cables. Advantageously, the present invention may include only one of secondary channels 63' and 65' could be required of any cross-sectional shape or the design could require only third channel 57' and the use of secondary channels 63' and 65' and third channel 57' of the present invention depend on cable types, sizing, and configuration.

Users may also prefer to transmit and receive data from downhole equipment, and referring to FIG. 17, ring sections 78 and 80 may include a data channel 97. Referring to FIG. 17, preferably, data channel 97 is in ring sections 78 and 80 extending across ring inner surfaces 86 and 88, respectively, and at least partially across tubing string 32 from any power cables to limit interference or signal noise and data channel 97 is substantially u-shaped where the longitudinal axis of data channel 97 is substantially parallel to the longitudinal axis of primary channels 56 and 58, the axis of each may be oriented in any position relative to the other and may have any cross-sectional shape that is adapted for providing separation and protection of cables. Finally, while primary channels 56 and 58, secondary channels 63' and 65', third channel 57', and/or ring data channel 97, may be arranged to bias cables or create a curvature in cables 34, 36, and 37, these channels are all preferably designed to fit and grip the cables that are being protected.

Referring to FIGS. 18A-B, cables 34, 36, and 37 are typically provided with a polytetrafluoroethylene, fluoropolymer, or armor, or other abrasion and cut resistant materials, and base ends 38 and 40 or central rib 46 and other elements engage and/or deform cables 34, 36, and 37 as shown in FIG. 18B and prevent slack from accumulating.

The primary channels 56 and 58 may include elements for biasing, gripping, and/or curving cables 34, 36, and 37. As shown in FIGS. 18A-B and 21, primary channels 56 and 58 may include a cable biasing slope 69 for biasing cables 34, 36, and/or 37 against tubes 28 and 30 and coupling 26 and creating a curvature in cables 34, 36, and 37.

Figure 22:
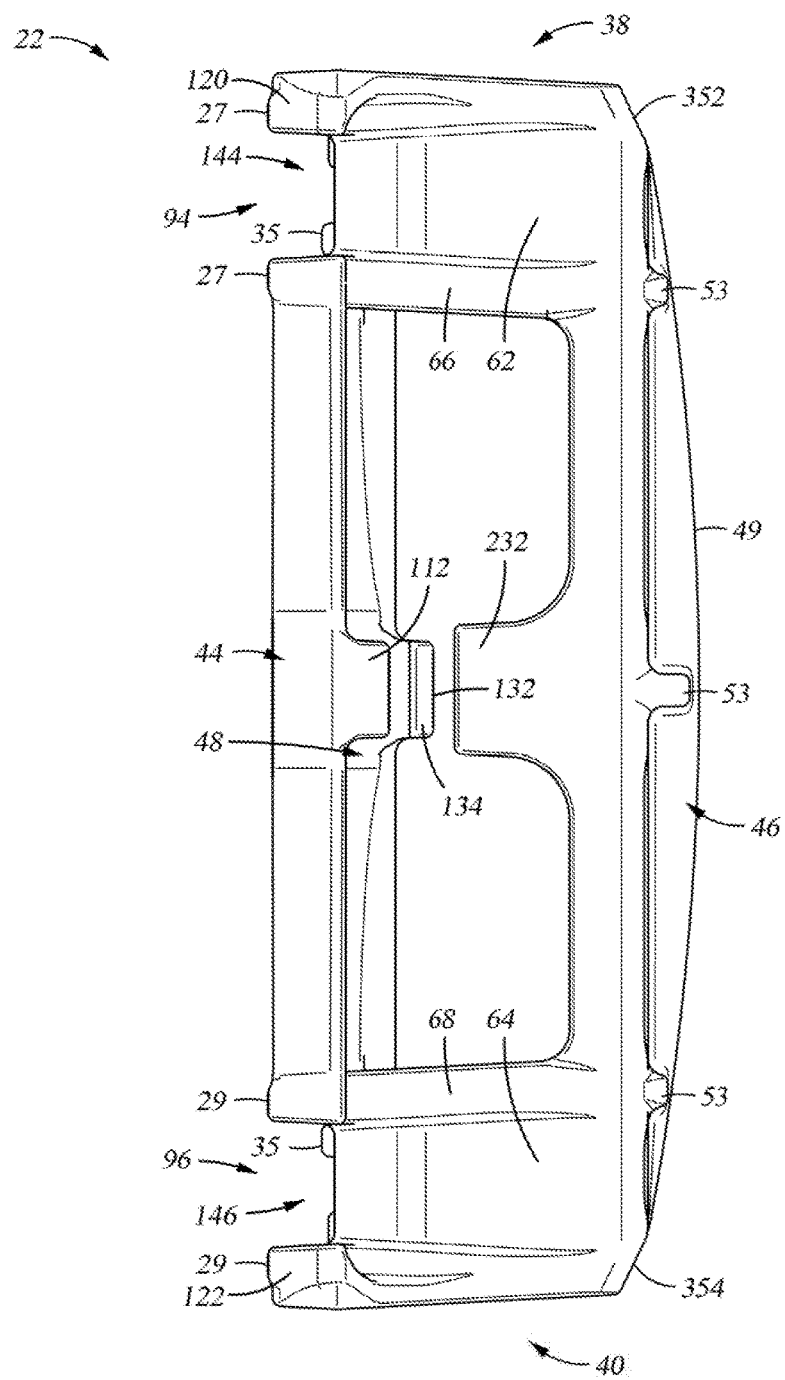
FIG. 22 is a side view of a base.

Preferably, as shown in FIGS. 18A and 21, cable biasing slope 69 is substantially opposite base end faces 352 and 354 extending across and outwardly from primary channels 56 and 58 and/or toward tubes 28 and 30 when mounted. Preferably, as shown in FIGS. 18A-B, 19, and 21, where cable biasing slope 69 is included, each of base ends 38 and 40 include at least one of plurality of base cross-sectional stiffeners 53 and base longitudinal stiffener 49 extends substantially between base end faces 352 and 354 as shown in FIGS. 3 and 22.

Referring to FIGS. 18A-B, 19, 21, and 23, in addition to or instead of cable biasing slope 69, central rib 46 may include an adjustment pad 61, extending downward from and centrally positioned in central rib 46 and/or toward coupling 26 for biasing cables 34, 36, and 37 against coupling 26 and/or cable biasing slope 69 and tubes 28 and 30. The adjustment pad 61 is shown in FIG. 18A as extending into central rib 46, preferably, it is raised as shown in FIG. 18B and extends, and adjustment pad 61 may not be included where cable biasing slope 69 is included.

Referring to FIGS. 18A, 21, and 25-26, adjustment pad 61 may also include at least one array of cable gripping teeth 59 extending outward from adjustment pad 61 and/or toward coupling 26 for biasing cables 34, 36, and 37 against coupling 26 and gripping cables 34, 36, and 37 as shown in FIG. 18A. While FIG. 21 shows adjustment pad 61 by dashed lines as a reserved area for modifying tooling to accommodate changes in a well, FIG. 18A shows adjustment pad 61 extending a substantially uniform distance above central rib 46 and being substantially rectangular, and adjustment pad 61 and cable gripping teeth 59 may extend any uniform or non-uniform height and be of any shape capable of biasing and gripping cables 34, 36, and 37 and adjustment pad 61 may be substantially flush with central rib 46. The cable non-slip teeth 59 may be at any location in central rib 46 and are normally used where customers specify an armored cable and cable non-slip teeth 59 engage the ridges in the armor on the cable. Preferably, as shown in FIGS. 18A and 19, and 49, 52, and 54, for another embodiment, cable non-slip teeth 59 are pyramidal nodes less likely to have sharp edges. Advantageously, as shown in FIG. 18A, existing tooling might be modified where cable biasing slope 69 is included and adjustment pad 61 and/or cable gripping teeth 59 bias the cables.

When cable guard 20 is mounted as illustrated in FIGS. 10 and 13, primary channels 56 and 58, central rib 46, and crushing resistors 232 define a conduit 271 that protectively enclose cables 34, 36, and 37 leading to equipment that is not shown. Cables can be damaged during installation, and advantageously, as tubing string 32 is extended down a well, cables 34, 36, and 37 may be inspected from base ends 38 and 40 and conduit 271, preferably, as shown in FIGS. 10 and 13, conduit 271 is partially open by base end slots 39 and 41, plurality of central rib slots 42, and openings between base ends 38 and 40 and pair of crushing resistors 232.

Figure 11:
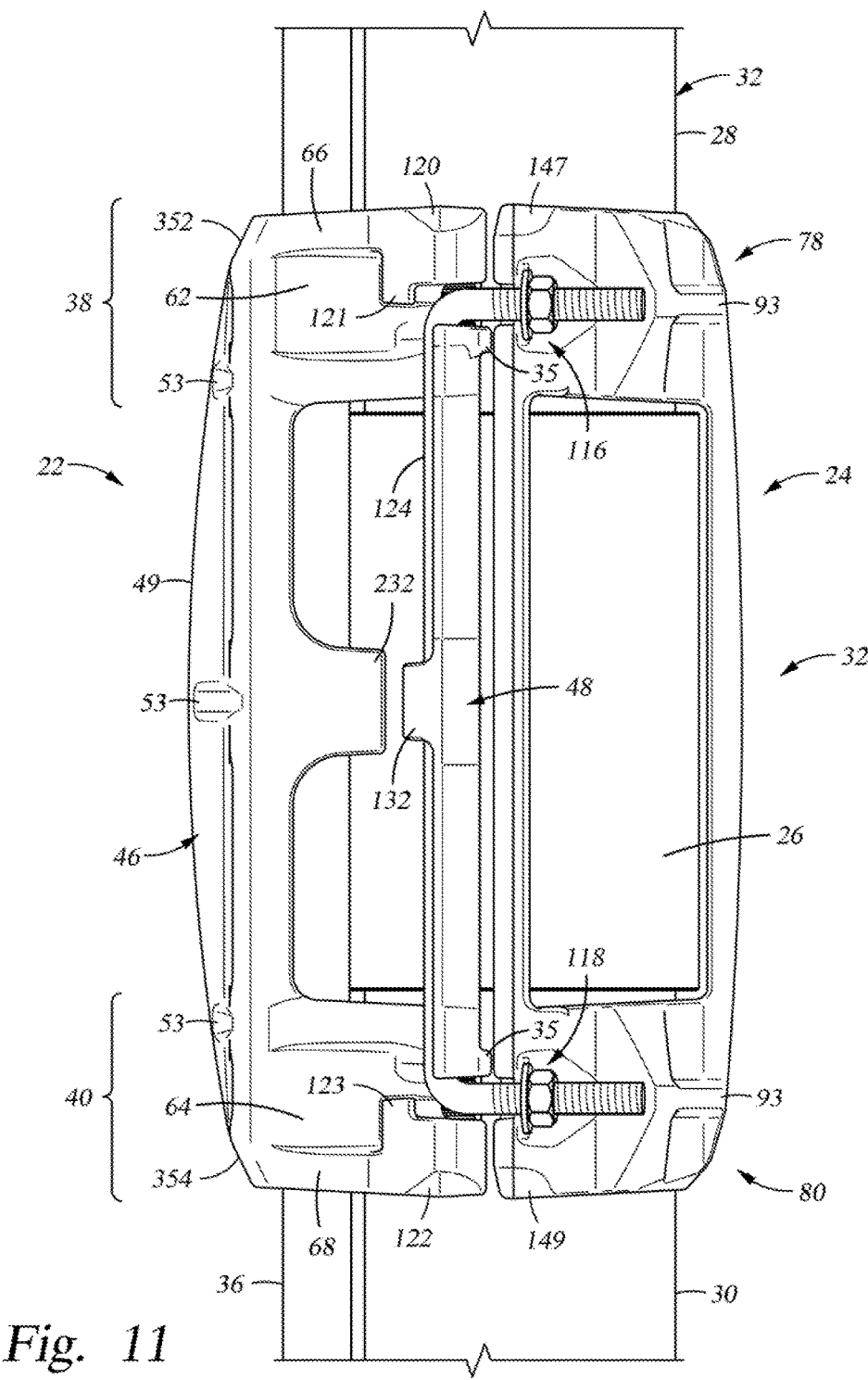
FIG. 11 is a side view of a cable guard mounted on a tubing string enclosing and protecting cables showing the u-bolt securing the cable guard to a tubing string.

Referring to FIGS. 2, 4-5, 13, 14-17, 19-23, and 26, hinge receiving rib 44 includes a hinge rod engaging projection 112 substantially centrally positioned between base ends 38 and 40 adapted for receiving and removably engaging hinge rod 110. Referring to FIGS. 4 and 11, hinge rod engaging projection 112 engages the central portion of hinge rod 110 as hinge pins 106 and 108 are received into hinge pin receivers 72 and 74. The hinge rod engaging projection 112 prevents dislodgement of hinge pins 106 and 108 from hinge pin receivers 72 and 74. Preferably, as shown in FIG. 26, hinge rod engaging projection 112 has an arcuate cross-sectional shape and is substantially co-axially aligned with hinge pin receivers 72 and 74; however, hinge rod engaging projection 112 may have any cross-sectional shape suitable for engaging and retaining hinge rod 110.

As shown in FIGS. 2, 4, 5, 13, 14, and 26, hinge rod engaging projection 112 includes a rod face 114 for frictionally engaging, deflecting, and receiving hinge rod 110 into hinge rod engaging projection 112. Preferably, rod face 114 is sloped toward hinge pin receivers 72 and 74 as shown in FIG. 26. Referring to FIGS. 3-5, and particularly FIG. 14, preferably the distal end of rod face 114 is substantially aligned with the axes of hinge pin receivers 72 and 74, and hinge rod engaging projection 112 overlays approximately one-half (½) hinge rod 110.

Similarly, as illustrated in FIGS. 3-4, 9-12, 14-17, 19, 21-24, and 26, and particularly FIG. 3, u-bolt receiving rib 48 includes a u-bolt engaging projection 132 substantially centrally positioned between base ends 38 and 40 adapted for receiving and removably engaging u-bolt 124. Referring to FIGS. 3, 11, 14-17, 21-24, and 26, u-bolt engaging projection 132 engages the central portion of u-bolt 124 as u-bolt 124 is received into u-bolt receivers 70 and 71. The u-bolt engaging projection 132 prevents dislodgement of u-bolt 124 from u-bolt receivers 70 and 71. Preferably, as shown in FIG. 26, u-bolt engaging projection 132 has an arcuate cross-sectional shape and is substantially co-axially aligned with u-bolt receivers 70 and 71; however, u-bolt engaging projection 132 may have any cross-sectional shape suitable for engaging and retaining u-bolt 124.

As shown in FIGS. 3, 10, 14, 22 and 26, u-bolt engaging projection 132 includes a u-bolt face 134 for frictionally engaging, deflecting, and receiving u-bolt 124 into u-bolt engaging projection 132. Preferably, u-bolt face 134 is sloped toward u-bolt receivers 70 and 71 as shown in FIG. 26. Referring to FIGS. 3-5, and particularly FIGS. 14 and 17, preferably the distal end of u-bolt face 134 is substantially aligned with the axes of u-bolt receivers 70 and 71, and u-bolt engaging projection 132 overlays approximately one-half (½) of u-bolt 124.

Figure 31:
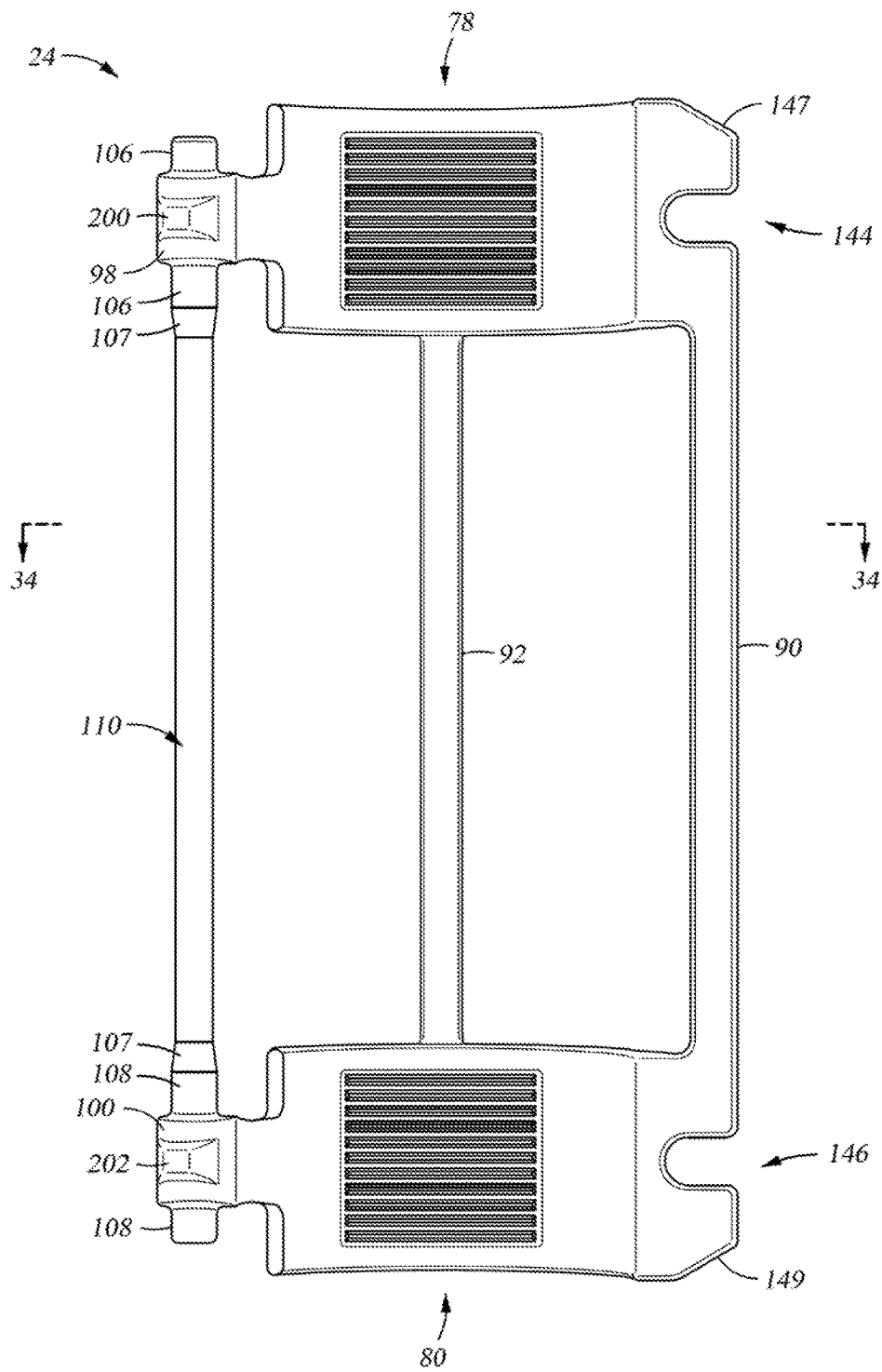
FIG. 31 is a bottom view of a ring.
Figure 32:
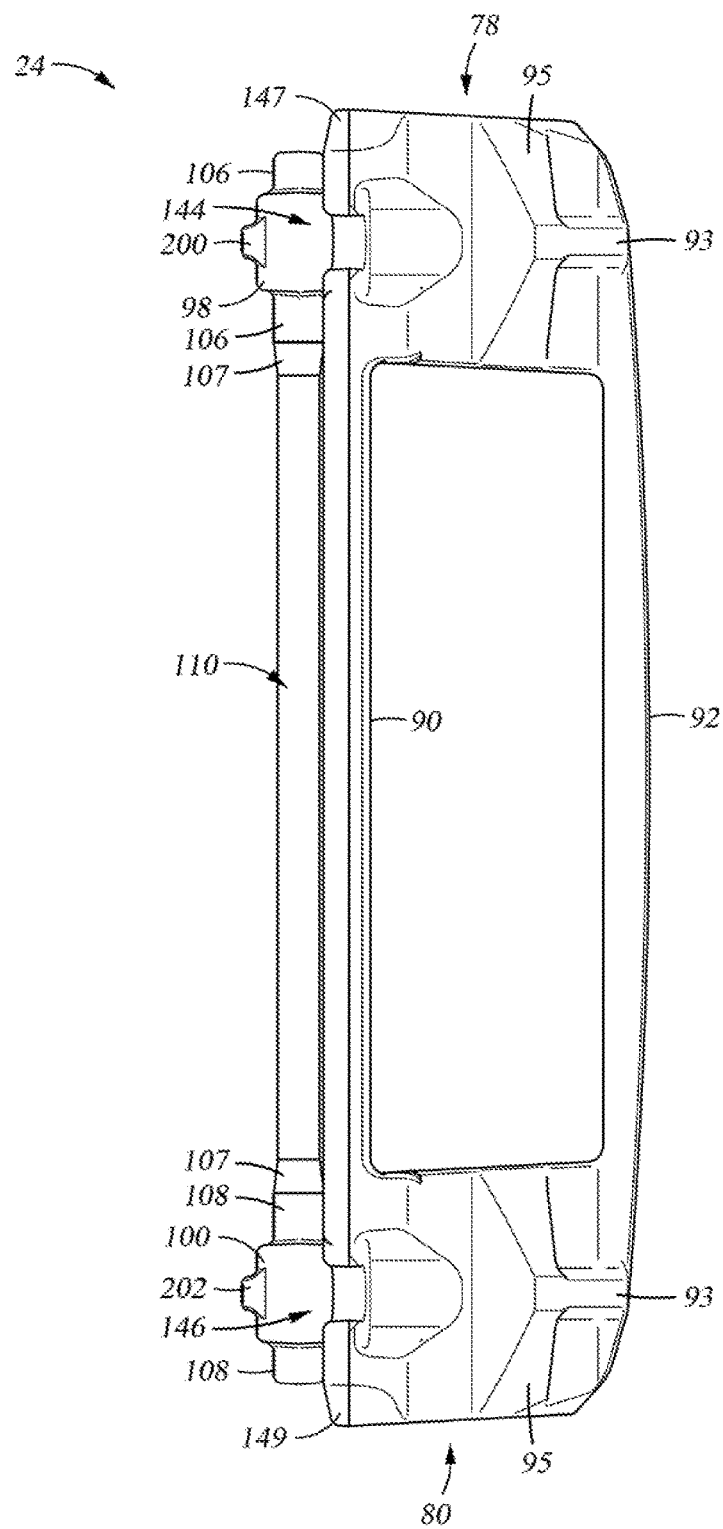
FIG. 32 is a side view of a ring.
Figure 33:
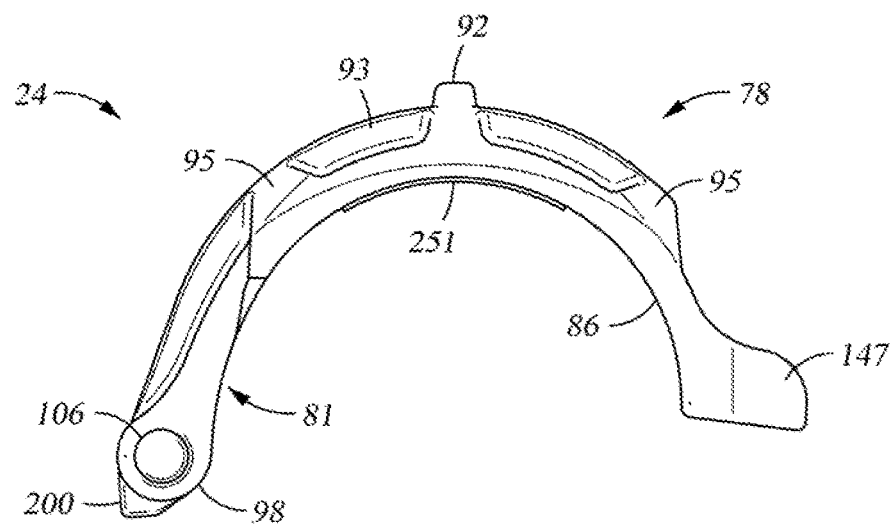
FIG. 33 is an end view of a ring.
Figure 34:
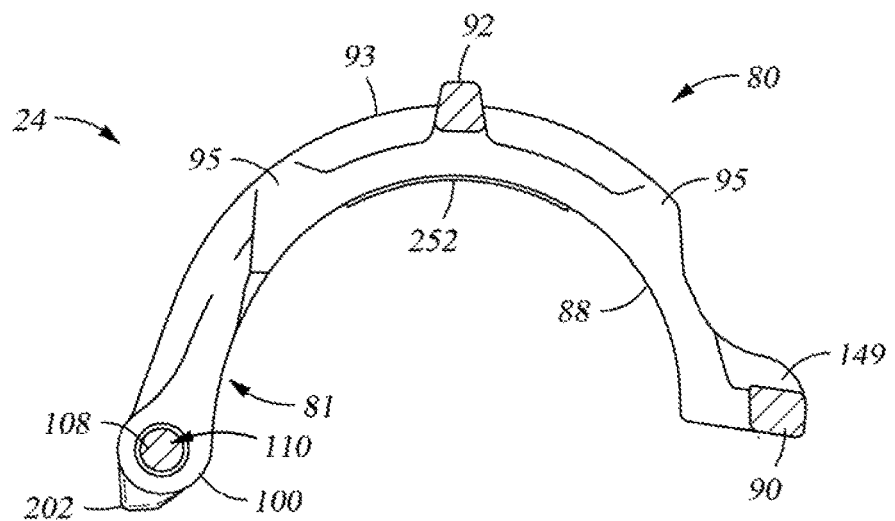
FIG. 34 is a cross-sectional view of a ring at the center of the ring.

Referring to FIGS. 2, 4-8, 12-14, 17, 27-32, and 34, and particularly FIGS. 5, 6, and 31, hinge rod 110 further comprises a first hinge rod abutment 98 and a second hinge rod abutment 100, the abutments 98 and 100, substantially centrally aligned with and extending from ring sections 78 and 80 for aligning base 22 and ring 24 for assembly and restraining displacement of base 22 relative to ring 24, and a first hinge pin 106 and a second hinge pin 108, the hinge pins 106 and 108, for removably and rotably connecting base 22 to ring 24, as shown in FIGS. 5 and 6. Referring to FIGS. 4, 6, and 7, hinge pins 106 and 108 extend substantially coaxially from each side of abutments 98 and 100. Referring again to FIGS. 2, 4, and 6, preferably, hinge pins 106 and 108 and hinge pin receivers 72 and 74, have a circular cross-sectional shape adapted for mating to each other, and may be of any arcuate or curvilinear shape adapted for mating with each other and rotatably and removably connecting base 22 and ring 24. The overall length of hinge rod 110 should be substantially the same as the overall length of base 22 and adapted fit into hinge receivers 72 and 74. Preferably, referring to FIGS. 5 and 6, abutments 98 and 100 have a generally circular cross section; however, they may be of any cross section and abutments 98 and 100 may not be fully encircling because ring rotational stops 200 and 202, described below, and abutments 98 and 100 only need to prevent or restrain excessive longitudinal sliding of base 22 relative to ring 24 when base 22 and ring 24 are rotatably connected. Preferably, hinge rod 110 is a multi-diameter rod with a pair of tapers 107 extending from hinge pins 106 and 108 for transitioning to a smaller diameter in the central portion of hinge rod 110 and having a length that is about one-quarter inch (¼") shorter than the predetermined distance between hinge pin covers 209 and 211 and where abutments 98 and 100, hinge pins 106 and 108, and pair of tapers 107 are co-axial with each other. Preferably, similar clearances are provided between abutments 98 and 100 and abutment receivers 94 and 96. Advantageously, pair of tapers 107 reduce the weight of hinge rod 110 and provide a transition to larger diameter hinge pins 106 and 108 and cooperate with the increased stiffness of hinge pin covers 209 and 211 to reduce the bending of hinge rod 110. Typically, annular clearances between hinge pins 106 and 108 and hinge pin receivers 72 and 74 are about one-eighth inch (⅛"). While many elements of the present invention may vary in the design process, it is convenient and efficient to use the same ring 24 vary the design of base 22 to enclose and protect a user specified variety of cables, and pair of tapers 107 might not be used in relatively small casings because design circle 8 may be too small. Preferably, abutments 98 and 100 are about two (2) to five (5) times the diameter of the central portion of hinge rod 110.

Generally, base 22 and ring 24 may include elements that cooperate with each other to prevent over rotation and uncontrollable detachment. Referring to FIG. 5, first abutment 98 includes a first ring section rotational stop 200 and second abutment 100 includes a second ring section rotational stop 202, the ring rotational stops 200 and 202, each substantially centered in and extending from abutments 98 and 100, respectively, for limiting rotational displacement of base 22 and ring 24 relative to each other, and preventing over rotation and uncontrollable detachment. Referring to FIGS. 5, 6, 7, 8, 20, and 22, first lightering channels 62 may include a first step 220 and second lightering channels 64 may include a second step 222, the steps 220 and 222, extending from abutment receivers 94 and 96, respectively, along lightering channels 62 and 64 for contacting ring rotational stops 200 and 202 and defining an opening angle α shown in FIG. 8. Referring to FIGS. 6 and 8, steps 220 and 222 may extend any distance from abutment receivers 94 and 96 along lightering channels 62 and 64 suitable for making contact with rotational stops 202 and 202 as shown in FIG. 8. The steps 220 and 222 might not be used in relatively small casings because design circle 8 may be too small.

Referring to FIGS. 2, 5-8, 13, 14, 27, 28, and 30-34, ring rotational stops 200 and 202 contact steps 220 and 222, respectively, when cable guard 20 is fully open. Referring to FIG. 8, preferably, first ring section rotational stop 200 is shown in substantially flush contact with first step 220 with cable guard 20 defining an opening angle α of about ninety (90) degrees; however, flush contact is not required. Referring again to FIG. 5, while ring rotational stops 200 and 202 prevent base 22 from contacting ring 24 in areas other than rotational stops 200 and 202, ring rotational stops 200 and 202 are also capable of changing forces on hinge rod 110, hinge pins 106 and 108, hinge pin covers 209 and 211, hinge pin receivers 72 and 74, pair of tapers 107, and hinge supports 73 and 75, described below. These changes affect the bending of hinge rod 110 and prevent hinge rod 110 from uncontrollably detaching by passing over hinge rod engaging projection 112 as base 22 and ring 24 are rotated toward each other when the assembled cable guard 20 is fully closed. The lightering channels 62 and 64 are not required and ring rotational stops 200 and 202 may be of any shape capable of contacting outer surfaces 66 and 68 and/or steps 220 and 222 that prevents hinge rod 110 from rotating over and past hinge rod engaging projection 112. While ring rotational stops 200 and 202 may be shaped to vary opening angle α, steps 220 and 222 may also be adjusted to contact ring rotational stops 200 and 202 and further vary opening angle α. Advantageously, further limiting opening angle α to about ninety (90) degrees brings ring 24 closer to u-bolt legs 140 and 142 for mounting of cable guard 20. Advantageously, ring rotational stops 200 and 202 change the bending of hinge rod 110 and prevent base 22 and ring 24 from over rotating and becoming uncontrollably detached and reduce the likelihood of personal injuries related to handling, installing, and removing cable guard 20.

Referring to FIGS. 10-14, cable guard 20 is centrally mounted across coupling 26, while forces may cause cable guard 20 to move and coupling 26 may contact base ends 38 and 40 and/or ring sections 78 and 80 providing a barrier to further longitudinal movement, base 22 and ring 24 may also include elements for frictionally and compressingly engaging tubes 28 and 30 and/or tubing string 32 and resisting longitudinal and rotational movement.

Referring to FIGS. 2-5, 8, 15-16, 19-21, and 24-26, and particularly FIG. 4, first base end inner surface 51 may include at least one array of first base compressible non-slip teeth 240 and second base end inner surface 52 may include at least one array of second base compressible non-slip teeth 242, the base compressible non-slip teeth 240 and 242.

Figure 16:
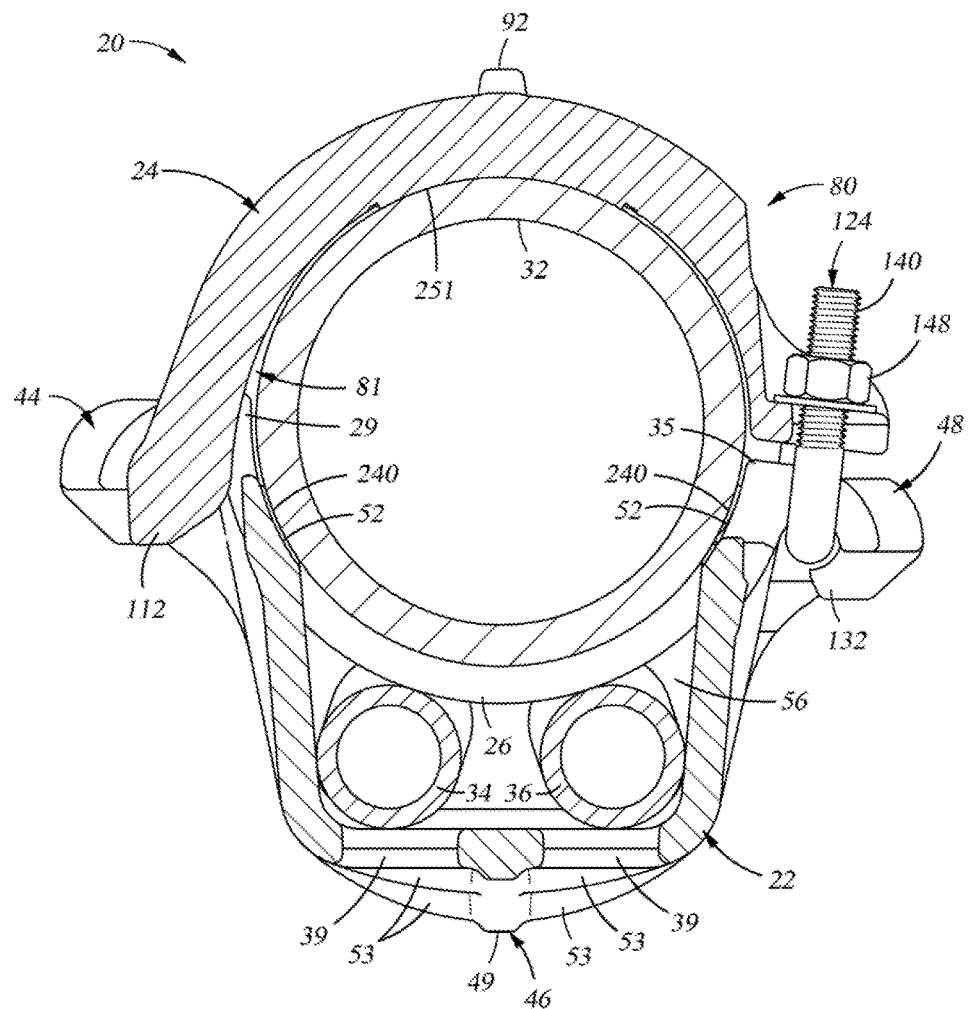
FIG. 16 is a cross-sectional view of a base, ring, and assembled cable guard mounted on a tubing string enclosing and protecting cables and showing the cables biased between the central rib and coupling along with the curvature of the cables in the background as also shown in FIG. 18B.

Referring to FIGS. 2, 4, 8, 15, 18A, 28, and 33-34, first ring inner surface 86 may include at least one array of first ring compressible non-slip teeth 251 and second ring inner surface 88 may include at least one array of second ring compressible non-slip teeth 252, the ring compressible non-slip teeth 251 and 252. Preferably, as shown in FIG. 16, each of base compressible non-slip teeth 240 and 242 and ring compressible non-slip teeth 251 and 252 are adapted for partially mating with a portion of tubing string 32 and/or across coupling 26, if any, for compressingly engaging tubes 28 and 30 and/or tubing string 32, resisting longitudinal and rotational movement, and preventing damage to cables 34, 36, and 37.

Base compressible non-slip teeth 240 and 242, shown in FIGS. 2-5, 8, 15-16, 19-21, 24-26, and ring compressible non-slip teeth 251 and 252 shown in FIGS. 2, 4, 8, 15, 18A, 28, and 33-34, may have any shape that is capable of compressingly engaging the outside surface of tubes 28 and 30 and/or tubing string 32 under the forces created by tensioning u-bolt legs 140 and 142. Preferably, base compressible non-slip teeth 240 and 242, shown in FIGS. 4, 19, and 21, and ring compressible non-slip teeth 251 and 252, shown in FIGS. 33-34, and have a height extending above base inner surfaces 51 and 52 and ring inner surfaces 86 and 88, respectively, of about thirty thousandths of an inch (0.0030") and are spaced apart about two (2) times the height, shown in FIGS. 16, and 33-34, and, where these teeth are in rows, the rows are located on a parting line of the mold or where a separate core is not required, as shown in FIGS. 4, 21, and 31, and the lengths of base compressible non-slip 240 and 242 teeth may vary as shown in FIG. 21. The ring compressible non-slip teeth 251 and 252 may differ from base compressible non-slip teeth 240 and 242 as shown in FIG. 4 in the cross-sectional shape. Preferably, ring compressible non-slip teeth 251 and 251 have a substantially square cross section and base compressible non-slip teeth 240 and 242 have a triangular cross section where the triangular cross section creates a slope that permits tooling to draft without using a core.

While coupling 26, if any, provides a barrier and base inner surfaces 51 and 52 and ring inner surfaces 86 and 88 frictionally resist movement, and, while base compressible non-slip teeth 240 and 242 and ring compressible non-slip teeth 251 and 252 are not required, base compressible non-slip teeth 240 and 242 may also cooperate with ring compressible non-slip teeth 251 and 252 compressingly engage and resist longitudinal and rotational movement and prevent or reduce damage to cables 34, 36, and 37. As shown in FIGS. 3, 8, 10, 15-16, and 17, base compressible non-slip teeth 240 and 242 may also cooperate with ring compressible non-slip teeth 251 and 252 to provide engagement at each end of cable guard 20.

Figure 29:
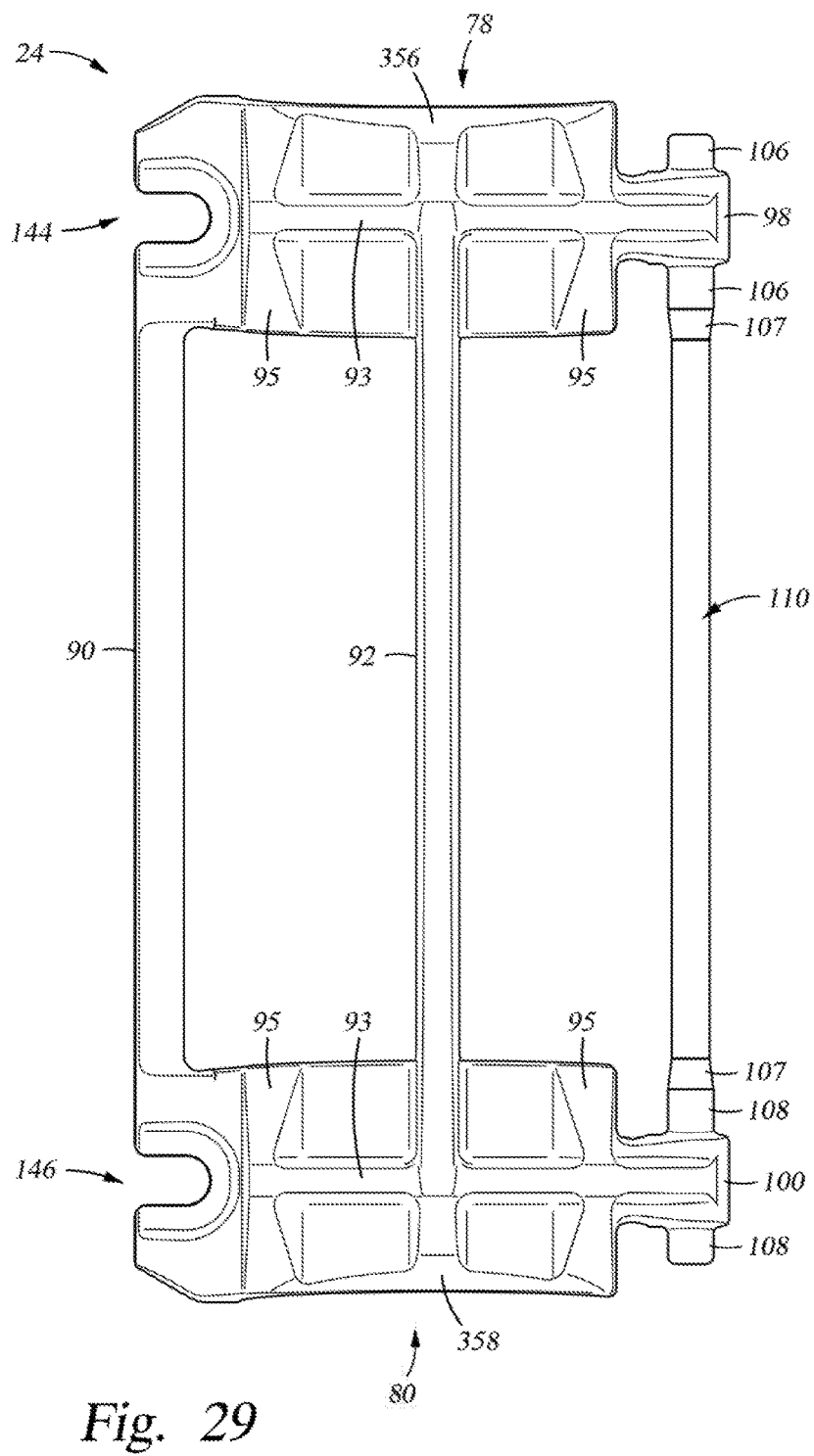
FIG. 29 is a top view of a ring.
Figure 30:
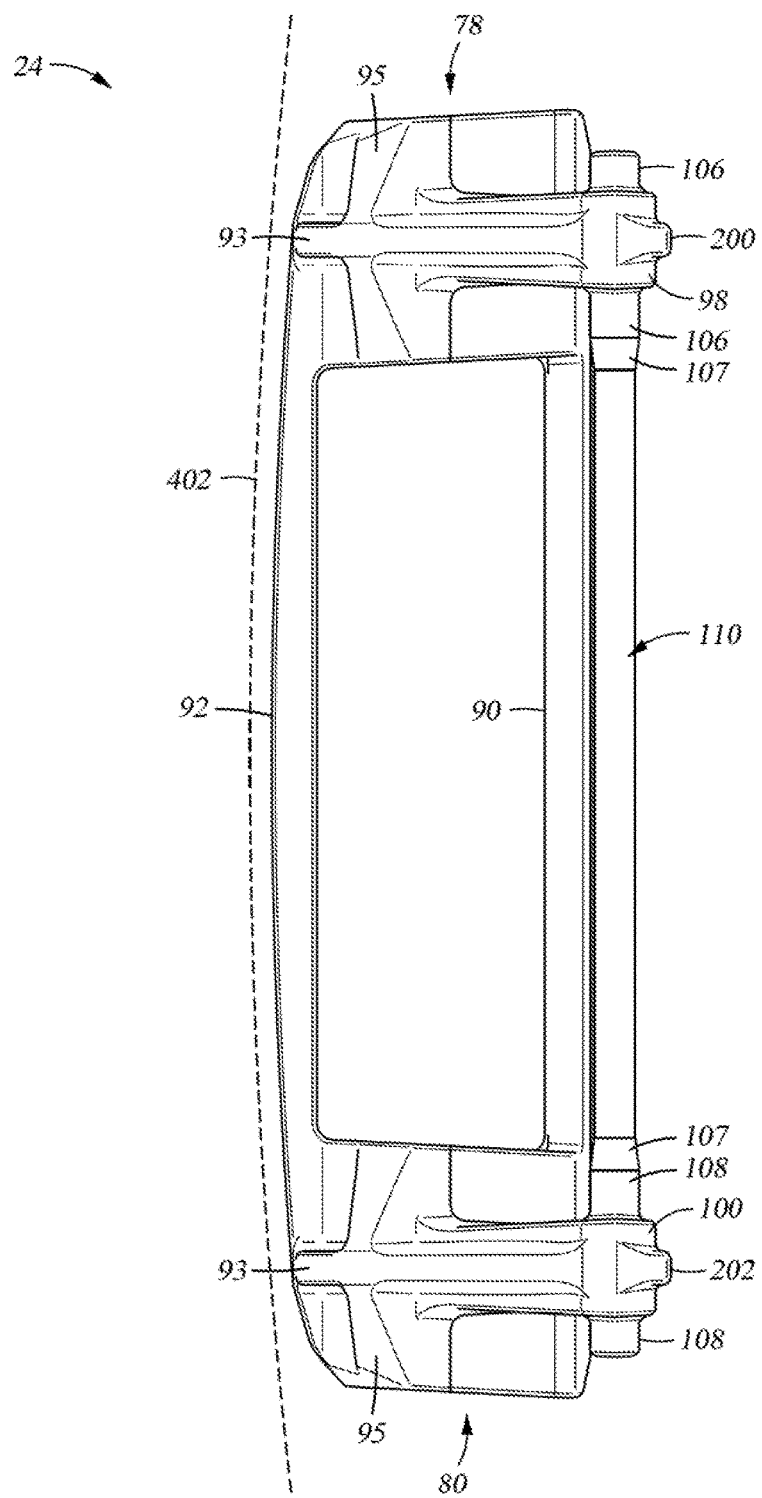
FIG. 30 is a side view of a ring.

As shown in FIGS. 2, 4-5, 8, 14, 22, 28-29, and 31-32, first ring section 78 includes a first u-bolt leg receiver 146 and second ring section 80 includes a second u-bolt leg receiver 146, the u-bolt leg receivers 146 and 148, each substantially opposite abutments 98 and 100, respectively, and extending inwardly in ring sections 78 and 80 adjacent to connecting rib 90 for cooperating with u-bolt slots 116 and 118 and receiving u-bolt legs 140 and 142 as indicated in FIGS. 2, 4, and 14. The u-bolt leg receivers 146 and 148 are spaced apart a predetermined distance substantially equal to the distance between u-bolt slots 116 and 118 for aligning with each other as base 22 and ring 24 are closed as shown in FIG. 14. While u-bolt leg receivers 144 and 146 are preferably shown in FIG. 4 adjacent ring bumpers 147 and 149, respectively, u-bolt leg receivers 144 and 146 may be at any location in ring sections 78 and 80 that are adapted for alignment with u-bolt slots 116 and 118. Preferably, u-bolt leg receivers 144 and 146 are shaped to substantially match the shape of u-bolt slots 116 and 118 extend inwardly in ring sections 78 and 80 and may include a shelf for nuts 148 and 150 and a clearance for a socket to tighten nuts 148 and 150 as shown in FIGS. 11 and 29. Preferably, the clearance is not rounded, arcuate, or shaped to require a separate core.

Referring to FIG. 29, connecting rib 90 extends along base ends 38 and 40 substantially between u-bolt leg receivers 144 and 146.

Referring to FIGS. 4, 10-11, 15, 27-29, and 31-34, first ring section 78 also includes a first ring bumper 147 and second ring section 80 includes a second ring bumper 149, the ring bumpers 147 and 149, for protecting u-bolt legs 140 and 142 and bi-directionally guiding. While ring bumpers 147 and 149 may extend with any angular, curvilinear, or arcuate shape, preferably, referring to FIGS. 4, 5, and 31, ring bumpers 147 and 149, each extending angularly from ring sections 78 and 80 and/or away from tubes 28 and 30 and/or coupling 26 when mounted, adjacent to u-bolt leg receivers 144 and 146, respectively. Advantageously, referring to FIG. 10, ring bumpers 147 and 149 cooperate with base bumpers 120 and 122, hinge pin covers 209 and 21, and other elements to bi-directionally guide the present invention along a casing and prevent objects or irregularities in the casing from contacting, breaking, and/or dislodging u-bolt 124, hinge pins 106 and 108; and, like other elements that reduce or prevent uncontrollable detachment of u-bolt 124 or hinge rod 110, reduce the likelihood of personal injuries.

Next, referring to FIGS. 5, 7, 11-12, 27, 29-30, and 32-34, ring sections 78 and 80 may include a radial stiffener 93 extending outwardly and/or away from tubes 28 and 30 and/or coupling 26 when mounted and substantially between abutments 98 and 100 and u-bolt leg receivers 144 and 146.

Referring to FIGS. 11, 12, 13, and 14, ring sections 78 and 80 may also include a pair of ring section cross-sectional stiffeners 95 extending outwardly and/or away from tubes 28 and 30 and/or coupling 26 when mounted and substantially perpendicular to and on each side of radial stiffener 93 and substantially equally spaced apart on each side of central ring connecting rib 92 for stiffening ring sections 78 and 80 and bi-directionally guiding. Referring to FIGS. 11, 12, 17, 18A-J, preferably, radial stiffeners 93 and pair of ring section cross-sectional stiffeners 95 extend from ring section faces 356 and 358 and cooperate with other elements to bi-directionally guide the present invention. Referring to FIGS. 13 and 18B-D, preferably, central ring connecting rib 92 has an elliptical or curvilinear shape and radial stiffener 93 is substantially flush with central ring connecting rib 92 and adapted for cooperating with other elements of the present invention for bi-directionally guiding; however, central ring connecting rib 92 and radial stiffener 93 may be of any cross-sectional shape and length suitable for stiffening and bi-directionally guiding. Radial stiffener 93 and pair of cross-sectional stiffeners 95 might not be used in relatively small casings because design circle 8 may be too small.

Referring to FIGS. 2-7, 10, 14, 22, and 24, first ring section 78 has a first ring face 356 and second ring base end 40 has a second ring face 358, the ring section faces 356 and 358, respectively, for bi-directionally guiding. As shown in FIGS. 5, 6, 7, and 10, while ring section faces 356 and 358 may extend downward toward ring inner surfaces 86 and 88 and/or tubes 28 and 30 and substantially around ring sections 78 and 80, preferably, ring section faces 356 and 358 are substantially centered in ring sections 78 and 80 and extend around ring sections 78 and 80 substantially between pair of ring section cross-sectional stiffeners 95 and substantially from central connecting rib 92 and pair of ring cross-sectional stiffeners 95 downward toward ring inner surfaces 86 and 88 and/or tubes 28 and 30.

Returning to FIG. 23, hinge receiving rib 44 may include a first hinge support 73 and a second hinge support 75, the hinge supports 73 and 75, extending from hinge receivers 72 and 74 along hinge receiving rib 44 toward each other. Similarly, returning to FIG. 23, u-bolt receiving rib 48 may include a first u-bolt support 77 and a second u-bolt support 79, the u-bolt supports 77 and 79, extending from u-bolt receivers 70 and 71 along u-bolt receiving rib 48 toward each other. Referring to FIGS. 23 and 26, preferably, hinge supports 73 and 75 and u-bolt supports 77 and 79 substantially the same shape as and smoothly transition from hinge receivers 72 and 74 and u-bolt receivers 70 and 71, respectively. Preferably, hinge rod 110 and hinge supports 73 and 75 and u-bolt supports 77 and 79 have an arcuate clearance of about one-eighth inch (⅛"). Advantageously, where included, hinge supports 73 and 75 stiffen hinge receiving rib 44, provide support for resisting bending of hinge rod 110, resist uncontrollable detachment, and allow hinge rod 110 to rotate, and u-bolt supports 77 and 79 provide similar advantages. Where pair of tapers 107 is included, the central portion of hinge rod 110 is not contact with hinge supports 73 and 75, unless hinge rod 110 has been bent.

Figure 9A:
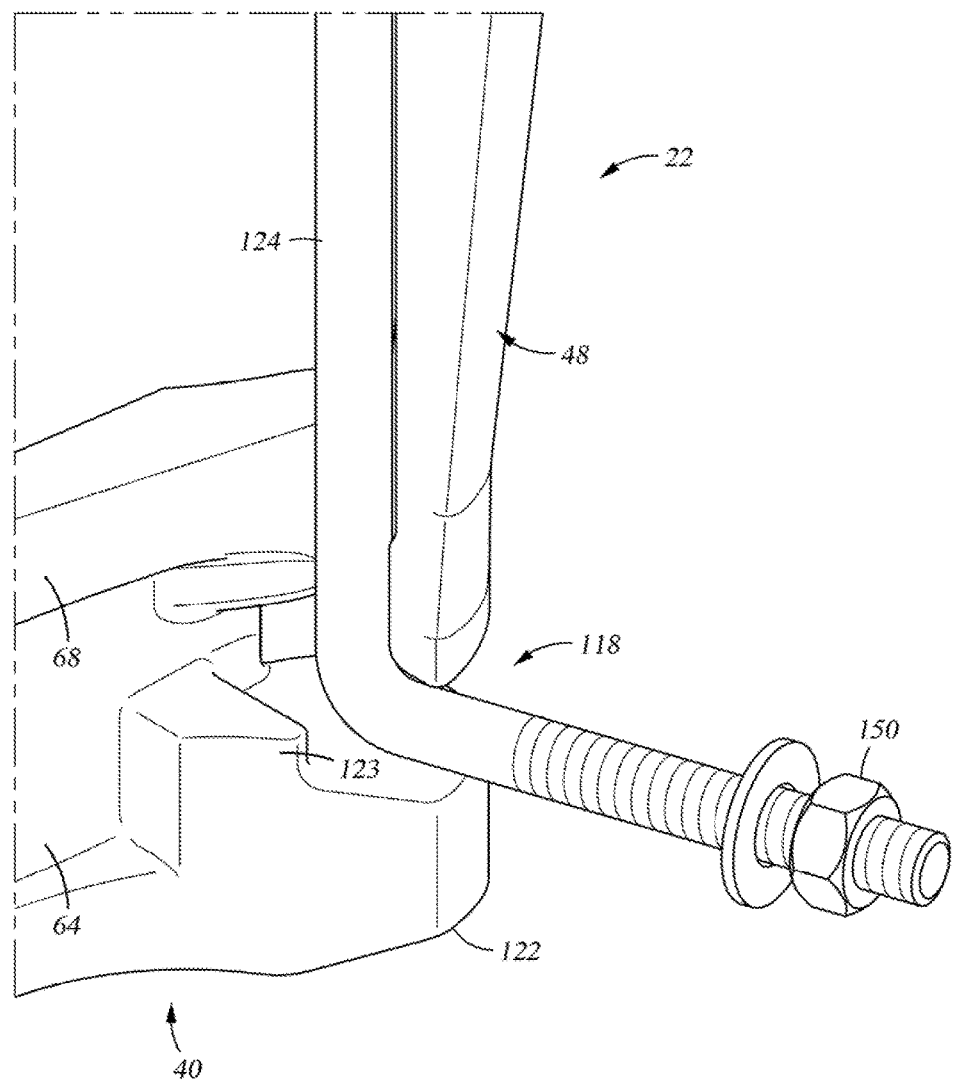
FIG. 9A is a partial section of a base with the u-bolt installed showing first u-bolt rotational stop.
Figure 9B:
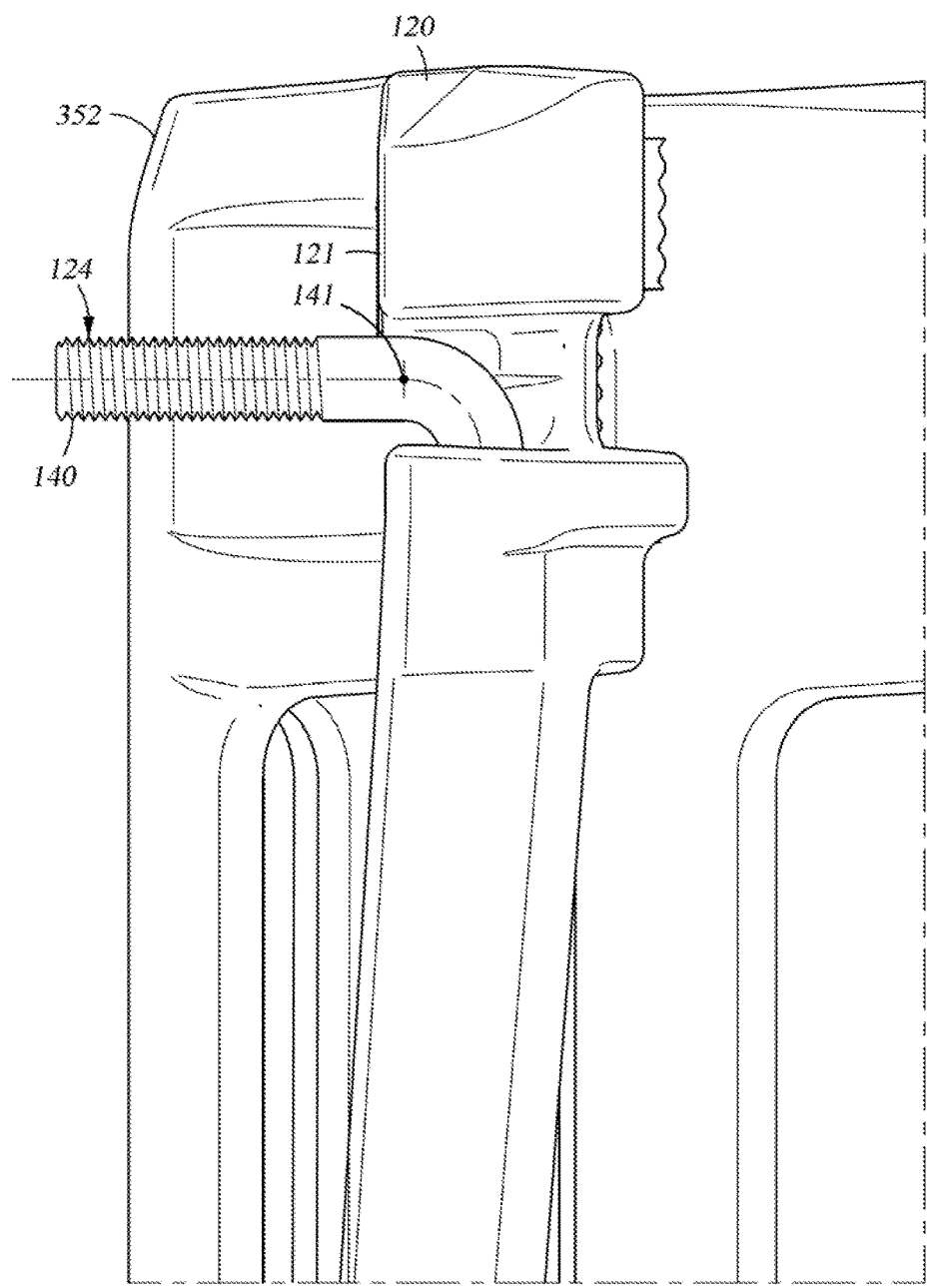
FIG. 9B is a partial section of a base with the u-bolt installed showing first u-bolt rotational stop having a height higher than the tangent on first u-bolt leg.

Referring to FIGS. 3, 8, 9A, 9B, 11, 14, and 23-24, first base bumper 120 may include a first u-bolt rotational stop 121 and second base bumper 122 may include a second u-bolt rotational stop 123, the u-bolt rotational stops 121 and 123, for limiting rotational and longitudinal displacement of u-bolt 124 and preventing over rotation and uncontrollable detachment of u-bolt 124. Preferably, referring to FIGS. 8, and 9A-9B, u-bolt rotational stops 121 and 123 extend from bumpers 120 and 122 toward each other partially across u-bolt slots 116 and 118, respectively. As shown in FIGS. 8 and 9B, preferably, u-bolt rotational stops 121 and 123 have a height that is higher than a tangent point 141 of first u-bolt leg 140 and second u-bolt leg 142, not shown, through the path of the rotation of tangent 141. U-bolt rotational stops 121 and 124 should extend across about one-half (½) of u-bolt slots 116 and 118 and provide a minimum clearance of about one-eighth (⅛") over the length of u-bolt 124 to allow for installation and removal. While FIGS. 3, 8, 9A, 9B, 11, 14, and 23-24 show u-bolt rotational stops 121 and 123 having a substantially trapezoidal shape, u-bolt rotational stops 121 and 123 may be of any shape and extend any distance across u-bolt slots 116 and 118 suitable for preventing over rotation and limiting longitudinal displacement and uncontrollable detachment of u-bolt 124. Advantageously, u-bolt rotational stops 121 and 123 prevent over rotation and uncontrollable detachment of u-bolt 124.

The ring sections 78 and 80 may also include a closing gap 81 as shown in FIGS. 15, 17, 33, and 34 that extends from abutments 98 and 100 longitudinally across ring inner surfaces 86 and 88 of ring sections 78 for rotating ring 24 in an assembled and partially mounted cable guard 20 around tubes 28 and 30. While annular clearances between hinge pin receivers 72 and 74 and hinge pins 106 and 108 may allow ring 24 to clear tubes 28 and 30 in the mounting process, advantageously, closing gap 81 aids users mounting the present invention where base 22 is mounted enclosing cables 34, 36, and 37, and ring 24 is rotated toward the closing position. The closing gap 81 provides additional clearance at or near locations where ring 24 without a closing gap 81 might contact tubes 28 and 30 and allows for safe efficient closure, allows hinge pins 106 and 108 to freely rotate in hinge pin receivers 72 and 74, and prevents contact and biasing of ring 24 against tubes 28 and 30 that could dislodge base 22 from tubes 28 and 30 in the mounting process. Preferably, closing gap 81 is a radius off the tangent of abutments 98 and 100 and closing gap 81 may be a straight tangent from abutments 98 and 100, and closing gap 81 may also be included on each side of ring sections 78 and 80.

The base 22 and ring 24 may include elements to resist tearing or fracture in areas of stress concentrations. Referring to FIGS. 3-4, 8, 15, 19, 21-22, and 24-26, first base end 38 may include a first pair of tearing resistors 27 and second base end 40 may include a second pair of tearing resistors 29, the base tearing resistors 27 and 29, extending outward from hinge receivers 72 and 74 and adjacent to each side of abutment receivers 94 and 96 and along the respective base inner surfaces 51 and 52 as shown in FIG. 4. Referring to FIGS. 4-5, 7, 11, 15-16, 19-22, 24, and 26, base ends 38 and 40 may include a third base tearing resistor 35 extending from each of u-bolt receivers 70 and 71 and adjacent u-bolt slots 116 and 118, respectively, and along each of respective base inner surfaces 51 and 52 shown in FIG. 4. The base tearing resistors 27 and 29 and third base tearing resistor 35 are preferably shown in FIG. 4 and may be of any shape and suitable for adding material where base 22 or ring 24 in areas of high stress such as those near u-bolt slots 116 and 118, u-bolt leg receivers 144 and 146, hinge pins 106 and 108, and hinge receivers 72 and 74 where the forces created by tensioning u-bolt legs 140 and 142 are transmitted to base 22 and ring 24.

Referring to FIGS. 17, 18A-J, and 21, the present invention may include three (3) partial and a fourth ellipsoid defined by one (1) of the partial ellipsoids for bi-directionally guiding. Referring to FIGS. 18A-J, a first base partial ellipsoid 300, a second base partial ellipsoid 320, and a ring partial ellipsoid 340, the partial ellipsoids 300, 320, and 340, and a fourth ellipsoid 400 are shown. In general, the partial ellipsoids 300, 320, and 340 and fourth ellipsoid 400 are represented in a cartesian coordinate system with the origins at casing center 3 and an ellipsoid center 4 and the coordinate axes, x, y, and z. Referring to FIGS. 18A-J, elliptical surfaces of each of partial ellipsoids 300, 320, and 340 and fourth ellipsoid 400 lies generally in a yz-plane and the partial ellipsoids 300, 320, and 340 and fourth ellipsoid 400 extend away from these elliptical surfaces and/or away from the tubes 28 and 30, and a first ellipsoid end 410 and a second ellipsoid end 412 define a central portion 414 of fourth ellipsoid 400 that encloses cable guard 20 as shown in FIGS. 18C-G. For reference to the planes and ellipses between figures, ellipses in the xz-plane are shown with dashed lines and ellipses in the yz-plane are shown with solid lines in FIGS. 18C-E and H-J. While points on the ellipses and ellipsoids defined below may be found mathematically, because base 22 and ring 24 are interchangeable, it is more efficient to build models of base 22 and ring 24 with modeling software where elements, ellipses, and ellipsoids may be selected, printed with 3D printer, and assembled for testing. Finally, any of partial ellipsoids 300, 320, and 340 may be included and cooperate with each other for bi-directionally guiding and accomplishing objectives related to including an interchangeable base 22 and/or ring 24; however, ellipsoids 300, 320, and 340 might not be used in relatively small casings because design circle 8 may be too small. Advantageously, as shown in FIGS. 17 and 18A-J when the present invention is mounted, these partial ellipsoids 300, 320, and 340 and fourth ellipsoid 400 create a structure for bi-directionally guiding that minimizes the surface area in contact with the casing.

With this general discussion related to the ellipsoids, referring to FIGS. 17, 21, and 18C-F, and particularly 18H, base 22 may include first base partial ellipsoid 300 having a surface substantially defined by points on base longitudinal stiffener 49 and plurality of base cross-sectional stiffeners 53. Referring to FIGS. 17, 18C-F, and H, first base partial ellipsoid 300 is a portion of a first ellipsoid 290 having an ellipsoid center 4, and first base partial ellipsoid 300 is shown having a surface defined by points on the surfaces of base longitudinal stiffener 49 and at least one of plurality of base cross-sectional stiffeners 53 that correspond to the semi-principal axes A1, B1, and C1, where A1 and B1 are substantially equal and are the radius of a circle that is tangent to points on surfaces of base longitudinal stiffener 49 and the distal ends of the centrally positioned and/or widest of plurality of cross-sectional stiffeners 53 as shown in FIG. 18F and C1 is substantially the distance between an intersection of first elliptical xz-plane 416 and a vertical axis passing through an ellipsoid center 4 as shown in FIG. 18H. In FIGS. 17, 18C-E, and particularly 18H, the first base partial ellipsoid 300 is further defined by a first elliptical yz-plane surface 420 having a center 5 and first elliptical yz-plane surface 420 is substantially congruent with the outside surface of central rib 46 as shown in FIGS. 18D and H. The first base partial ellipsoid 300 may or may not be longitudinally centered with base longitudinal stiffener 49 or in contact with substantially the entire base longitudinal stiffener 49 and/or plurality of base cross-sectional stiffeners 53; and, preferably, plurality of base cross-sectional stiffeners 53 have a height lower than the height of base longitudinal stiffener 49 as shown in FIG. 17, and, advantageously, not requiring contact along the entirety of elements reduces the weight and manufacturing costs. The first base ellipsoid 300 may also be smaller than shown in FIGS. 18C-D and H because first elliptical yz-plane surface 420 might not extend across base ends 38 and 40 between base end faces 352 and 354. Preferably, plurality of cross sectional stiffeners 53 and base longitudinal stiffener 49 are substantially within the boundary of first elliptical yz-plane surface 420 and first base partial ellipsoid 300; however, the distal ends of plurality of base cross-sectional stiffeners 53 may extend across the boundary of first elliptical yz-plane surface 420 as shown in FIG. 18D and plurality of cross-sectional stiffeners 53 are substantially within the first base ellipsoid 300. Elements and transitions between elements that cooperate with each other may be modified to become congruent with the first base ellipsoid 300 or other ellipsoids, and, for example, in FIGS. 18D and 22, base end faces 352 and 354 may be congruent with an extension of the outer surface of base longitudinal stiffener 49.

Referring to FIGS. 17, 21, and 18C-F, and particularly 18I, base 22 may include second base partial ellipsoid 320, having a surface defined by points on base longitudinal stiffener 49, hinge receiving rib 44, base bumpers 120 and 122, hinge pin covers 209 and 211, and/or u-bolt receiving rib 48 that correspond to the semi-principal axes A2, B2, and C2, a second elliptical yz-plane surface 418A, and second elliptical xz-plane 418B that corresponds to at least one point on the surface of base longitudinal stiffener 49 along with the corresponding cartesian coordinate system with its origin at casing center 3. In FIGS. 17, 18C-F, and particularly 18I, A2 is substantially the distance from a second elliptical yz-plane surface 418A, which corresponds generally to a centerline of hinge rod 110 shown in FIG. 18C, to the highest point on base longitudinal stiffener 49 as shown in FIG. 18C, B2 is substantially one-half (½) of the distance between the outermost points of hinge receiving rib 44 and u-bolt receiving rib 48 as shown in FIG. 18D, and C2 is then preferably selected by locating second elliptical yz-plane surface 418A between the outermost point on hinge receivers 72 and 74 in the hinge pin covers 209 and 211 and the arcuate and/or curvilinear shapes of hinge pin covers 209 and 211 and base bumpers 120 and 122 as shown in FIG. 18D where hinge pin covers 209 and 211 and base bumpers 120 and 122 are capable of cooperating with other elements for bi-directionally guiding and are substantially within second elliptical yz-plane surface 418A. However, the distal ends of hinge pin covers 209 and 211 and base bumpers 120 and 122 may extend across the boundary of second elliptical yz-plane surface 418A and as shown in FIG. 18D and hinge pin covers 209 and 211 and base bumpers 120 and 122 are substantially within second base partial ellipsoid 320. Referring to FIGS. 18C-D, second base partial ellipsoid 320 might not be longitudinally centered with base 22 or in contact with substantially the entire hinge receiving rib 44 and/or u-bolt receiving rib 48 or other elements.

Figure 18G:
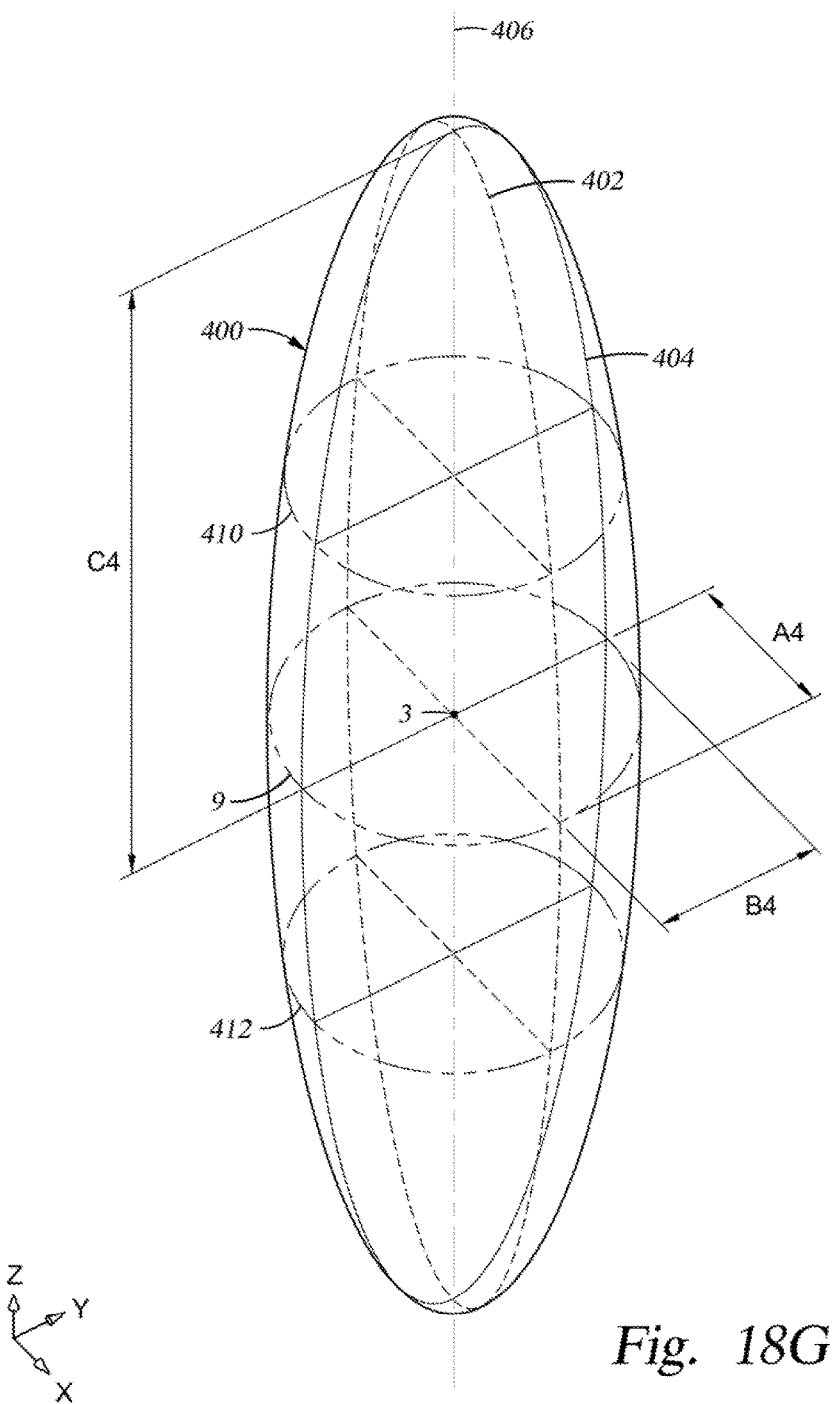
FIG. 18G is a perspective view of the fourth ellipsoid having a surface defined by points on the base and ring that correspond to the semi-principal axes $A4$, $B4$, and $C4$ and also showing the corresponding second elliptical yz-plane shown in FIG. 18D and second elliptical xz-plane 418B shown in FIG. 18C that correspond to points on the surface of a base along with the corresponding cartesian coordinate system.
Figure 18H:
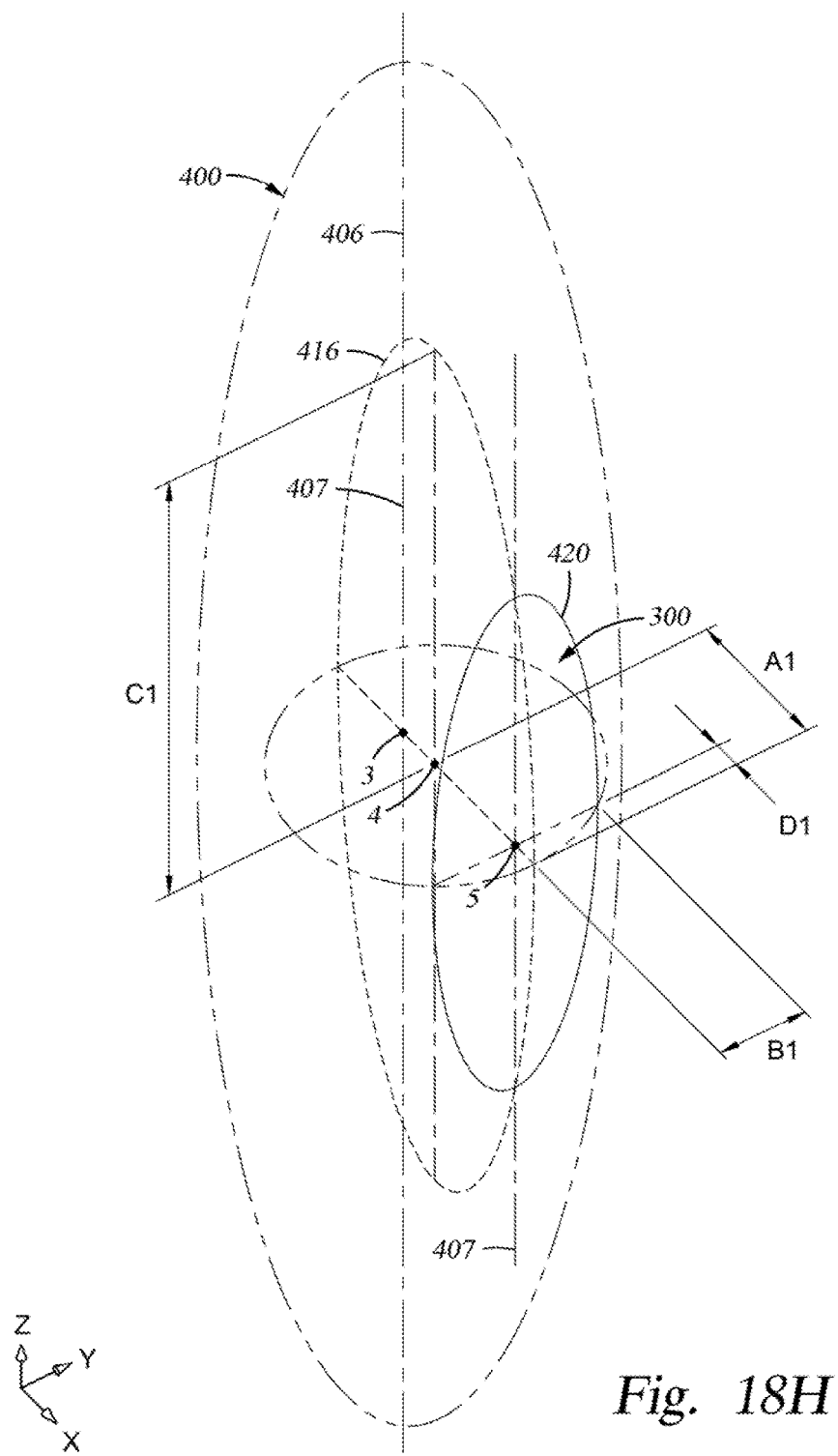
FIG. 18H is a perspective view of a first base partial ellipsoid having a surface defined by points on the base that correspond to the semi-principal axes $A1$, $B1$, and $C1$ and also showing the corresponding first elliptical yz-plane surface that is also shown in FIG. 18D and a first elliptical xz-plane that is also shown in FIG. 18C along with the corresponding cartesian coordinate system.
Figure 18I:
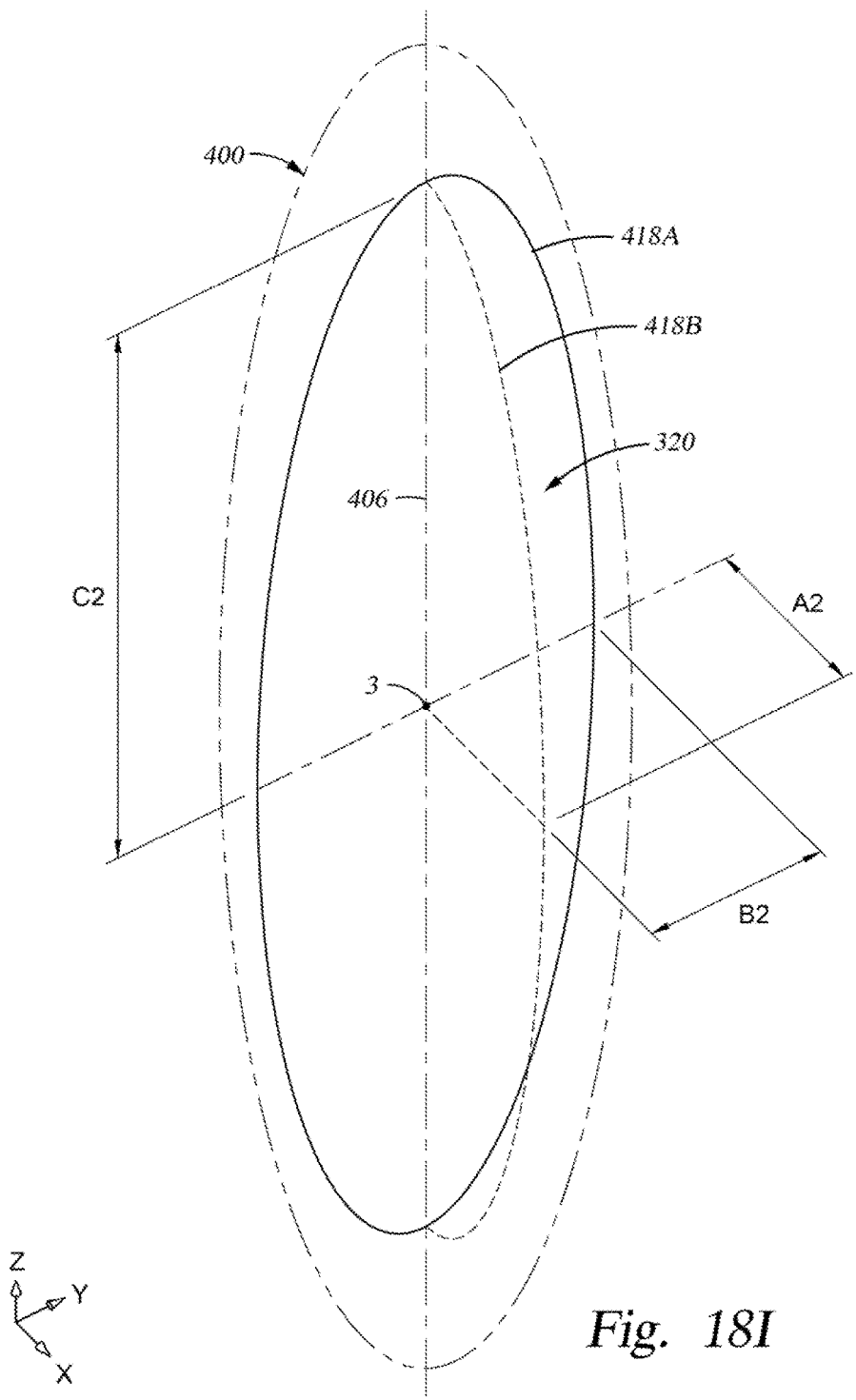
FIG. 18I is a perspective view of a second base partial ellipsoid having a surface defined by points on the base that correspond to the semi-principal axes $A2$, $B2$, and $C2$ and also showing the corresponding second elliptical yz-plane surface 418A shown in FIG. 18D and second elliptical xz-plane 418B shown in FIG. 18C that correspond to points on the surface of a base longitudinal stiffener along with the corresponding cartesian coordinate system.
Figure 18J:
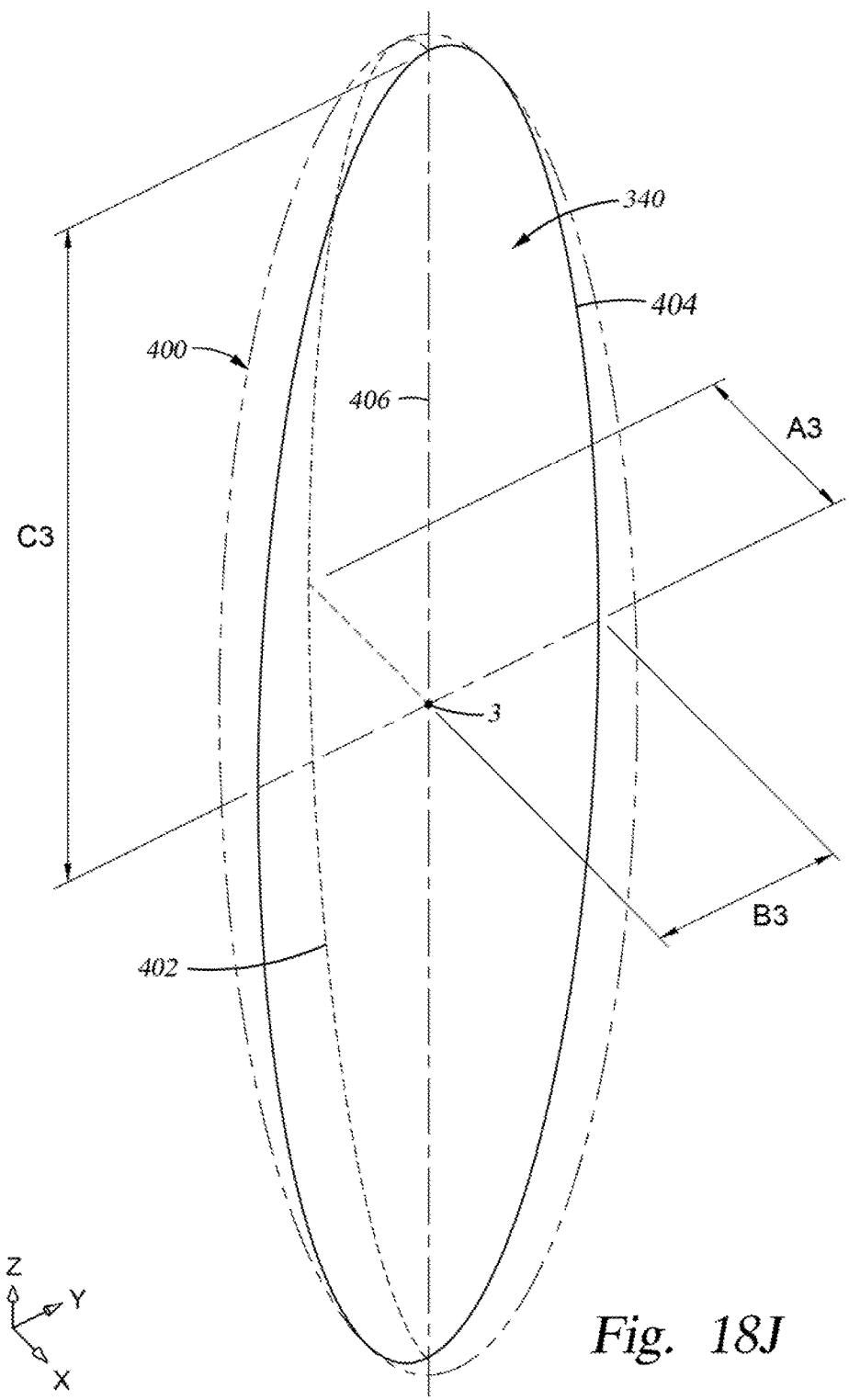
FIG. 18J is a perspective view of a ring partial ellipsoid having a surface defined by points on the ring and base when the present invention is mounted that correspond to the semi-principal axes A3, B3, and C3 showing the corresponding second elliptical yz-plane surface shown in FIG. 18D and ring elliptical xz-plane shown in FIG. 18C that correspond to points on the surface of a ring along with the corresponding cartesian coordinate system.

Similarly, in FIGS. 17 and 18A-J, the present invention may include ring partial ellipsoid 340, having a surface defined by points on the central ring connecting rib 92, radial stiffener 93, hinge receiving rib 44, ring bumpers 147 and 149, hinge pin covers 209 and 211, and/or u-bolt receiving rib 48 when the present invention is mounted that corresponds to the semi-principal axes A3, B3, and C3, a third elliptical yz-plane surface 404, and a ring elliptical xz-plane 418B and center at casing center 3. In FIGS. 17, 18C-F, and particularly 18J, A3 is substantially one-half (½) of the distance from second elliptical yz-plane surface 404, which corresponds generally to a centerline of hinge rod 110, to the highest point on central ring connecting rib 92 shown in FIG. 18 C, B3 is substantially one-half (½) of the distance between the outermost points on hinge receiving rib 44 and u-bolt receiving rib 48 as shown in FIG. 18J, and C3 is then preferably selected by locating third elliptical yz-plane surface 404 on or touching the outermost points of hinge pin covers 209 and 211, base bumpers 120 and 122, and/or ring bumpers 147 and 149 as shown in FIG. 18D; and, the distal ends of hinge pin covers 209 and 211, base bumpers 120 and 122, and ring bumpers 147 and 149 do not extend across the boundary of third elliptical yz-plane surface 404.

Additionally, while second base partial ellipsoid 320 and ring partial ellipsoid 340 may be offset from each other and the dimensions of the semi-principal axes may differ as shown in FIGS. 18C-E and I-J; second base ellipsoid 320 and ring ellipsoid 340 may have matching semi-principal axes, A4, B4, and C4 along with the corresponding cartesian coordinate system with its origin at the casing center, and a third elliptical yz-plane surface 404, and a second ring elliptical xz-plane 402 as shown preferably in FIGS. 18C-J, define fourth ellipsoid 400 shown in FIG. 18G, where A4 is substantially equal to B4 or one-half (½) the diameter of clearance circle 9 shown in FIGS. 17 and 18F or substantially one-half (½) of the distance between the outermost points on hinge receiving rib 44 and u-bolt receiving rib 48 is shown in FIGS. 18C-G, and C4 is then preferably selected by locating third elliptical yz-plane surface 404 on the outermost points of hinge pin covers 209 and 211, base bumpers 120 and 122, and/or ring bumpers 147 and 149 as shown in FIG. 18D; and, the distal ends of hinge pin covers 209 and 211, base bumpers 120 and 122, and ring bumpers 147 and 149 do not extend across the boundary of second ring elliptical xz-plane 402 and third elliptical yz-plane surface 404. While either the dimensions of base 22 or ring 24 may control, typically, as shown in FIG. 18C, the central ring connecting rib 92 is the governing element where fourth ellipsoid 400 touches points on hinge receiving rib 44, u-bolt receiving rib 48, base bumpers 120 and 122, hinge pin covers 209 and 211, central ring connecting rib 92, and/or ring bumpers 147 and 149 where none of the elements of the present invention extend across and outside of fourth ellipsoid 400.

In a second embodiment, shown in FIGS. 35-68, generally, elements in the first embodiment are relocated, not included, and/or re-arranged to allow the present invention to operate in relatively smaller diameter casings, typically having an inside diameter of less than about four (4) inches. In general, many elements from the first embodiment are not included in the second embodiment because design circle 8 is smaller and results in annular clearance 7 being smaller, which, in general, may produce a design of the present invention where elements may be in close proximity or touching to the inside of the casing.

Referring to FIGS. 35-38, the second embodiment comprises a base 22', a ring 24', and a u-bolt 124'. The u-bolt 124' includes a first leg 140' and a second leg 142', the u-bolt legs 140' and 142', that are threaded to receive a first nut 148' and a second nut 150', the nuts 148' and 150'. The ring 24' includes a first ring section 78' and a second ring section 80', the ring sections 78' and 80', and a central ring connecting rib 90, a u-bolt receiving rib 48', and a hinge rod 110' for connecting ring sections 78' and 80'. The base 22' includes a first base end 38' and a second base end 40', the base ends 38' and 40', a hinge receiving rib 44', a central rib 46', and a connecting rib 90' for connecting base ends 38' and 40'. The central rib 46' is between hinge receiving rib 44' and connecting rib 90' and extends substantially perpendicular to and between base ends 38' and 40'. Preferably, as shown in FIGS. 36, 38, and 39-40, hinge rod 110', is a single diameter, does not include the pair of tapers 107, and hinge rod 110' is substantially in contact with the hinge supports 73' and 75', if any.

Referring to FIGS. 35, 37-38, and 52-54, first base end 38' has a first base end inner surface 51' and second base end 40' has a second base end inner surface 52', the base inner surfaces 51' and 52', and first base end 38' has a first base end outer surface 66' and second base end 40' has a second base end outer surface 68', outer surfaces 66' and 68' extend outward from base inner surfaces 51' and 52', respectively.

Referring to FIGS. 35, 37-38, 48-53, and 58-59, first base end 38' has a first base end primary cable protecting channel 56' and second base end 40' has a second base end primary cable protecting channel 58', the primary channels 56' and 58', substantially centered in and extending through base ends 38' and 40' for protecting cables 34', 36', and 37'.

Figure 48:
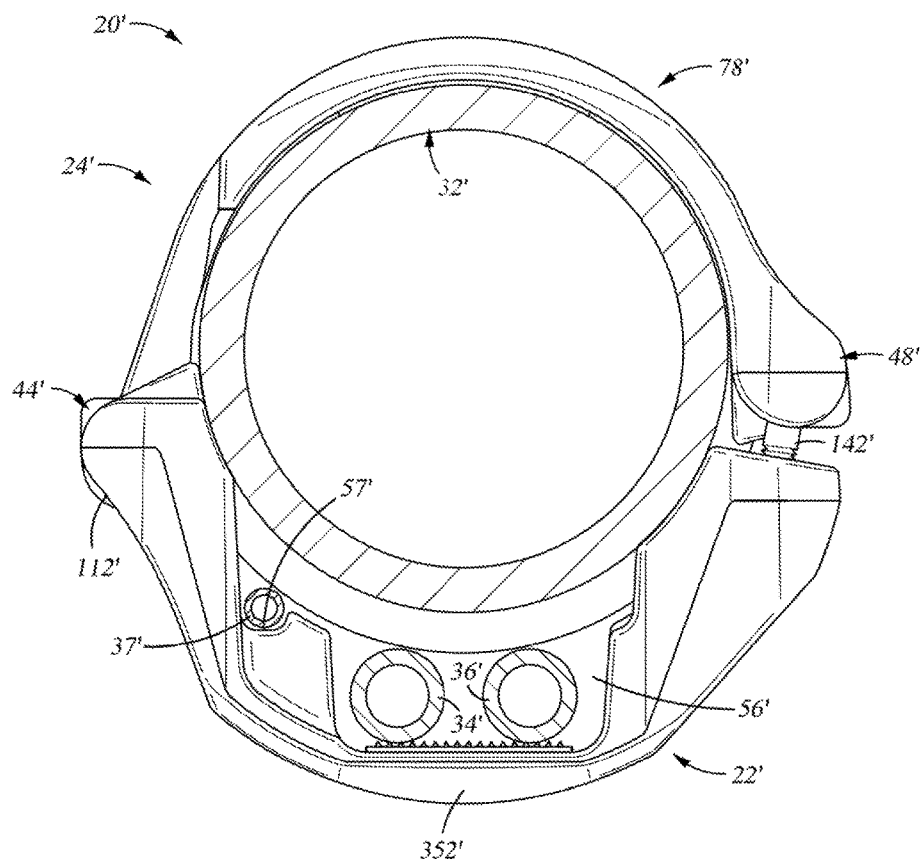
FIG. 48 is an end view of a base, ring, and assembled cable guard mounted on a tubing string enclosing and protecting cables.

Referring to FIGS. 35, 37-38, 60-61, and 67 first ring section 78' includes a first ring inner surface 86', and second ring section 80' includes a second ring inner surface 88', the ring inner surfaces 86' and 88', base inner surfaces 51' and 52' and ring inner surfaces 86' and 88' are preferably adapted for partially mating and frictionally engaging a portion of tubes 28' and 30' and coupling 26' and resisting longitudinal and/or rotational movement when cable guard 20' is mounted as shown in FIG. 48.

Figure 35:
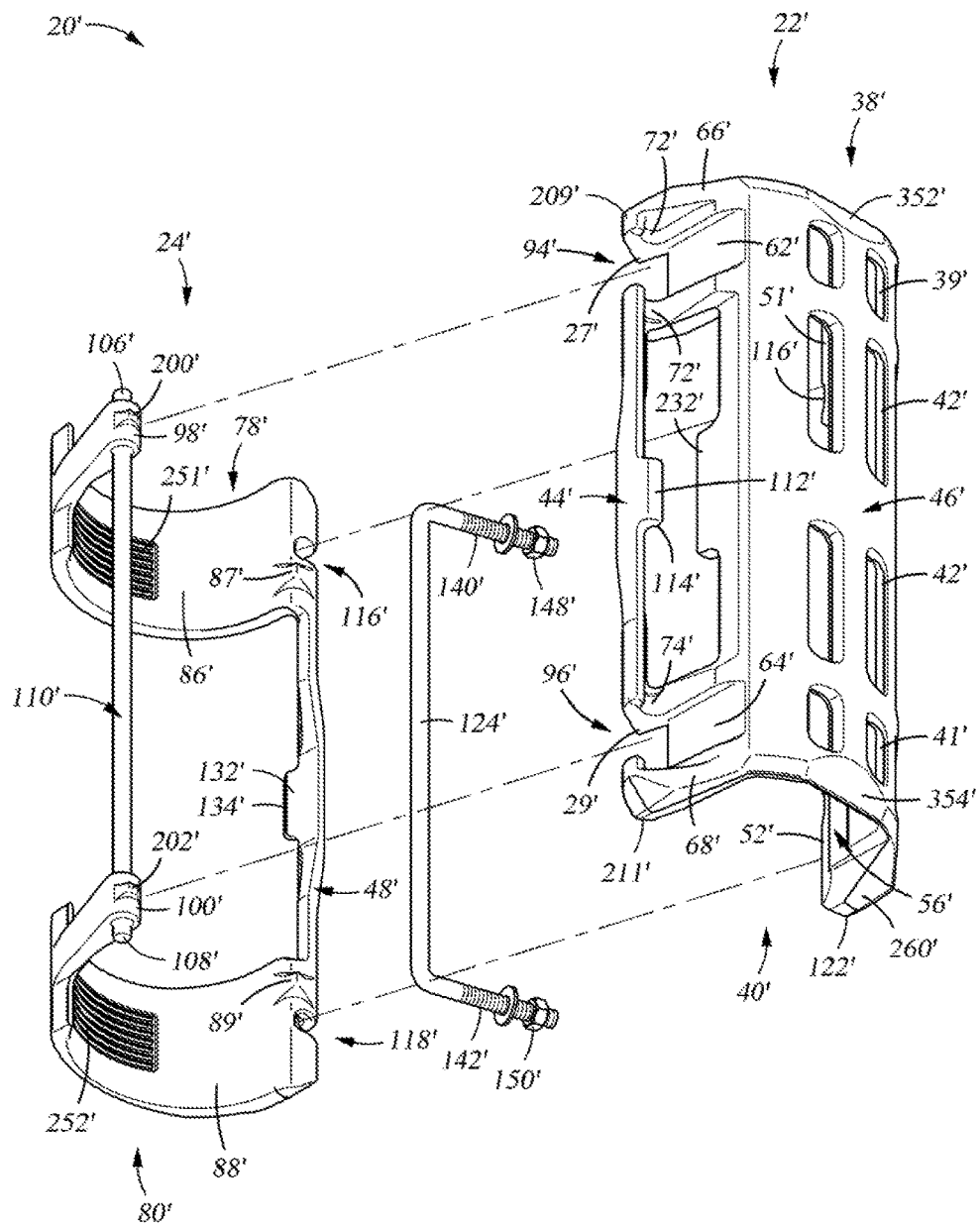
FIG. 35 is a perspective view of an assembly of a second embodiment of the present invention showing the base, ring, and u-bolt with dashed lines showing the alignments of the rotatably and removable connection of the base and ring, the u-bolt and the u-bolt slots for receiving the u-bolt legs.
Figure 36:
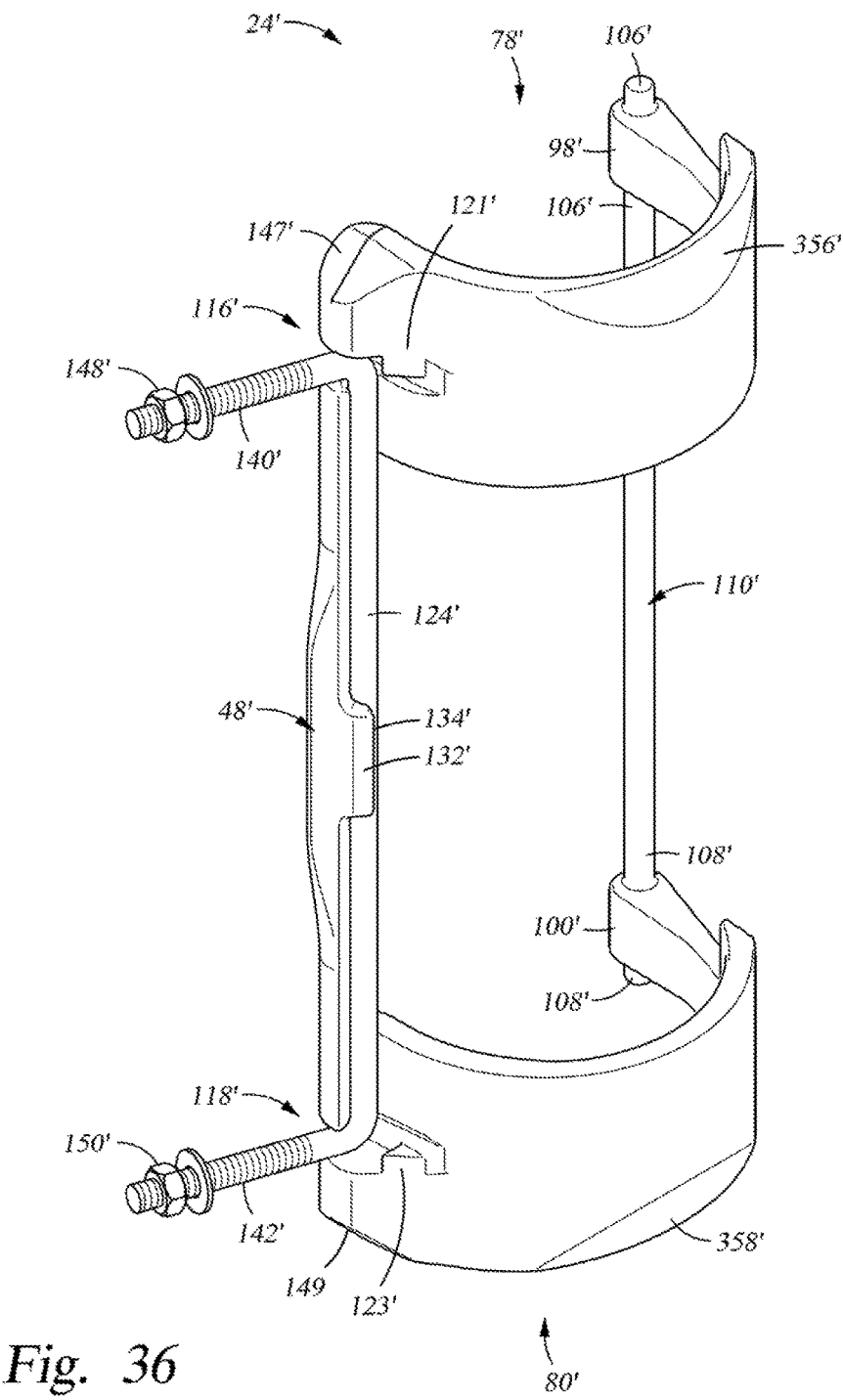
FIG. 36 is an isometric view of the ring and u-bolt shown in FIG. 35 with the u-bolt installed.
Figure 37:
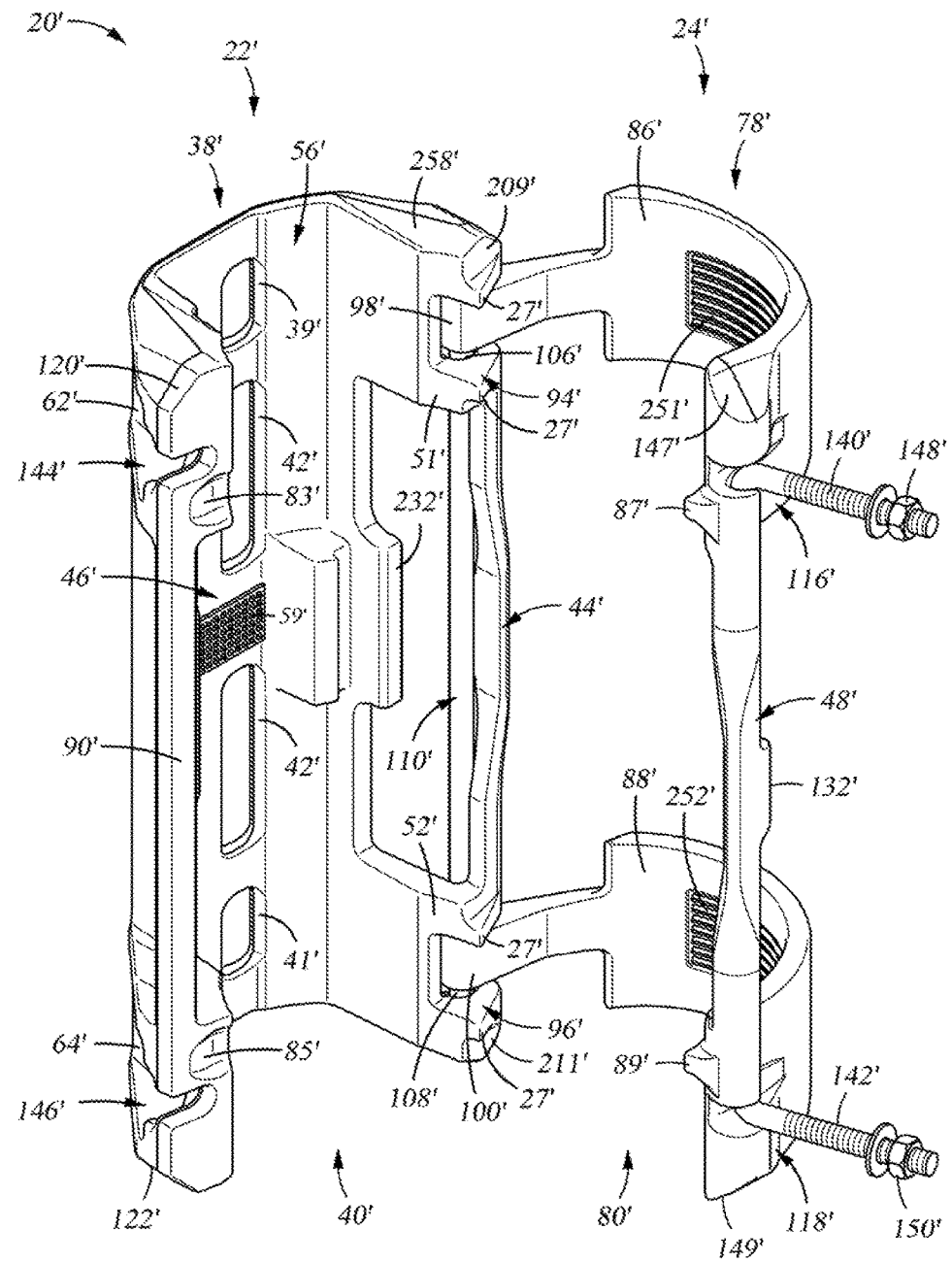
FIG. 37 is an isometric view of the inside of an assembly of a second embodiment of the present invention showing the base, ring, and u-bolt and the rotatably and removable connection of the base and ring and u-bolt and u-bolt receiving rib indicated by dashed lines in FIG. 35.

Referring to FIGS. 35, 38, 40, 43-44, 46-48, 51, 53, 55, and 57-58, first base end 38 has a first base end face 352' and a first base end taper 258' and second base end 40' has a second base end face 354' and a second base taper 260', the base end tapers 258' and 260' and the base end faces 352' and 354', respectively, for bi-directionally guiding. Preferably, as shown in FIGS. 35 and 37, base end tapers 258' and 260' extend substantially around base ends 38' and 40' opposite central rib 46', and base end faces 352' and 354' are substantially centered in base ends 38' and 40' opposite central rib 46' and extend downward from outer surfaces 66' and 68' to the central portion of base end tapers 258' and 260', respectively. The base end faces 352' and may not transition to bumpers 120' and 122' and hinge pin covers 209' and 211'.

Referring to FIGS. 37-38, 43, 47, 52-54, and 56-58, first base end 38' has a first base bumper 120' and second base end 40 has a second base bumper 122', the base bumpers 120' and 122', preferably extending from tapers 258' and 260' angularly away from base ends 38' and 40' and/or away from tubes 28 and 30 and/or coupling 26 when mounted, respectively, for shielding u-bolt 124' and bi-directionally guiding.

Referring to FIGS. 35-37, 41, 43-45, 47, 52, 61-62, and 65, first ring section 78' includes a first u-bolt slot 116' and second ring section 80' includes a second u-bolt slot 118', the ring u-bolt slots 116' and 118'. Preferably, ring u-bolt slots 116' and 118' are each substantially centered and extending inwardly in ring sections 78' and 80' adjacent to bumpers 120' and 122', respectively, for rotating u-bolt legs 140' and 142' through ring sections 78' and 80' as shown in FIG. 37.

Figure 62:
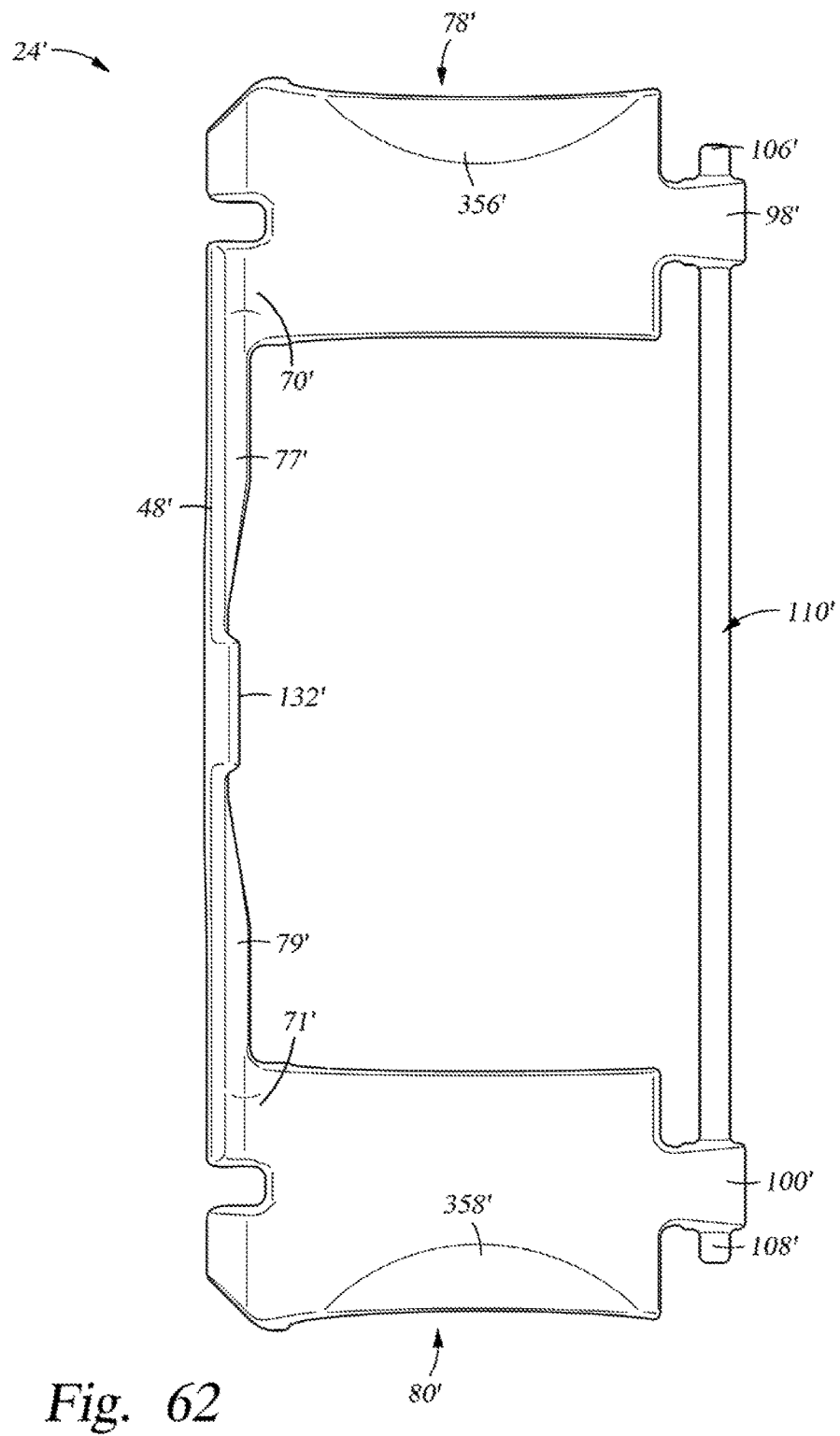
FIG. 62 is a top view of a ring.
Figure 63:
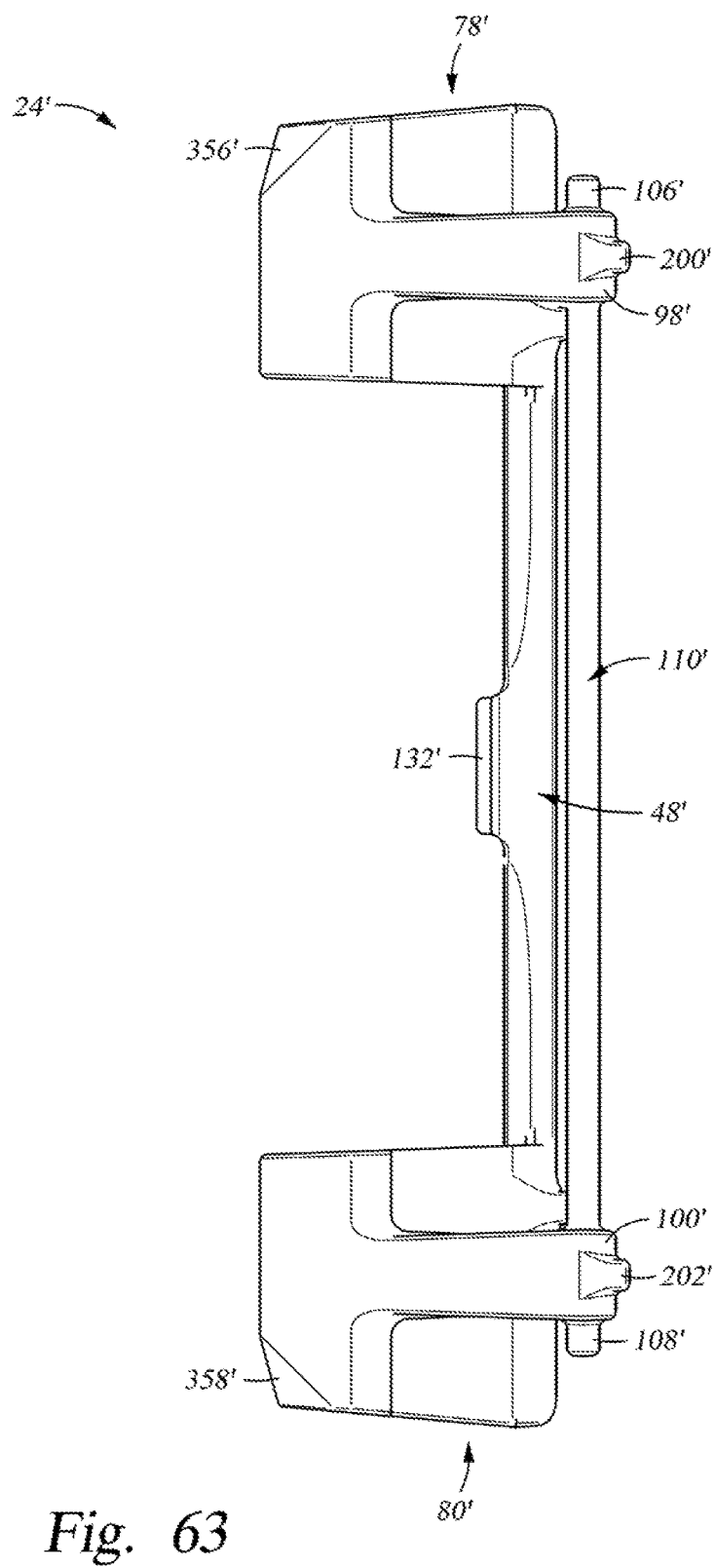
FIG. 63 is a bottom view of a ring.
Figure 64:
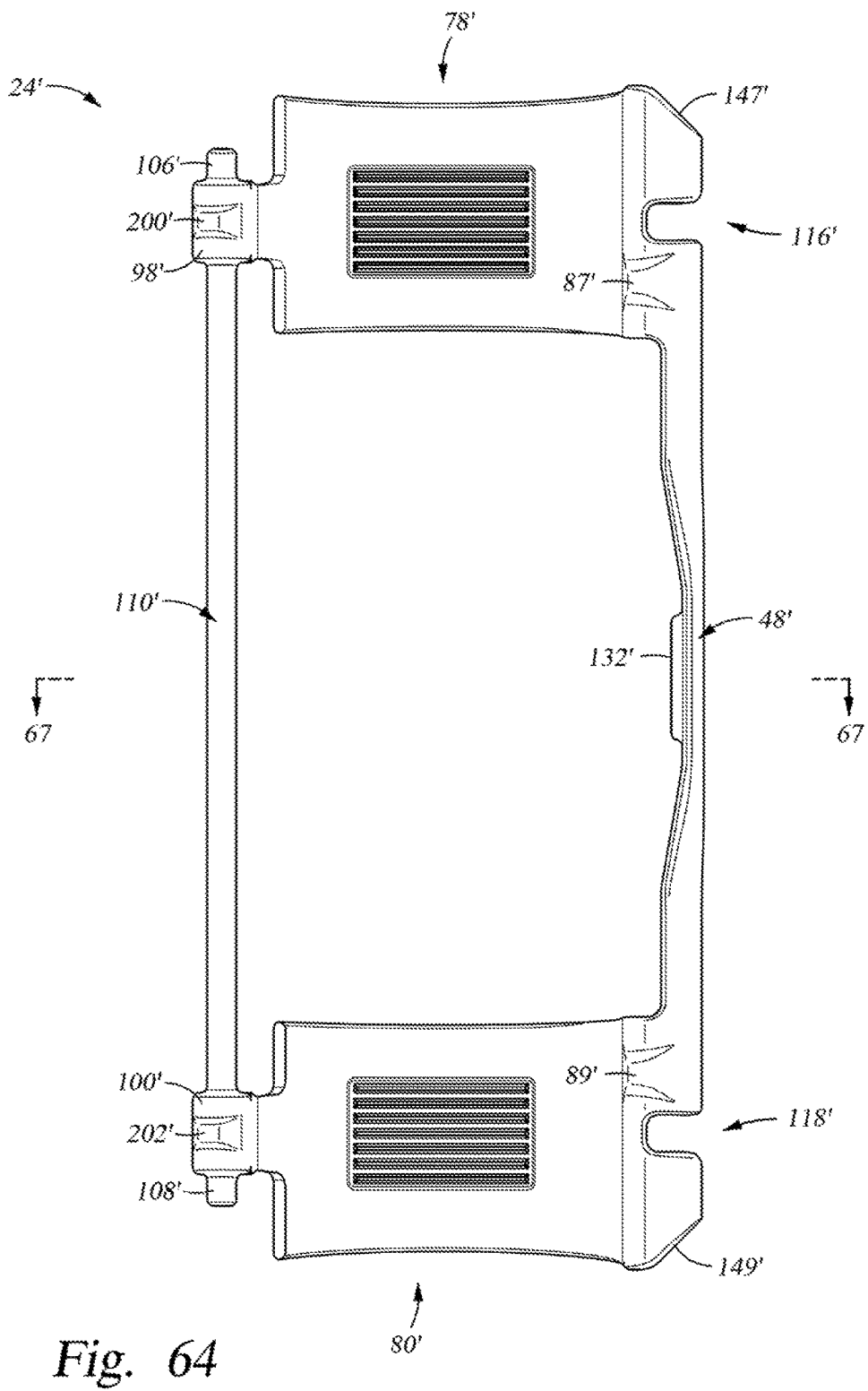
FIG. 64 is a bottom view of a ring.
Figure 65:
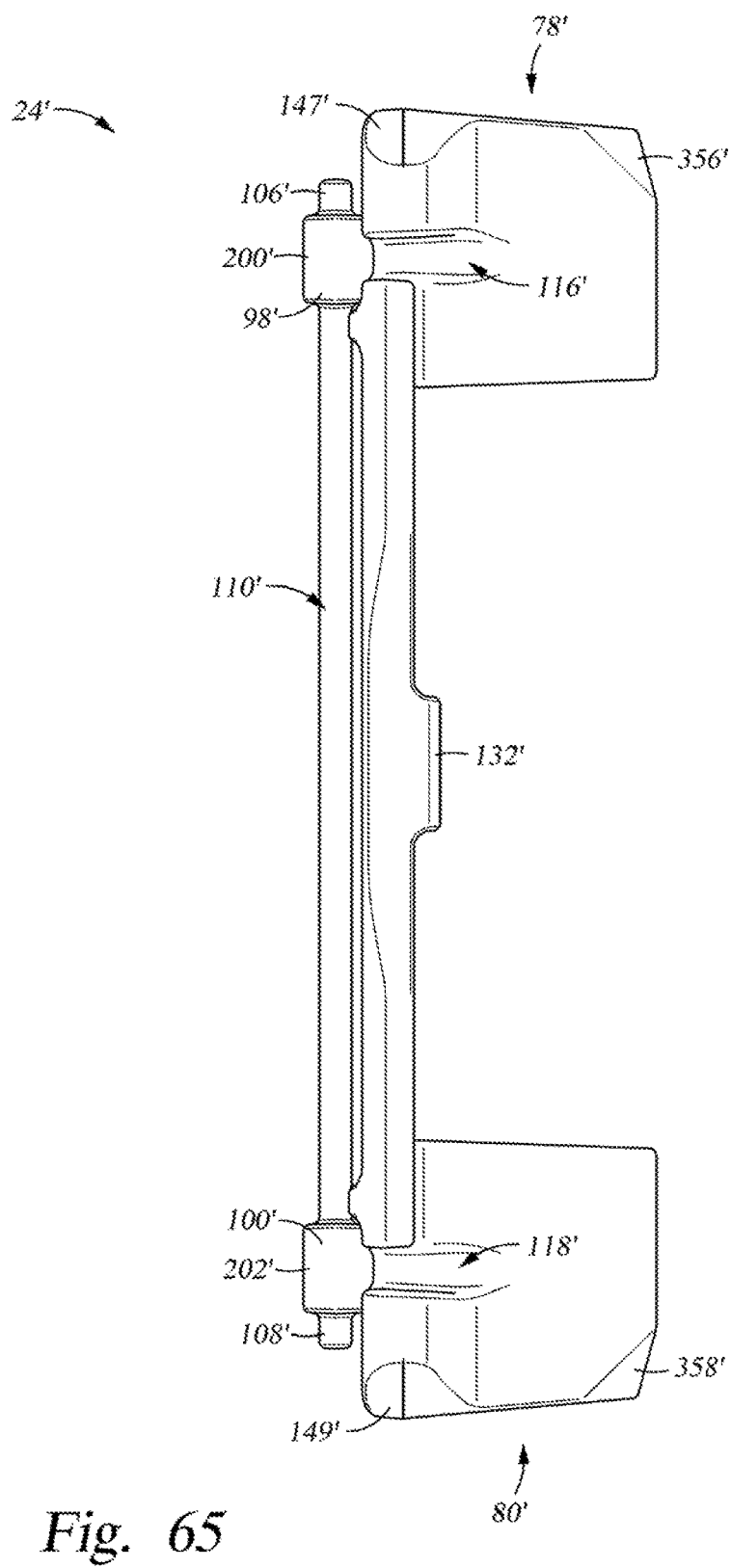
FIG. 65 is a side view of a ring.

Referring to FIG. 62, first ring section 78' has a first ring section u-bolt receiver 70' and second ring section has a second ring section u-bolt receiver 71', the ring u-bolt receivers 70' and 71', preferably, each extending substantially perpendicularly away from ring sections 78' and 80' and/or away from tubes 28 and 30 and/or coupling 26 when mounted, and adjacent to ring u-bolt slots 116' and 118', respectively, and each having an arcuate shape extending substantially coaxially from ring u-bolt slots 116' and 118' along ring sections 78' and 80' toward each other for receiving and rotatably and removably connecting u-bolt 124' as shown in FIG. 62.

Referring to FIGS. 35, 37-40, 46-47, 52-55, and 57, first base end 38' also includes a first hinge pin cover 209' and second base end 40' includes a second hinge pin cover 211', the hinge pin covers 209' and 211', each substantially opposite bumpers 120' and 122' and extending from tapers 258' and 260' angularly away from base ends 38' and 40' and/or away from tubes 28 and 30 and/or coupling 26 when mounted, respectively, for stiffening base ends 38' and 40' and shielding rotatably and removable connection of base 22' and ring 24'.

Referring to FIGS. 35, 37-40, 46-47, 52-55, and 57, first base end 38' has a first abutment receiver 94' and second base end 40' has a second abutment receiver 96', the abutment receivers 94' and 96', each substantially opposite u-bolt leg receivers 144' and 146', respectively, and extending inwardly in base ends 38' and 40' adjacent to base bumpers 120' and 122', respectively, for aligning and restraining the rotable and removable connection of base 22' and ring 24'.

Referring to FIGS. 52-53, 56, and 59, first base end 38' has a first base end hinge pin receiver 72' and second base end 40' has a second base end hinge pin receiver 74', the hinge pin receivers 72' and 74', extending substantially perpendicularly away from base ends 38' and 40' and/or away from tubes 28 and 30 and/or coupling 26 when mounted, and along base ends 38' and 40' on each side of abutment receivers 94' and 96', respectively, each having an arcuate shape extending substantially coaxially from hinge pin covers 209' and 211' toward each other for rotatably and removably connecting base 22' and ring 24'.

Referring to FIGS. 35-38, 40, 42-44, 60-62, and 64, u-bolt receiving rib 48' extends between u-bolt receivers 70' and 71' and hinge receiving rib 44' extends between hinge receivers 72' and 74'.

Figure 38:
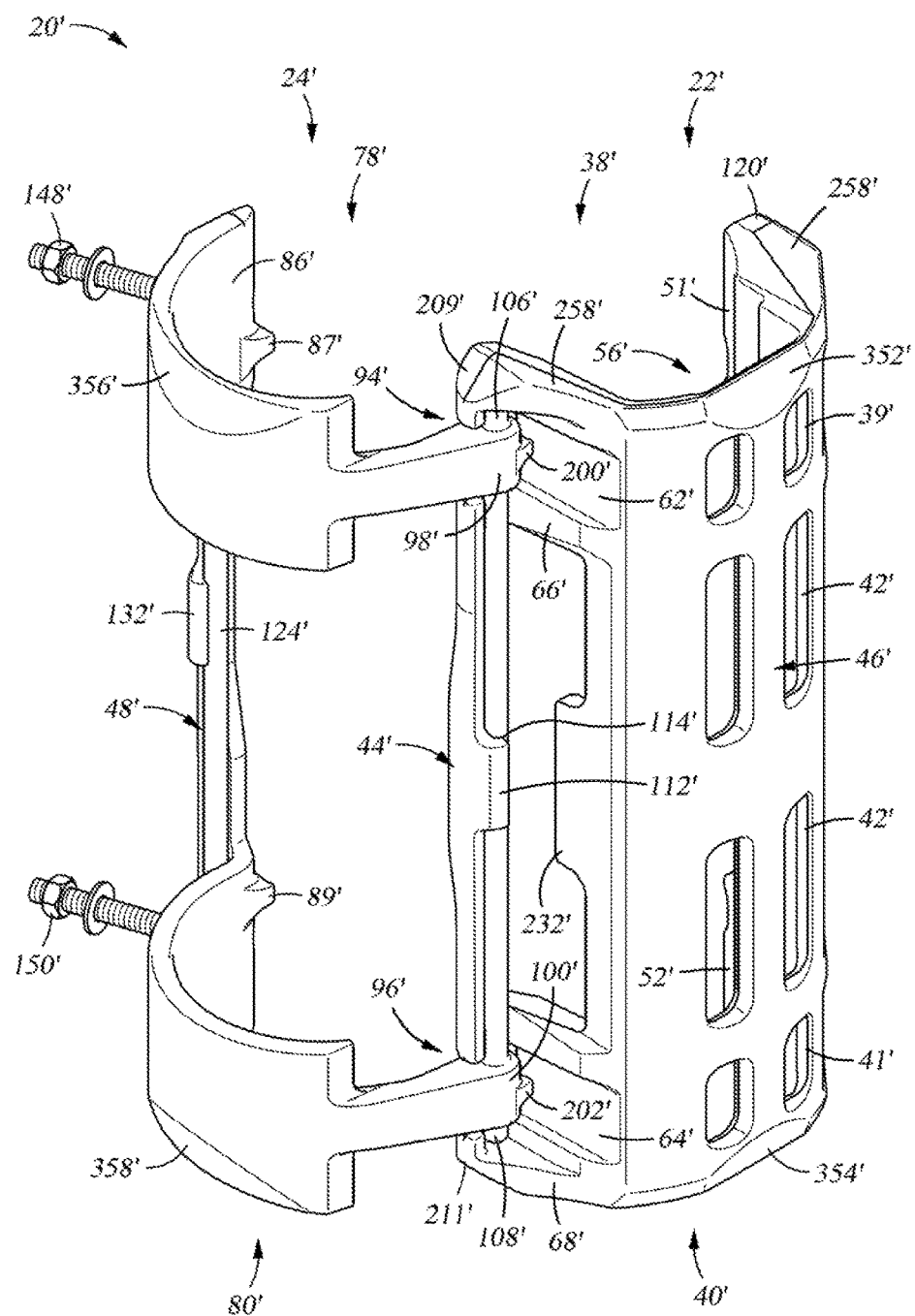
FIG. 38 is an isometric view of the outside of an assembly of a second embodiment of the present invention showing the base, ring, and u-bolt and the rotatably and removable connection of the base and ring and u-bolt and u-bolt receiving rib indicated by dashed lines in FIG. 35.
Figure 39:
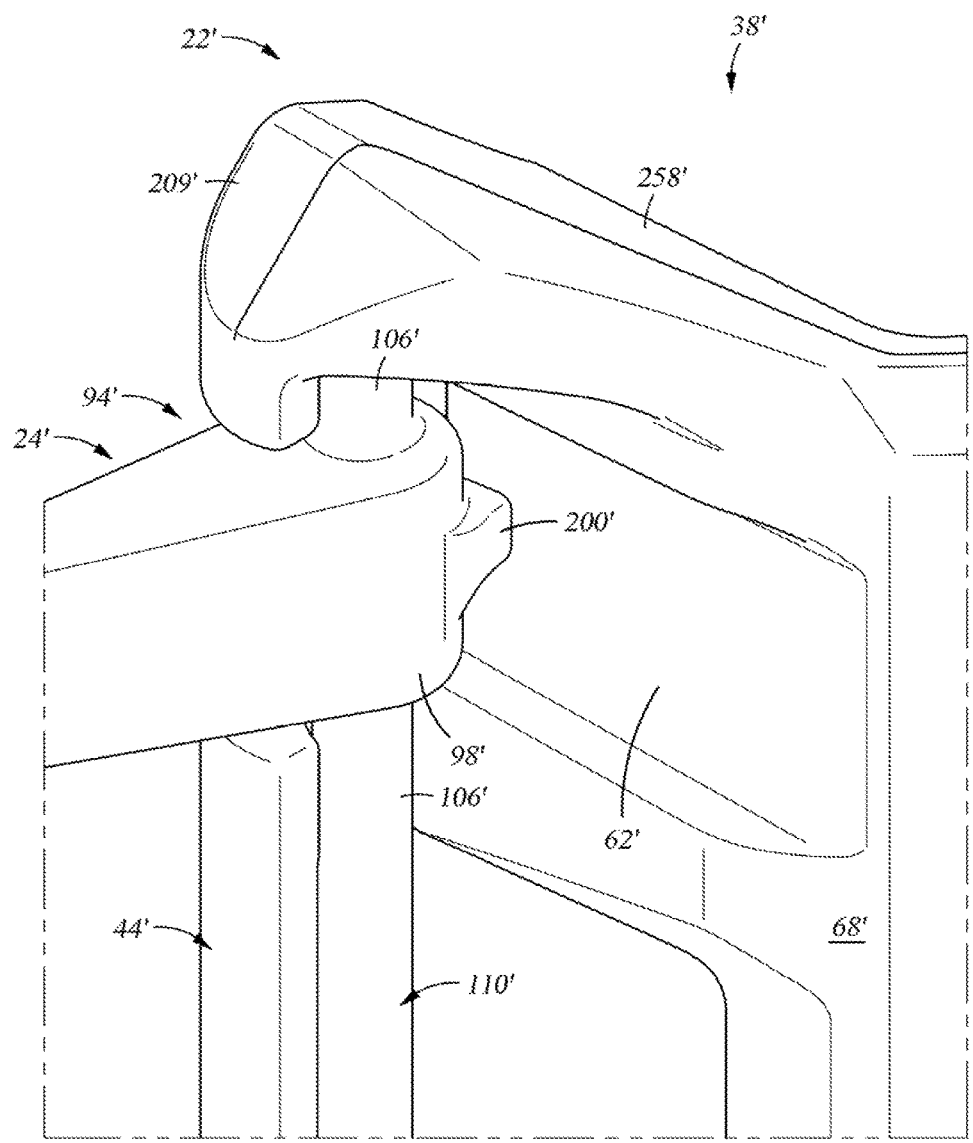
FIG. 39 is an isometric detail of an assembled cable guard as shown in FIG. 38 showing the rotatably and removable connection of the base and ring with the ring rotational stops contacting the lightering channels and/or outside surfaces and preventing over rotation of the ring and base.
Figure 40:
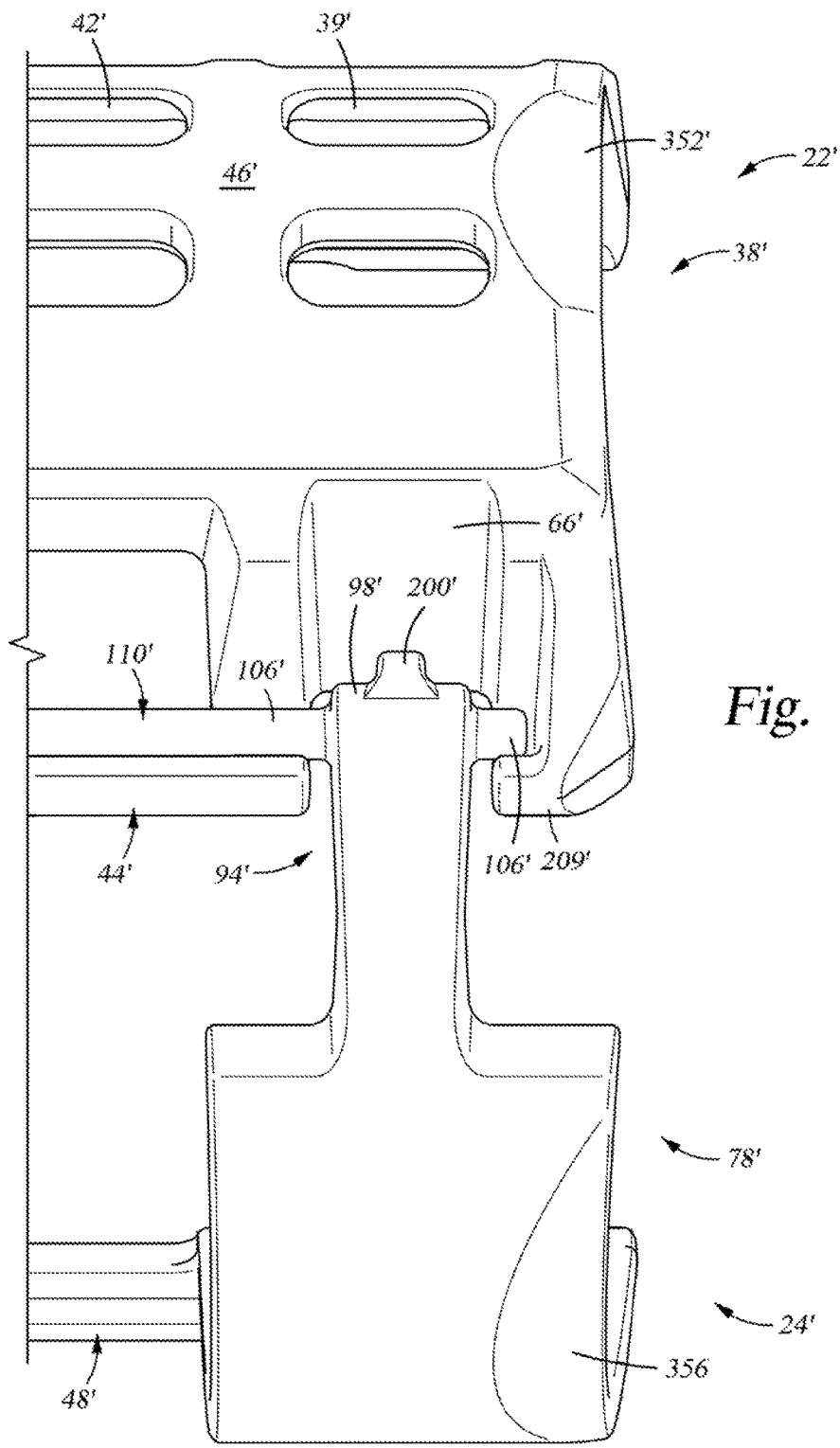
FIG. 40 is an isometric detail of an assembled cable guard as shown in FIG. 39 showing the rotatably and removable connection of the base and ring with the ring rotational stops contacting the lightering channels and/or outside surfaces and preventing over rotation of the ring and base.

Referring to FIGS. 35, 37-38, 43, and 57, first base end 38' has a pair of first lightering channels 62' and second base end 40' has a pair of second lightering channels 64', the lightering channels 62' and 64', substantially centered in base ends 38' and 40', and extending substantially opposite each other from abutment receivers 94' and 96' and u-bolt leg receivers 144' and 146', respectively, for reducing weight, stiffening base ends 38' and 40', aligning base 22' and ring 24' for assembly, and protecting the rotatable and removable connections of base 22' and ring 24' and u-bolt 124'. Preferably, as shown in FIGS. 38-39, and 41, rotational stops 200' and 202' contact outer surfaces 66' and 68' as shown in FIGS. 38-39 and 41.

Referring to FIGS. 35, 38, 46-48, 50, 52-56, 59, hinge receiving rib 44' includes a hinge rod engaging projection 112' substantially centrally positioned between base ends 38' and 40' adapted for receiving and removably engaging hinge rod 110', and hinge rod engaging projection 112' includes a rod face 114' shown in FIGS. 35 and 38 for frictionally engaging, deflecting, and receiving hinge rod 110' into hinge rod engaging projection 112'. Similarly, referring to FIGS. 43-44, 48-50, and 60-65, u-bolt receiving rib 48' includes a u-bolt engaging projection 132' substantially centrally positioned between ring sections 78' and 80' adapted for receiving and removably engaging u-bolt 124', and u-bolt engaging projection 132' includes a u-bolt face 134' shown in FIGS. 35-36 for frictionally engaging, deflecting, and receiving u-bolt 124' into u-bolt engaging projection 132'.

Referring to FIGS. 35-41, 45-47, 49, 60-65, and 67, hinge rod 110' further comprises a first hinge rod abutment 98' and a second hinge rod abutment 100', the abutments 98' and 100', substantially centrally aligned with and extending from ring sections 78' and 80' for aligning base 22' and ring 24' for assembly, being received into abutment receivers 94' and 96', and restraining displacement of base 22' relative to ring 24', and a first hinge pin 106' and a second hinge pin 108', hinge pins 106' and 108', extending substantially coaxially from each side of abutments 98' and 100', respectively, for being received into hinge receivers 72' and 74' and removably and rotably connecting base 22' to ring 24'.

Referring to FIGS. 37, 41, 43, 47, 54, 57, and 64, first base end 38' includes a first ring u-bolt leg receiver 144' and second base end 40' second ring section includes a second ring u-bolt leg receiver 146', the ring u-bolt leg receivers 144' and 146', each substantially opposite abutments receivers 94' and 96', respectively, and extending inwardly in base ends 38' and 40' adjacent to connecting rib 90' for cooperating with ring u-bolt slots 116' and 118' and receiving u-bolt legs 140' and 142', and connecting rib 90' extends along base ends 38' and 40' substantially between u-bolt leg receivers 144' and 146'.

Referring to FIGS. 36, 37, 43, 60-61, 64-65, and 67, first ring section 78' includes a first ring bumper 147' and second ring section 80' includes a second ring bumper 149', the ring bumpers 147' and 149', each extending angularly from ring sections 78' and 80' and/or away from tubes 28 and 30 and/or coupling 26 when mounted, and adjacent to ring u-bolt leg receivers 144' and 146', respectively, for protecting u-bolt legs 140' and 142' and bi-directionally guiding.

Referring to FIGS. 35, 38-41, 46-47, 49, 60-65, and 67, first abutment 98' includes a first ring section rotational stop 200' and second abutment 100' includes a second ring section rotational stop 202', the ring rotational stops 200' and 202', each substantially centered in abutments 98' and 100' for preventing over rotation and uncontrollable detachment of base 22' and ring 24'. Preferably, ring rotational stops 200' and 202' contact outer surfaces 66' and 68' and define an opening angle α'; as shown in FIGS. 38-41.

Referring to FIGS. 36, 38, 44-46, 60, 62, 63, and 65, first ring section 78' has a first ring section face 356' and second base end 40' has a second ring section face 358', the ring section faces 356' and 358', respectively, each are substantially centered in ring sections 78' and 80', extend substantially around a distal end of ring sections 78' and 80' and extend downward toward ring inner surfaces 86' and 88'.

Referring to FIGS. 35, 37-38, 40-41, 43-44, 47, and 52-57, first base end 38' has a pair of first base end slots 39' and second base end 40' has a pair of second base end slots 41', the base end slots 39' and 41', respectively, spaced apart and substantially centered in base ends 38' and 40' extending substantially between base end faces 352' and 354' and central rib 46'.

Referring to FIGS. 35, 37-38, 40-41, 43-44, 47, and 52-57, central rib 46' has a plurality of central rib slots 42' spaced apart and extending along central rib 46'; and central rib 46' has a pair of crushing resistors 232' substantially opposite each other, substantially centered between base ends 38' and 40', and extending substantially perpendicular inwardly from central rib 46' and/or toward tubes 28 and 30 and/or coupling 26, and a distal end of each of pair of crushing resistors 232' has a bearing face 234' adapted for matingly contacting the outside surface of tubes 28' and 30' and/or coupling 26'.

Referring to FIGS. 36, 41, 42-44, first ring bumper 147' has a first u-bolt rotational stop 121' and second ring bumper 122' has a second u-bolt rotational stop 123', the ring u-bolt rotational stops 121' and 123', extending from ring bumpers 147' and 149' toward each other partially across ring u-bolt slots 116' and 118', respectively, for limiting rotational and longitudinal displacement of u-bolt 124' and preventing over rotation and uncontrollable detachment of u-bolt 124'.

Referring to FIGS. 35, 37, 41, 61, and 67, first base end inner surface 51' has at least one array of first base compressible non-slip teeth 240' and second base end inner surface 52' has at least one array of second base compressible non-slip teeth 242', the base compressible non-slip teeth 240' and 242'; and first ring inner surface 86' has at least one array of first ring compressible non-slip teeth 251' and second ring inner surface 88' has at least one array of second ring compressible non-slip teeth 252', the ring compressible non-slip teeth 251' and 252'; and each of base compressible non-slip teeth 240' and 242' and ring compressible non-slip teeth 251' and 252' are adapted for partially mating with a portion of tubing string 32' and/or across coupling 26', if any, for compressingly engaging tubes 28' and 30' and/or tubing string 32', resisting longitudinal and rotational movement, and preventing damage to cable 34'.

Figure 66:
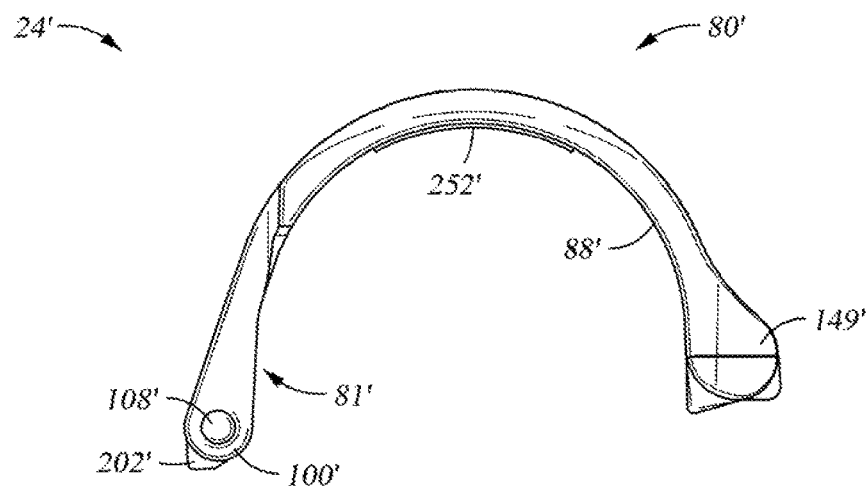
FIG. 66 is an end view of a ring.
Figure 67:
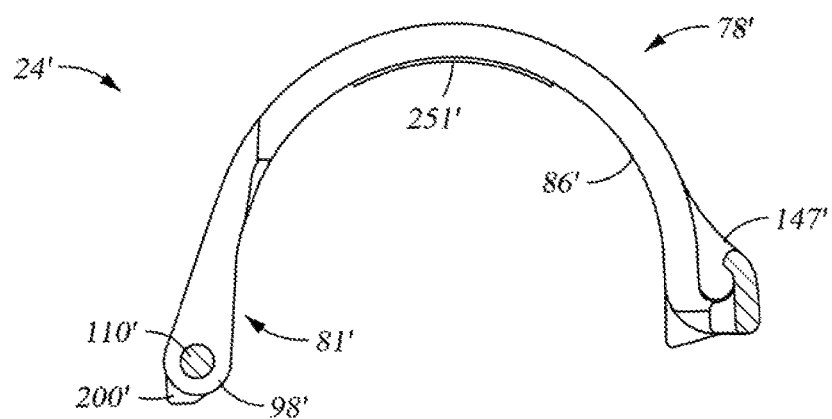
FIG. 67 is a cross-sectional view of a ring.

Referring to FIGS. 66 and 67, ring sections 78' and 80' have a closing gap 81' that extends from abutments 98' and 100' longitudinally across ring inner surfaces 86' and 88' and away from abutments 98' and 100' for rotating ring 24' in mounted cable guard 20' around tubes 28' and 30'.

Referring to FIGS. 35, and 37-38, base 22' and ring 24' may include elements to resist fracturing and tearing. Referring to FIG. 37, first ring section 78' includes a first ring tearing resistor 87' and second ring section 80' includes a second ring tearing resistor 89', the ring tearing resistors 87' and 89', extending outward from u-bolt receivers 70' and 71', respectively. Referring to FIG. 37, first base end 38' includes a first receptacle 83' and second base end 40' includes a second receptacle 85', the receptacles 83' and 85', respectively. Preferably, referring to FIG. 37, receptacles 83' and 85' are substantially aligned with ring tearing resistors 87' and 89' for mating with and receiving ring tearing resistors 87' and 89' when the present invention is mounted. Referring to FIGS. 35, 37, 46, 52-55, 57-59, first base end 38' has a first pair of tearing resistors 27' and second base end 40' has a second pair of tearing resistors 29', the base tearing resistors 27' and 29', extending outward from hinge receivers 72' and 74' and adjacent to each side of abutment receivers 94' and 96' and along respective base inner surfaces 51' and 52'.

Referring to FIGS. 35, 37-39, 41, 43-50, 52-57, and 59, hinge receiving rib 44' has a first hinge support 73' and a second hinge support 75', the hinge supports 73' and 75', extending from hinge receivers 72' and 74' along hinge receiving rib 44' toward each other, and u-bolt receiving rib 48' has a first u-bolt support 77' and a second u-bolt support 79', the u-bolt supports 77' and 79', extending from u-bolt receivers 70' and 71' along u-bolt receiving rib 48' toward each other for stiffening hinge receiving rib 44' and u-bolt receiving rib 48', providing support for resisting bending of hinge rod 110' and u-bolt 124', and resisting uncontrollable detachment.

Figure 44:
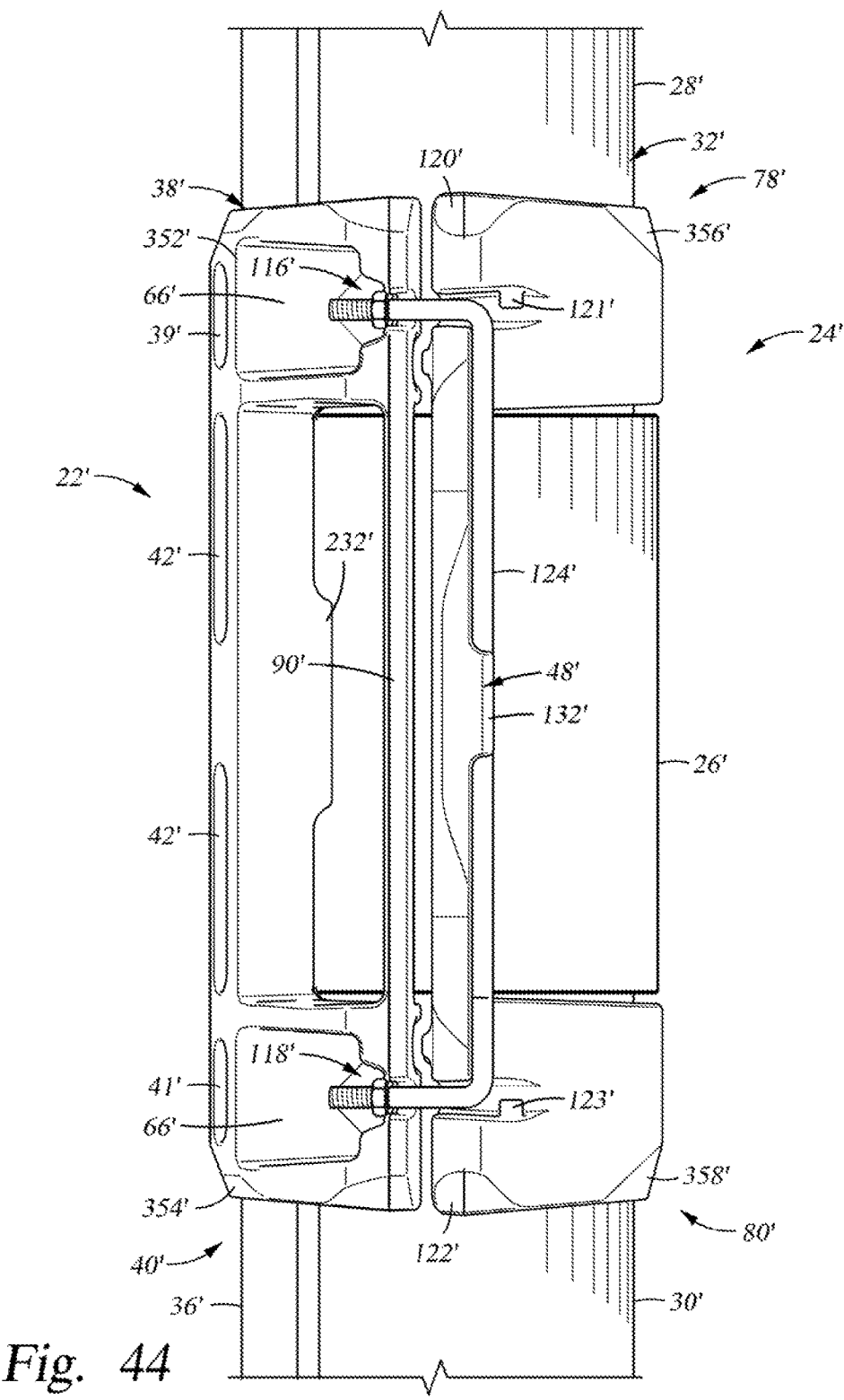
FIG. 44 is a side view of a cable guard mounted on a tubing string enclosing and protecting cables showing the u-bolt securing the cable guard to a tubing string.
Figure 45:
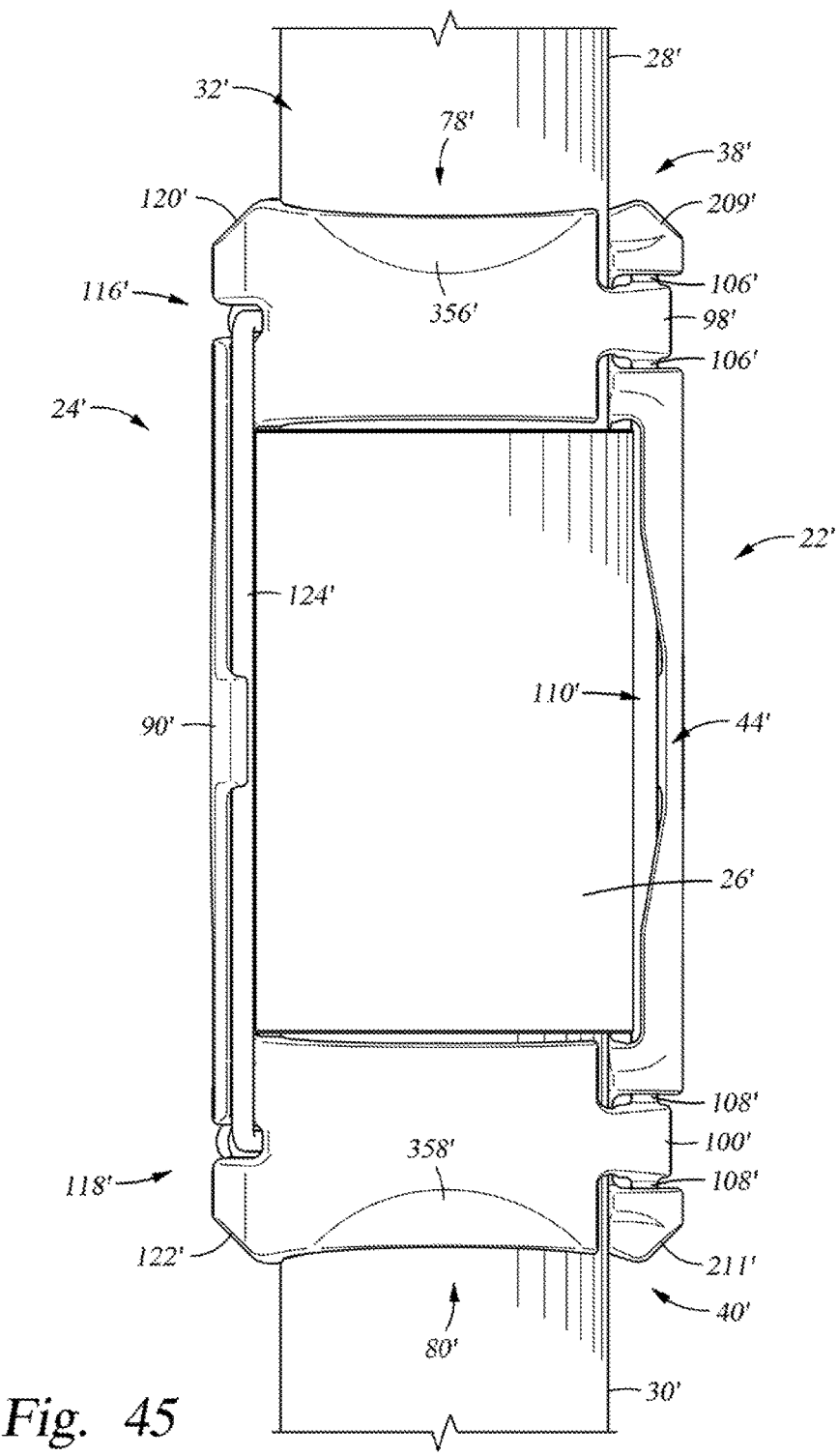
FIG. 45 is a side view of a cable guard mounted on a tubing string enclosing and protecting cables showing the u-bolt securing the cable guard to a tubing string.
Figure 46:
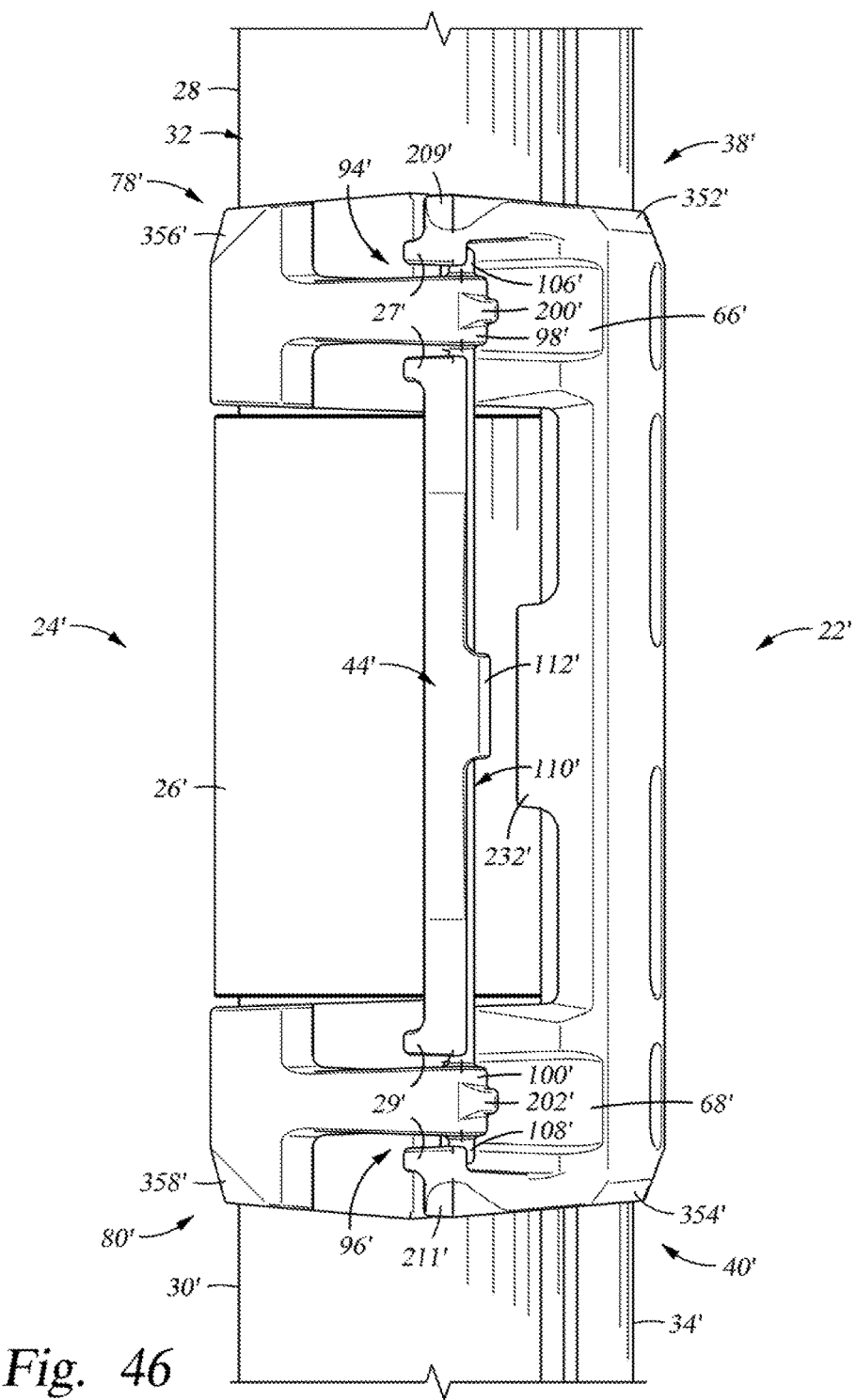
FIG. 46 is a side view of a ring and assembled cable guard mounted on a tubing string enclosing and protecting cables of the side opposite FIG. 44.
Figure 47:
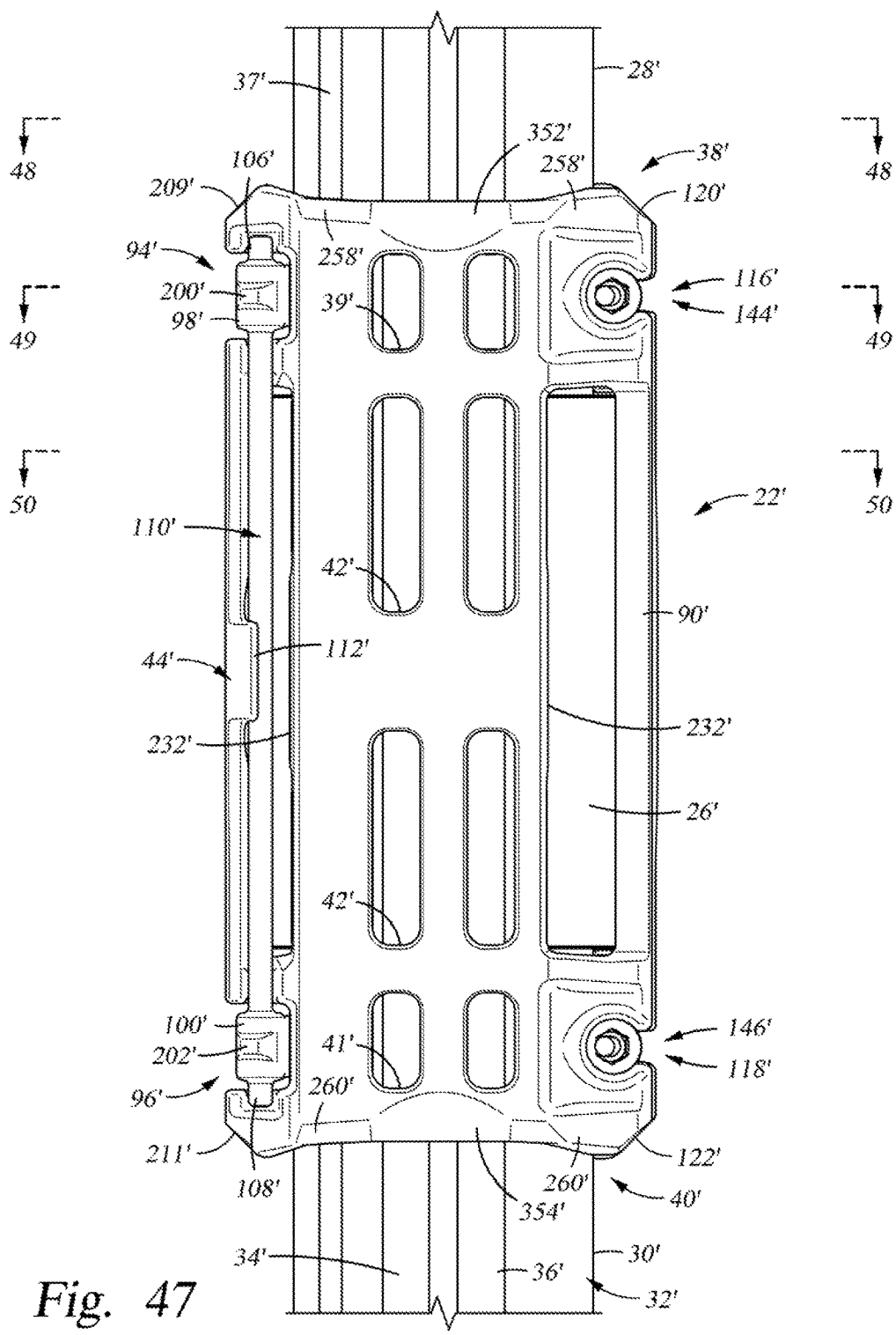
FIG. 47 is a side view of a base and assembled cable guard mounted on a tubing string enclosing and protecting cables of the side opposite FIG. 45.

Referring to FIGS. 41, 49, 50, 52, and 58-59, central rib 46' has a third channel 57' extending substantially parallel to and at least partially along central rib 46' for protecting the cable 37'. Referring to FIG. 41, ring sections 78' and 80' include a data channel 97', extending across ring inner surfaces 86' and 88' for protecting a data cable that is not shown. Referring to FIG. 44, data channel 97' might not be included where ring sections 78' and 80' do not extend above coupling 26 because of the limited space in a relatively smaller casing.

Figure 49:
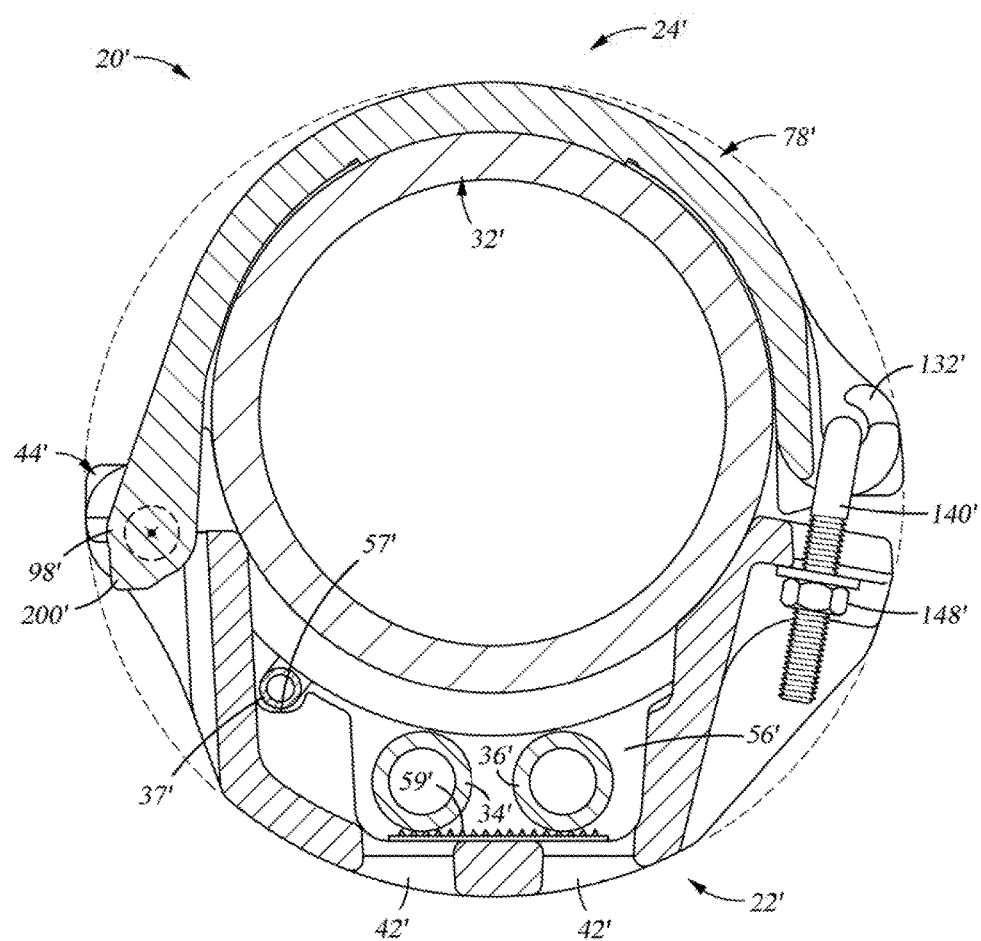
FIG. 49 is a cross-sectional view at the u-bolt slot of a base, ring, and assembled cable guard mounted on a tubing string enclosing and protecting cables.
Figure 50:
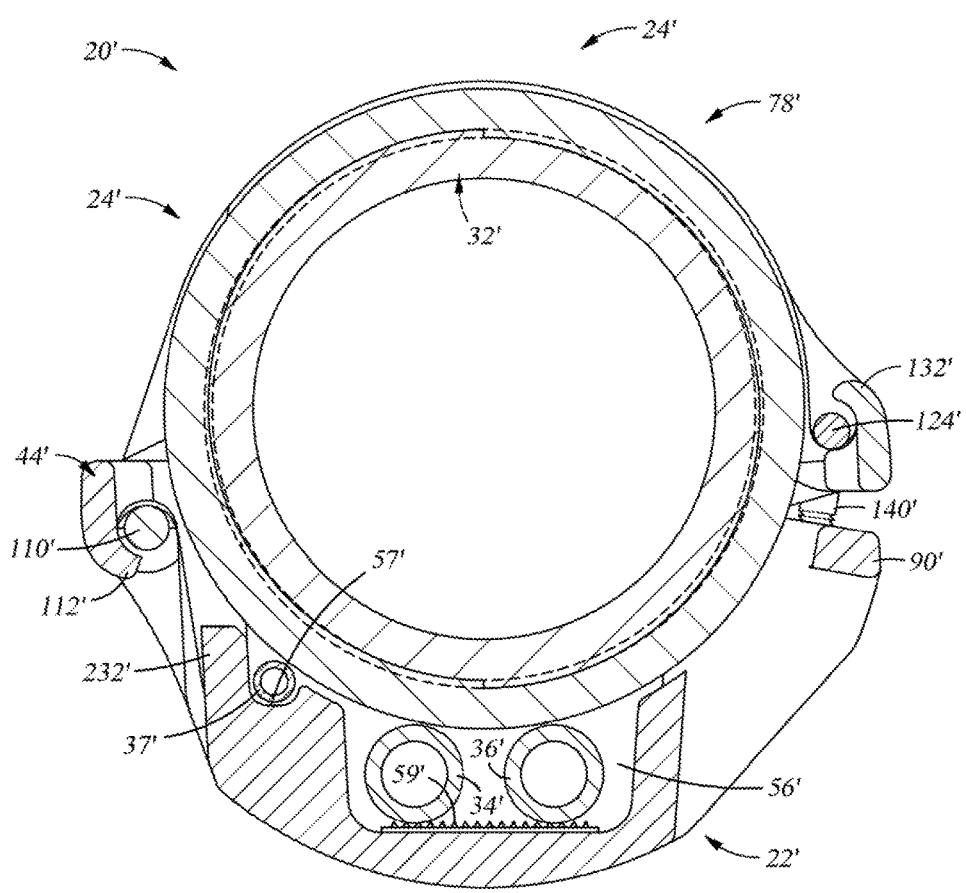
FIG. 50 is a cross-sectional view at the center of the cable guard of a base, ring, and assembled cable guard mounted on a tubing string enclosing and protecting cables that also shows the cable gripping teeth biasing cables against the coupling.
Figure 51:
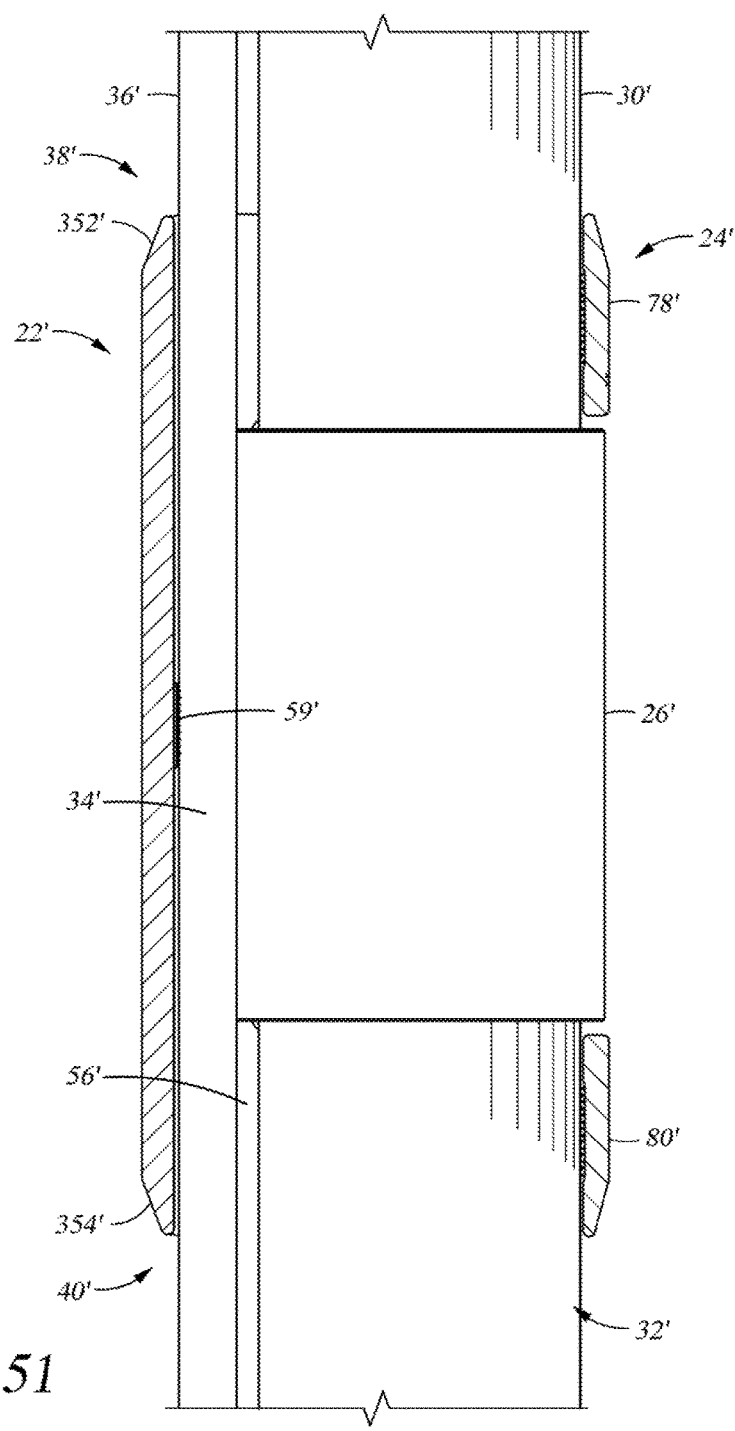
FIG. 51 is a cross-sectional view of a cable guard mounted on a tubing string enclosing and protecting cables that also shows a typical design circle and the ellipsoids on the surface of the base and ring.

Referring to FIGS. 49 and 51, central rib 46' has an adjustment pad 61', extending inwardly from central rib 46' and/or toward coupling 26' for biasing cables 34' and 36' against coupling 26'. Referring to FIGS. 49, 51, adjustment pad 61' has at least one array of cable gripping teeth 59' extending inwardly from adjustment pad 61' and/or toward coupling 26' for biasing cables 34' and 36' against coupling 26' and gripping cables 34' and 36'.

Referring generally to FIGS. 2-5 and 35-38, two (2) steps are required to assemble first embodiment of the present invention: 1) rotatably and removably connecting base 22 to ring 24; and 2) installing u-bolt 124 in u-bolt receivers 70 and 71 and under u-bolt projection 132. Generally, referring to FIGS. 2-5, and FIGS. 35-38 base 22 and ring 24 and base 22' and ring 24' are rotatably and removably connected by hinge rod 110 or 110'.

In general, the following discussion relates to the first embodiment, and a user may similarly assemble the second embodiment of the present invention.

In general, the assembly of base 22 and ring 24 and installation of u-bolt 124 begins with either a balanced or unbalanced positioning. In general, hinge rod 110 and u-bolt 124 are installed by applying forces to bow, bend, or deflect hinge rod 110 or u-bolt 124 over the respective projections and into respective receivers.

Referring generally to FIGS. 2 and 5, the balanced assembly of base 22 and ring 24 begins with base 22 and ring 24 in a first relative position with abutments 98 and 100 positioned above hinge abutment receivers 94 and 96 and hinge rod 110 resting on hinge rod engaging projection 112. The base 22 and ring 24 may be assembled at any angle less than or equal to an opening angle α shown in FIG. 8; and, preferably, where opening angle α is about forty-five (45) degrees; and ring rotational stops 200 and 202 should be near or resting against base ends 38 and 40. Alternatively, in another step, preferably, the assembly begins with an unbalanced positioning where one of abutments 98 and 100 may be aligned with the respective abutment receivers 94 and 96 with hinge rod 110 resting on hinge rod engaging projection 112 and at least one of ring rotational stops 200 and 202 should be near or resting against base ends 38 and 40. Next, in either of the balanced or unbalanced assembly, as a user strikes one of abutments 98 and 100 or central portion of hinge rod 110, central portion of hinge rod 110 frictionally slides along hinge rod engaging projection 112 and across rod face 114 and hinge rod 110 is bent or bowed as shown by dashed lines in FIG. 5 and hinge rod 110 is received into hinge rod engaging projection 112, and hinge pins 106 and 108 are seated in hinge pin receivers 72 and 74, and base 22 and ring 24 are rotatably and removably attached. The bending of hinge rod 110 for the unbalanced assembly is not shown in the figures because the hinge rod is shown substantially symmetrically bending around the hinge rod engaging projection 112.

Referring to FIGS. 2 and 3, in the balanced assembly, u-bolt 124 is aligned in a first relative position near u-bolt receivers 70 and 71 with the central portion of u-bolt 124 substantially parallel to u-bolt receiving rib 48 and resting on u-bolt engaging projection 132, as shown superimposed by dashed lines in FIG. 3. The u-bolt 124 should be at or near the assembly position, and u-bolt legs 140 and 142 should be near or resting against u-bolt rotational stops 121 and 123 as shown in FIG. 8. In the unbalanced assembly, preferably, u-bolt 123 is in a relative position near u-bolt receivers 70 and 71 with the central portion of u-bolt 124 extending angularly from one of u-bolt receivers 70 and 71 and resting on u-bolt engaging projection 132. Next, in either of the balanced or unbalanced assembly, referring to FIG. 3, as a user strikes u-bolt 124, the central portion of u-bolt 124 frictionally slides along u-bolt engaging projection 132 and across u-bolt face 134 and u-bolt 124 is bent or bowed as shown by dashed lines in FIG. 3 and u-bolt 124 is received into u-bolt engaging projection 132 and seated in u-bolt receivers 70 and 71, and u-bolt 124 is rotatably and removably attached.

After completing these steps, hinge rod 110 and u-bolt 124 are rotatably biased between the respective projections and related receivers as shown in FIGS. 2-5 and 35-38. Finally, these steps may be performed interchangeably, and the balanced and unbalanced assemblies for the second embodiment follow substantially the same procedure.

Referring to FIGS. 3 and 5, generally, the present invention may be disassembled by prying. A user may disassemble and replace u-bolt 124 or replace or interchange base 22 and ring 24 having different primary channels 56 and 58, secondary channels 63 and 65, third channel 57, or data channel 97 or other elements with an existing base 22 or ring 24. Referring to FIG. 5, any suitable prying implement may be placed between hinge receiving rib 44 and central portions of hinge rod 110 to apply forces that urge hinge rod 110 from hinge rod engaging projection 112 and across rod face 114 where hinge pins 106 and 108 are released, and base 22 and ring 24 are removably detached. Similarly, referring to FIGS. 3 and 36, u-bolt 124 is disassembled by prying u-bolt 124 clear of u-bolt face 134 and u-bolt engaging projection 132 and releasing u-bolt 124 from u-bolt receivers 70 and 71.

The first embodiment of the present invention may be mounted in the following steps.

First, referring to FIGS. 1 and 4-5, and all figures generally, ring 24 is rotated away from base 22 causing cable guard 20 to open as shown in FIGS. 1, 3, 8, 37, and 38.

Next, referring to FIG. 1, base 22 is aligned for positioning about coupling 26, if any, and cables placed in primary channels 56 and 58 and secondary channels 63 and 65, or third channel 57, and ring data channel 97, if any, and base 22 is moved toward coupling 26 and on tubes 28 and 30 as shown by dashed lines in FIG. 1.

Third, typically, base ends 38 and 40 are drawn together and base 22 contacts tubes 28 and 30 and resists mounting, and, if so, base 22 may be struck or tapped with a hammer for mounting on tubes 28 and 30 and cause base inner surfaces 51 and 52 or base compressible non-slip teeth 240 and 242, if any, and ring compressible non-slip teeth 251 and 252, if any, to contact outer surface of tubes 28 and 30. Preferably, as shown in FIG. 1, nuts 148 and 150 are pre-installed onto u-bolt legs 140 and 142, after placing suitable washers, typically a locking-type washer, if a washer is selected, and preferably a serrated flange nut 150 as shown in FIG. 2, on u-bolt legs 140 and 142, to secure base ends 38 and 40 to ring sections 78 and 80 and mount cable guard 20 on tubing string 32.

Next, ring 24 is rotated to the position shown in FIG. 1 and u-bolt legs 140 and 142 are rotated in u-bolt slots 116 and 118 and received into u-bolt leg receivers 144 and 146. Typically, ring 24 is not struck with a hammer like the base 22.

Next, if not pre-installed, washers and nuts 148 and 150 may be installed with nuts 148 and 150 positioned near the distal ends of u-bolt legs 140 and 142.

Figure 43:
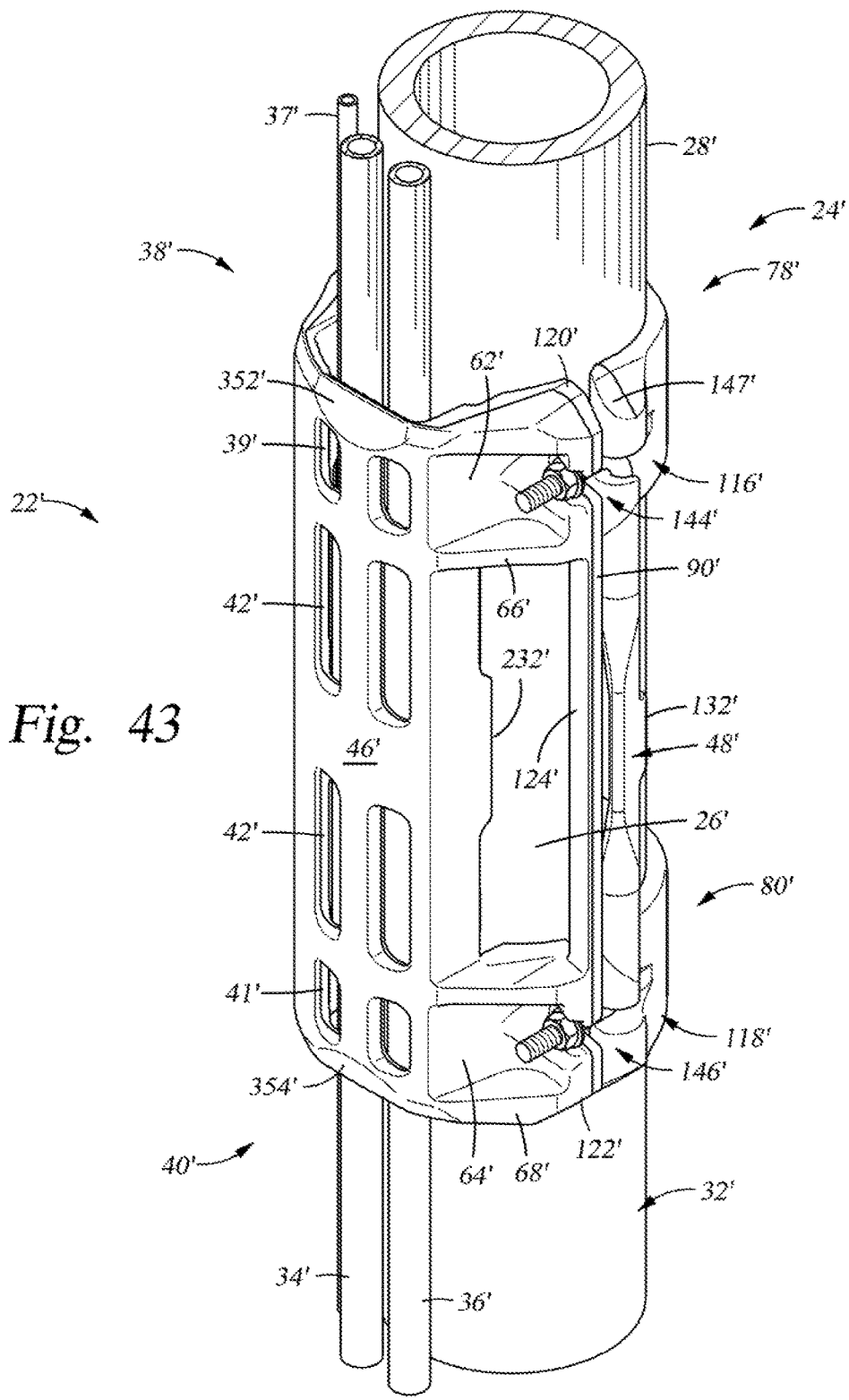
FIG. 43 is a perspective view of a cable guard mounted on a tubing string enclosing and protecting cables.

Finally, typically, an impact wrench is applied to nuts 148 and 150, and as nuts 148 and 150 are rotated, tension increases in u-bolt legs 140 and 142, and either base inner surfaces 51 and 52 and ring inner surfaces 86 and 88 frictionally engage tubing string 32 and/or base compressible non-slip teeth 240 and 242, if any, and ring compressible non-slip teeth 251 and 252, if any, compressingly engage tubing string 32. A torque wrench may be applied to check the torque and/or tension in u-bolt legs 140 and 142 and the present invention is now mounted on tubes 28 and 30 and/or tubing string 32 protecting cables as shown in FIGS. 10, 16, and 43. Similar steps may be used to mount the second embodiment.

All embodiments of the present invention are preferably integrally formed and manufactured as a ductile iron sand casting, and u-bolt 124 and 124' and nuts may be manufactured by any method of making bolting materials and fasteners, preferably, of stainless steel, with rolled threads. The present invention is preferably made from ductile iron for its properties and lower costs compared to other materials and manufacturing processes; however, base 22 and 22' and ring 24 and 24' may be made of any suitable steel, ductile iron, aluminum, magnesium, alloys, polycarbonate, or other similar metals or materials. Advantageously, manufacturing costs may be minimized by creating tooling with parting lines and elements positioned where a core is not required. Parting lines may be seen on many elements of the present invention. For example, one parting line is shown on taper 258 in FIG. 10 where base end faces 352 and 354 transition to base end tapers 258 and 260.

The u-bolt 124 and 124' and nuts 148 and 148' and 150 and 150' may be made of various materials. The u-bolts 124 and nuts 148 and 150 are preferably made of grade 304 stainless for u-bolts having a diameter greater than 0.312" and grade 316 stainless for u-bolts having a diameter less than 0.312". U-bolts are typically provided in a uniform diameter and do not include a taper. Other metals, such as carbon steel, are not preferred because of fluids in well environments and related corrosion. Other exotic alloys, may be used where well conditions dictate.

Changes in the ovality or curvature of the casing make the ductility of the material important, and ductile iron may be available, for example, as Ferritic Grade 5, derritic-Pearlitic Grade 3, Pearlitic Grade 1 Martensitic, Tempered Martensitic, ADI Grade 150, ADI Grade 230, and Austenitic. Preferably, except for the u-bolt and nuts, the present invention are made of ductile iron having the ductile iron having a minimum tensile strength of 60 kips per square inch; minimum yield strength of 40 kips per square inch; and minimum elongation percentage in two (2) inches of eighteen percent (18%). Finally, an acrylic-polycarbonate alloy material having sufficient heat resistance may be used to injection mold the present invention. Cyrex® 300, manufactured by Evonik Industries AG, is one suitable acrylic-polycarbonate alloy, having a deflection temperature of about 253 degrees Fahrenheit and vicat softening point of about 306 degrees Fahrenheit.

Even though some elements of the present invention are selected or have dimensions or clearance related to the dimensions of coupling 26, the present invention is suitable for mounting on tubes 28 and 30, and the relative dimensions may be changed.

In all embodiments, base compressible non-slip teeth 240 and 242 and 240' and 242' and ring compressible non-slip teeth 251 and 252 and 251' and 252' may be of any shape, configuration, and location. Preferably, the compressible non-slip teeth are situated along a parting line and are sized such that the tension forces are capable of deforming and compressing these elements to increase the holding force between the present invention and tubes 28 and 30.

The present invention is engaged by tensioning u-bolt legs 140 and 142 or u-bolt legs 140' and 142'; and, as additional torque is applied, tension increases along with respective reactive forces that generally frictionally engage the present invention to tubes 28 and 30. The present invention is also compressingly engaged because the contact patch area of the base compressible non-slip teeth 240 and 242 and 240' and 242' and ring compressible non-slip teeth 251 and 252 and 251' and 252' is adapted to yield and deform to conform to the surface irregularities, ovality, drift, and other deformations in tubes 28 and 30. Friction and related resistance are enhanced by deforming and/or compressing 240 and 242 and 240' and 242' and ring compressible non-slip teeth 251 and 252 and 251' and 252'.

The base 22' and ring 24' may be relatively thin when the present invention is adapted to operate in casings less than about four (4) inches in diameter. The metallurgy, temperatures, and cooling rates, and other factors may affect the microstructure of ductile irons. The ductile iron or other materials may be heat treated where the microstructure does not meet the applicable customer or American Society for Testing Materials specification.

The present invention is well adapted to carry out the objects and attain the ends and advantages mentioned as well as those inherent therein. While a preferred embodiment has been described for purposes of this disclosure, numerous changes may be made which will readily suggest themselves to those skilled in the art and which are encompassed in the spirit of the invention disclosed and as defined in the claims.

What is claimed is:

1. A cable guard for mounting on at least a first tube and/or across a coupling in a tubing string and protecting at least a first cable, comprising:
    a base, a ring, and a u-bolt;
        the u-bolt includes a first leg and a second leg, the u-bolt legs, that are threaded to receive a first nut and a second nut, the nuts;
        the ring includes a first ring section and a second ring section, the ring sections, and a connecting rib, a central ring connecting rib, and a hinge rod for connecting the ring sections;
            the central ring connecting rib is between the connecting rib and the hinge rod and extends outwardly from and partially across the ring sections for stiffening the ring sections and bi-directionally guiding;
        the base includes a first base end and a second base end, the base ends, and a hinge receiving rib, a central rib, and a u-bolt receiving rib for connecting the base ends;
        the central rib is between the hinge receiving rib and the u-bolt receiving rib and extends between base ends;
        the first base end has a first base end inner surface and the second base end has a second base end inner surface, the base inner surfaces, and the first base end has a first base end outer surface and the second base end has a second base end outer surface, the outer surfaces, extending outward from base inner surfaces;
        the first base end has a first base end primary cable protecting channel and second base end has a second base end primary cable protecting channel, the primary channels, substantially centered in and extending through base ends and toward each other for protecting at least one cable;
        the first ring section includes a first ring inner surface and the second ring section includes a second ring inner surface, the ring inner surfaces, the base inner surfaces and the ring inner surfaces are adapted for partially mating and frictionally engaging a portion of at least one tube and resisting longitudinal and/or rotational movement when the cable guard is mounted;
        the first base end has a first base end face and a first base end taper and second base end has a second base end face and a second base taper, the base end tapers and the base end faces, respectively, for bi-directionally guiding;
            the base end tapers extend substantially around the base ends opposite the central rib, the base end faces and are substantially centered in the base ends and opposite the central rib and extend downward from the outer surfaces and to a central portion of base end tapers;
        the first base end has a first base bumper and the second base end has a second base bumper, the base bumpers, extending from the tapers and angularly away from the base ends, respectively, for shielding the u-bolt and bi-directionally guiding;
        the first base end includes a first u-bolt slot and second base end includes a second u-bolt slot, the u-bolt slots, each substantially centered and extending inwardly in the base ends and adjacent to the bumpers for rotating the u-bolt legs and through the base ends;
        the first base end has a first base end u-bolt receiver and second base end has a second base end u-bolt receiver, the u-bolt receivers, each extending substantially perpendicularly away from the base ends and adjacent to the u-bolt slots and each having an arcuate shape extending substantially coaxially from the u-bolt slots and along the base ends and toward each other for receiving and rotatably and removably connecting the u-bolt;
        the first base end also includes a first hinge pin cover and second base end includes a second hinge pin cover, the hinge pin covers, each substantially opposite the bumpers and extending from the tapers and angularly away from the base ends for stiffening the base ends and shielding the rotatably and removable connection of the base and the ring;
        the first base end includes a first abutment receiver and the second base end includes a second abutment receiver, the abutment receivers, each substantially opposite the u-bolt slots and extending inwardly in the base ends and adjacent to the hinge pin covers for aligning and restraining the rotable and removable connection of base and ring;
        the first base end has a first base end hinge pin receiver and second base end has a second base end hinge pin receiver, the hinge pin receivers, extending substantially perpendicularly away from the base ends and along the base ends and on each side of the abutment receivers each having an arcuate shape extending substantially coaxially from the hinge pin covers and toward each other for rotatably and removably connecting base and ring;
    the u-bolt receiving rib extends between the u-bolt receivers and the hinge receiving rib extends between the hinge receivers;
    the base has a base longitudinal stiffener extending outwardly from the base substantially between the base end faces and a plurality of base cross-sectional stiffeners, the base longitudinal stiffener is substantially centered in the base ends and the central rib and the plurality of base cross-sectional stiffeners are spaced apart extending outwardly from the base substantially perpendicular to the base longitudinal stiffener for stiffening the base ends and the central rib;

the first base end has a pair of first lightering channels and second base end has a pair of second lightering channels, the lightering channels, each substantially centered in the base ends and extending substantially opposite each other from the abutment receivers and the u-bolt slots for reducing weight, stiffening the base ends, aligning the base and the ring for assembly, and protecting the rotatable and removable connections of the base and the ring and the u-bolt;

the hinge receiving rib includes a hinge rod engaging projection substantially centrally positioned between the base ends and adapted for receiving and removably engaging the hinge rod;

the hinge rod engaging projection includes a rod face for frictionally engaging, deflecting, and receiving the hinge rod into the hinge rod engaging projection;

the u-bolt receiving rib includes a u-bolt engaging projection substantially centrally positioned between the base ends and adapted for receiving and removably engaging the u-bolt;

the u-bolt engaging projection includes a u-bolt face for frictionally engaging, deflecting, and receiving the u-bolt into the u-bolt engaging projection;

the hinge rod further comprises a first hinge rod abutment and a second hinge rod abutment, the abutments, substantially centrally aligned with and extending from the ring sections for aligning the base and the ring for assembly, being received into the abutment receivers, and restraining displacement of the base relative to the ring, a first hinge pin and a second hinge pin, the hinge pins, extending substantially coaxially from each side of the abutments for being received into the hinge receivers and removably and rotatably connecting the base to the ring, and a pair of tapers extending substantially coaxially from the hinge pins for transitioning to a smaller diameter in a central portion of hinge rod;

the first ring section includes a first ring u-bolt receiver and second ring section includes a second ring u-bolt leg receiver, the u-bolt leg receivers, each substantially opposite the abutments and extending inwardly in the ring sections and adjacent to the connecting rib for cooperating with the u-bolt slots and receiving the u-bolt legs;

the connecting rib extends along the base ends and substantially between the u-bolt leg receivers;

first ring section also includes a first ring bumper and second ring section includes a second ring bumper, the ring bumpers, each extending angularly from the ring sections and adjacent to the u-bolt leg receivers for protecting the u-bolt legs and bi-directionally guiding;

the ring sections have a radial stiffener extending outwardly and substantially between the abutments and the u-bolt leg receivers and a pair of ring section cross-sectional stiffeners extending outwardly and substantially perpendicular to and on each side of the radial stiffener and substantially equally spaced apart on each side of the central ring connecting rib for stiffening the ring sections and bi-directionally guiding;

the first abutment includes a first ring section rotational stop and the second abutment includes a second ring section rotational stop, the ring rotational stops, each substantially centered in and extending from the abutments for preventing over rotation and uncontrollable detachment of the base and the ring; and the first lightering channel has a first step and second lightering channel has a second step, the steps, extending from the abutment receivers along the lightering channels for contacting the ring rotational stops and defining an opening angle $\alpha$;

the first ring section has a first ring section face and second ring section has a second ring section face, the ring section faces, each substantially centered in the ring sections, extending around the ring sections substantially between the pair of cross-sectional stiffeners and substantially from the central connecting rib and the pair of cross-sectional stiffeners downward toward the ring inner surfaces;

whereby the cable guard is assembled, at least one cable is enclosed, and the cable guard is mounted, and the u-bolt is tensioned by tightening the nuts and the tension frictionally engages base inner surfaces and ring inner surfaces and to the first tube and the second tube and/or across a coupling in a tubing string.

2. The cable guard as claimed in claim 1, wherein:

the first base end has a pair of first base end slots and second base end has a pair of second base end slots, the base end slots, on each side of the base longitudinal stiffener;

the central rib has a plurality of central rib slots on each side of the base longitudinal stiffener extending substantially between the cross-sectional stiffeners; and the central rib has a pair of crushing resistors substantially opposite each other, substantially centered between the base ends, and extending substantially perpendicularly downward from the central rib and/or toward the tubes and/or coupling, and a distal end of each of the pair of crushing resistors has a bearing face adapted for matingly contacting the outside surface of at least one tube, the tubing string, and/or the coupling.

3. The cable guard as claimed in claim 2, wherein:

first base bumper has a first u-bolt rotational stop and second base bumper has a second u-bolt rotational stop, the u-bolt rotational stops, extending from the bumpers and toward each other partially across the u-bolt slots for limiting rotational and longitudinal displacement of the u-bolt and preventing over rotation and uncontrollable detachment of the u-bolt.

4. The cable guard as claimed in claim 3 wherein:

the first base end inner surface has at least one array of first base compressible non-slip teeth and the second base end inner surface has at least one array of second base compressible non-slip teeth, the base compressible non-slip teeth;

the first ring inner surface has at least one array of first ring compressible non-slip teeth and the second ring inner surface has at least one array of second ring compressible non-slip teeth, the ring compressible non-slip teeth; and each of the base compressible non-slip teeth and the ring compressible non-slip teeth and extend from and above the base inner surfaces and the ring inner surfaces, respectively, and are adapted for partially mating with a portion of at least one tube, the tubing string, and/or across the coupling, if any, for compressingly engaging at least one tube and/or the tubing string, resisting longitudinal and rotational movement, and preventing damage to the cable.

5. The cable guard as claimed in claim 4 wherein:
the ring sections include a closing gap that extends from the abutments and longitudinally across the ring inner surfaces and away for rotating the ring in a mounted cable guard around at least one tube.

6. The cable guard as claimed in claim 5 wherein:
the first base end has a first pair of tearing resistors and the second base end has a second pair of tearing resistors, the base tearing resistors, extending outward from the hinge receivers and substantially adjacent to each side of the abutment receivers and along the respective base inner surfaces;
the base ends and has a third base tearing resistor extending from each of the u-bolt receivers and adjacent to the u-bolt slots and along each of respective base inner surfaces; and
the hinge receiving rib has a first hinge support and a second hinge support, the hinge supports, extending from the hinge receivers and along the hinge receiving rib toward each other, and the u-bolt receiving rib has a first u-bolt support and a second u-bolt support, the u-bolt supports, extending from the u-bolt receivers and along the u-bolt receiving rib toward each other for stiffening the hinge receiving rib and the u-bolt receiving rib, providing support for resisting bending of the hinge rod and the u-bolt and resisting uncontrollable detachment.

7. The cable guard as claimed in claim 6, wherein:
the base has a first base partial ellipsoid having a surface extending away from an outside surface of the central rib to a highest point on the base longitudinal stiffener and tangent to a centrally positioned and/or widest of plurality of cross-sectional stiffeners for bi-directionally guiding where the base longitudinal stiffener and the distal ends of plurality of base cross-sectional stiffeners are substantially within the first base ellipsoid.

8. The cable guard as claimed in claim 6, where the cable guard is mounted on a tubing string in a casing having a casing center wherein:
the base has a second base partial ellipsoid having a surface defined by points on base longitudinal stiffener, hinge receiving rib, base bumpers, hinge pin covers, and/or u-bolt receiving rib that correspond to the semi-principal axes A2, B2, and C2, a second elliptical yz-plane surface, and a second elliptical xz-plane that corresponds to at least one point on the surface of base longitudinal stiffener along with the corresponding cartesian coordinate system with its origin at the casing center, and A2 is substantially the distance from a second elliptical yz-plane surface substantially passing through a centerline of the hinge rod to the highest point on the base longitudinal stiffener, B2 is substantially one-half of the distance between the outermost points of the hinge receiving rib and the u-bolt receiving rib, and C2 is preferably selected by locating second elliptical yz-plane surface between the outermost point on the hinge receivers in the hinge pin covers and base bumpers where the hinge pin covers and base bumpers are capable of cooperating with other elements for bi-directionally guiding and where the hinge pin covers and base bumpers are substantially within second base ellipsoid.

9. The cable guard as claimed in claim 6, where the cable guard is mounted on a tubing string in a casing having a casing center wherein:
the base has the first base partial ellipsoid and the ring has a ring partial ellipsoid having a surface defined by points on the central ring connecting rib, radial stiffener, hinge receiving rib, ring bumpers, hinge pin covers, and u-bolt receiving rib that corresponds to the semi-principal axes A3, B3, and C3, a third elliptical yz-plane surface, and a ring elliptical xz-plane and center at the casing center where, A3 is substantially one-half of the distance from second elliptical yz-plane surface substantially passing through a centerline of hinge rod to the highest point on central ring connecting rib, B3 is substantially one-half of the distance between the outermost points on hinge receiving rib and u-bolt receiving rib, and C3 is preferably selected by locating third elliptical yz-plane surface on or touching the outermost points of hinge pin covers, base bumpers, and/or ring bumpers for bi-directionally guiding, and hinge pin covers, base bumpers, and ring bumpers do not extend across the boundary of third elliptical yz-plane surface.

10. The cable guard as claimed in claim 6 where the cable guard is mounted on a tubing string in a casing having a casing center wherein:
a fourth ellipsoid for bi-directionally guiding is defined by the semi-principal axes, A4, B4, and C4 along with the corresponding cartesian coordinate system with its origin at the casing center, where A4 is substantially equal to B4 or substantially one-half of the distance between the outermost points on hinge receiving rib and u-bolt receiving rib, and C4 is preferably selected by locating third elliptical yz-plane surface on the outermost points of hinge pin covers, base bumpers, and/or ring bumpers; and, the hinge pin covers, base bumpers, and ring bumpers do not extend across the boundary of the second ring elliptical xz-plane and the third elliptical yz-plane surface.

11. The cable guard as claimed in claim 10, wherein:
the primary channels and include a cable biasing slope substantially opposite the base end faces and extending across and outwardly from primary channels for biasing at least one cable against the tubes and coupling and creating a curvature in at least one cable.

12. The cable guard as claimed in claim 10 wherein:
the central rib has an adjustment pad extending downward from the central rib for biasing at least one cable against the coupling.

13. The cable guard as claimed in claim 12 wherein:
the adjustment pad has at least one array of cable gripping teeth extending outward from the adjustment pad for biasing at least one cable against the coupling and gripping the cable.

14. The cable guard as claimed in claim 13 wherein:
the first base end has a third secondary channel and second base end includes a fourth secondary channel, the secondary channels, spaced apart from each other and extending substantially parallel to and at least partially along the primary channels for protecting at least one cable;
the central rib has a third channel extending substantially parallel to and at least partially along the central rib for protecting at least one cable; and the ring sections include a data channel extending across the ring inner surfaces for protecting a data cable.

15. The cable guard as claimed in claim 14 wherein:
the base is integrally formed of ductile iron and the ring is integrally formed of ductile iron.

16. The cable guard as claimed in claim 15 wherein:
the ductile iron has a minimum tensile strength of 60 kips per square inch; minimum yield strength of 40 kips per square inch; and minimum elongation percentage in two (2) inches of eighteen percent (18%).

17. The cable guard as claimed in claim 14 wherein:
the base is integrally formed of an acrylic-polycarbonate alloy and the ring is integrally formed of an acrylic-polycarbonate alloy.

18. The cable guard as claimed in claim 17 wherein:
the acrylic-polycarbonate alloy has a deflection temperature of about 253 degrees Fahrenheit and vicat softening point of about 306 degrees Fahrenheit.

19. A cable guard for mounting on at least a first tube and/or across a coupling in a tubing string and protecting at least a first cable, comprising:
a base, a ring, and a u-bolt;
the u-bolt, includes a first leg, and a second leg, the u-bolt legs, that are threaded to receive a first nut, and a second nut, the nuts;
the ring includes a first ring section and a second ring section, the ring sections, and a u-bolt receiving rib, a central ring connecting rib, and a hinge rod for connecting the ring sections;
the base includes a first base end and a second base end, the base ends, and a hinge receiving rib, a central rib, and a connecting rib for connecting the base ends;
the central rib is between the hinge receiving rib and the connecting rib and extends substantially perpendicular to and between the base ends;
the first base end has a first base end inner surface and the second base end has a second base end inner surface, the base inner surfaces, and first base end has a first base end outer surface and second base end has a second base end outer surface, the outer surfaces, extending outward from the base inner surfaces;
the first base end has a first base end primary cable protecting channel and the second base end has a second base end primary cable protecting channel, the primary channels, substantially centered in and extending through the base ends toward each other for protecting at least one cable;
the first ring section includes a first ring inner surface and the second ring section includes a second ring inner surface, the ring inner surfaces, the base inner surfaces and the ring inner surfaces are adapted for partially mating and frictionally engaging a portion of at least one tube and resisting longitudinal and/or rotational movement when the cable guard is mounted;
the first base end has a first base end face and a first base end taper and second base end has a second base end face and a second base taper, the base end tapers and the base end faces, respectively, for bi-directionally guiding;
the base end tapers extend substantially around the base ends opposite the central rib and the base end faces are substantially centered in the base ends opposite the central rib and extend downward from the outer surfaces to the central portion of base end tapers;
the first base end has a first base bumper and the second base end has a second base bumper, the base bumpers, extending from the tapers angularly away from the base ends for shielding the u-bolt and bi-directionally guiding;
the first ring section includes a first u-bolt slot and second ring section includes a second u-bolt slot, the ring u-bolt slots, each substantially centered and extending inwardly in the ring sections adjacent to the bumpers for rotating the u-bolt legs through the ring sections;
the first ring section has a first ring section u-bolt receiver and second ring section has a second base end u-bolt receiver, the ring u-bolt receivers, each extending substantially perpendicularly away from the ring sections and adjacent to the ring u-bolt slots and each having an arcuate shape extending substantially coaxially from the ring u-bolt slots along the ring sections toward each other for receiving and rotatably and removably connecting the u-bolt;
the first base end also includes a first hinge pin cover and second base end includes a second hinge pin cover, the hinge pin covers, each substantially opposite the bumpers and extending from the tapers angularly away from the base ends for stiffening the base ends and shielding the rotatably and removable connection of the base and the ring;
the first base end has a first abutment receiver and the second base end has a second abutment receiver, the abutment receivers, each substantially opposite the u-bolt receivers and extending inwardly in the base ends adjacent to the base bumpers for aligning and restraining the rotable and removable connection of the base and the ring;
the first base end has a first base end hinge pin receiver and second base end has a second base end hinge pin receiver, the hinge pin receivers, extending substantially perpendicularly away from the base ends and along the base ends on each side of the abutment receivers each having an arcuate shape extending substantially coaxially from the hinge pin covers toward each other for rotatably and removably connecting the base and the ring;
the u-bolt receiving rib extends between the ring u-bolt receivers and the hinge receiving rib extends between the hinge receivers;
the first base end has a pair of first lightering channels and second base end has a pair of second lightering channels, the lightering channels, substantially centered in the base ends and extending substantially opposite each other from the abutment receivers and the u-bolt receivers for reducing weight, stiffening the base ends, aligning the base and the ring for assembly and protecting the rotatable and removable connections of the base and the ring and the u-bolt;
the hinge receiving rib includes a hinge rod engaging projection substantially centrally positioned between the base ends adapted for receiving and removably engaging the hinge rod;
the hinge rod engaging projection includes a rod face for frictionally engaging, deflecting, and receiving the hinge rod, into the hinge rod engaging projection;

the u-bolt receiving rib includes a u-bolt engaging projection substantially centrally positioned between the ring sections adapted for receiving and removably engaging the u-bolt;

the u-bolt engaging projection includes a u-bolt face for frictionally engaging, deflecting, and receiving the u-bolt into the u-bolt engaging projection;

the hinge rod further comprises a first hinge rod abutment and a second hinge rod abutment, the abutments, substantially centrally aligned with and extending from the ring sections, for aligning the base and the ring for assembly, being received into the abutment receivers, and restraining displacement of the base, relative to the ring, a first hinge pin, and a second hinge pin, the hinge pins, extending substantially coaxially from each side of the abutments for being received into the hinge receivers and removably and rotably connecting the base to the ring;

the first base end includes a first ring u-bolt leg receiver and second base end includes a second ring u-bolt leg receiver, the u-bolt leg receivers, each substantially opposite the abutments receivers and extending inwardly in the base ends adjacent to the connecting rib for cooperating with the ring u-bolt slots and receiving the u-bolt legs;

the connecting rib extends along the base ends substantially between the u-bolt leg receivers;

the first ring section includes a first ring bumper and the second ring section includes a second ring bumper, the ring bumpers, each extending angularly from the ring sections adjacent to the u-bolt leg receivers for protecting the u-bolt legs and bi-directionally guiding; and the first abutment includes a first ring section rotational stop and the second abutment includes a second ring section rotational stop, the ring rotational stops, each substantially centered in and extending from the abutments for contacting outer surfaces 66' and 68', defining an opening angle α', preventing over rotation and uncontrollable detachment of the base and the ring;

the first ring section has a first ring section face and second base end has a second ring section face, the ring section faces, each substantially centered in the ring sections extending substantially around a distal end of the ring sections and downward toward the ring inner surfaces;

whereby the cable guard is assembled, at least one cable is enclosed, and the cable guard is mounted, and the u-bolt is tensioned by tightening the nuts, and the tension frictionally engages the base inner surfaces and the ring inner surfaces to at least one tube.

20. The cable guard as claimed in claim 19, wherein:
the first base end has a pair of first base end slots and second base end has a pair of second base end slots, the base end slots, spaced apart and substantially centered in the base ends, extending substantially between the base end faces and the central rib;

the central rib has a plurality of central rib slots spaced apart and extending along the central rib; and the central rib has a pair of crushing resistors substantially opposite each other, substantially centered between the base ends, and extending substantially perpendicularly downward from the central rib and/or toward the tubes and/or coupling, and a distal end of each of the pair of crushing resistors has a bearing face adapted for matingly contacting the outside surface of at least one tube and/or the coupling.

21. The cable guard as claimed in claim 20, wherein:
the first ring bumper has a first ring u-bolt rotational stop and second ring bumper has a second ring u-bolt rotational stop, the ring u-bolt rotational stops, extending from ring bumpers toward each other partially across the ring u-bolt slots for limiting rotational and longitudinal displacement of the u-bolt and preventing over rotation and uncontrollable detachment of the u-bolt.

22. The cable guard as claimed in claim 21 wherein:
the first base end inner surface has at least one array of first base compressible non-slip teeth and the second base end inner surface has at least one array of second base compressible non-slip teeth, the base compressible non-slip teeth;

the first ring inner surface has at least one array of first ring compressible non-slip teeth and the second ring inner surface has at least one array of second ring compressible non-slip teeth, the ring compressible non-slip teeth; and each of the base compressible non-slip teeth and the ring compressible non-slip teeth extend from and above the base inner surfaces and the ring inner surfaces, respectively, and are adapted for partially mating with a portion of at least one tube, the tubing string, and/or across the coupling, if any, for compressingly engaging at least one tube and/or the tubing string, resisting longitudinal and rotational movement, and preventing damage to the cable.

23. The cable guard as claimed in claim 22 wherein:
the ring sections have a closing gap that extends from the abutments and longitudinally across the ring inner surfaces and away from the abutments for rotating the ring in a mounted cable guard around at least one tube.

24. The cable guard as claimed in claim 23 wherein:
the first base end has a first pair of tearing resistors and the second base end has a second pair of tearing resistors, the base tearing resistors, extending outward from the hinge receivers, substantially adjacent to each side of the abutment receivers, and along the respective base inner surfaces;

the first ring section includes a first ring tearing resistor and second ring section includes a second ring tearing resistor, the ring tearing resistors, extending outward from the ring u-bolt receivers;

the first base end includes a first receptacle and second base end includes a second receptacle, the receptacles, each substantially aligned with the ring tearing resistors for mating with and receiving the ring tearing resistors; and the hinge receiving rib has a first hinge support and a second hinge support, the hinge supports, extending from the hinge receivers along the hinge receiving rib toward each other, and the u-bolt receiving rib has a first u-bolt support and a second u-bolt support, the u-bolt supports, extending from the ring u-bolt receivers along the u-bolt receiving rib toward each other for stiffening the hinge receiving rib and the u-bolt receiving rib, providing support for resisting bending of the hinge rod and the u-bolt and resisting uncontrollable detachment.

25. The cable guard as claimed in claim 24 wherein:
the central rib has a third channel extending substantially parallel to and at least partially along the central rib for protecting at least one cable; and
the ring sections include a data channel extending across the ring inner surfaces for protecting a data cable.

26. The cable guard as claimed in claim 23 wherein:
the central rib has an adjustment pad extending inwardly from the central rib for biasing at least one cable against the coupling.

27. The cable guard as claimed in claim 23 wherein:
the adjustment pad has at least one array of cable gripping teeth extending inwardly from adjustment pad for biasing at least one cable against the coupling and gripping the cable.

28. The cable guard as claimed in claim 27 wherein:
the base is integrally formed of ductile iron and the ring is integrally formed of ductile iron.

29. The cable guard as claimed in claim 28 wherein:
the ductile iron has a minimum tensile strength of 60 kips per square inch; minimum yield strength of 40 kips per square inch; and minimum elongation percentage in two (2) inches of eighteen percent (18%).

30. The cable guard as claimed in claim 27 wherein:
the base is integrally formed of an acrylic-polycarbonate alloy and the ring is integrally formed of an acrylic-polycarbonate alloy.

31. The cable guard as claimed in claim 30 wherein:
the acrylic-polycarbonate alloy has a deflection temperature of about degrees Fahrenheit and vicat softening point of about degrees Fahrenheit.

32. A cable guard for mounting on at least a first tube and/or across a coupling in a tubing string and protecting at least a first cable, comprising:
a base, a ring, and a u-bolt;
the u-bolt includes a first leg and a second leg, the u-bolt legs, that are threaded to receive a first nut and a second nut, the nuts;
the ring includes a first ring section and a second ring section, the ring sections, and a connecting rib, a central ring connecting rib, and a hinge rod for connecting the ring sections;
the central ring connecting rib is between the connecting rib and the hinge rod and extends outwardly from and partially across the ring sections for stiffening the ring sections and bi-directionally guiding;
the base includes a first base end and a second base end, the base ends, and a hinge receiving rib, a central rib, and a u-bolt receiving rib for connecting the base ends;
the central rib is between the hinge receiving rib and the u-bolt receiving rib and extends between base ends;
the first base end has a first base end inner surface and the second base end has a second base end inner surface, the base inner surfaces, and the first base end has a first base end outer surface and the second base end has a second base end outer surface, the outer surfaces, extending outward from base inner surfaces;
the first base end has a first base end primary cable protecting channel and second base end has a second base end primary cable protecting channel, the primary channels, substantially centered in and extending through base ends and toward each other for protecting at least one cable;
the first ring section includes a first ring inner surface and the second ring section includes a second ring inner surface, the ring inner surfaces, the base inner surfaces and the ring inner surfaces are adapted for partially mating and frictionally engaging a portion of at least one tube and resisting longitudinal and/or rotational movement when the cable guard is mounted;
the first base end has a first base end face and a first base end taper and second base end has a second base end face and a second base taper, the base end tapers and the base end faces, respectively, for bi-directionally guiding;
the base end tapers extend substantially around the base ends opposite the central rib, the base end faces and are substantially centered in the base ends and opposite the central rib and extend downward from the outer surfaces and to a central portion of base end tapers;
the first base end has a first base bumper and the second base end has a second base bumper, the base bumpers, extending from the tapers and angularly away from the base ends, respectively, for shielding the u-bolt and bi-directionally guiding;
the first base end includes a first u-bolt slot and second base end includes a second u-bolt slot, the u-bolt slots, each substantially centered and extending inwardly in the base ends and adjacent to the bumpers for rotating the u-bolt legs and through the base ends;
the first base end has a first base end u-bolt receiver and second base end has a second base end u-bolt receiver, the u-bolt receivers, each extending substantially perpendicularly away from the base ends and adjacent to the u-bolt slots and each having an arcuate shape extending substantially coaxially from the u-bolt slots and along the base ends and toward each other for receiving and rotatably and removably connecting the u-bolt;
the first base end also includes a first hinge pin cover and second base end includes a second hinge pin cover, the hinge pin covers, each substantially opposite the bumpers and extending from the tapers and angularly away from the base ends for stiffening the base ends and shielding the rotatably and removable connection of the base and the ring;
the first base end includes a first abutment receiver and the second base end includes a second abutment receiver, the abutment receivers, each substantially opposite the u-bolt slots and extending inwardly in the base ends and adjacent to the hinge pin covers for aligning and restraining the rotable and removable connection of base and ring;
the first base end has a first base end hinge pin receiver and second base end has a second base end hinge pin receiver, the hinge pin receivers, extending substantially perpendicularly away from the base ends and along the base ends and on each side of the abutment receivers each having an arcuate shape extending substantially coaxially from the hinge pin covers and toward each other for rotatably and removably connecting base and ring;

the u-bolt receiving rib extends between the u-bolt receivers and the hinge receiving rib extends between the hinge receivers;

the base has a base longitudinal stiffener extending outwardly from the base substantially between the base end faces and a plurality of base cross-sectional stiffeners, the base longitudinal stiffener is substantially centered in the base ends and the central rib and the plurality of base cross-sectional stiffeners are spaced apart extending outwardly from the base substantially perpendicular to the base longitudinal stiffener for stiffening the base ends and the central rib;

the first base end has a pair of first lightering channels and second base end has a pair of second lightering channels, the lightering channels, each substantially centered in the base ends and extending substantially opposite each other from the abutment receivers and the u-bolt slots for reducing weight, stiffening the base ends, aligning the base and the ring for assembly, and protecting the rotatable and removable connections of the base and the ring and the u-bolt;

the hinge receiving rib includes a hinge rod engaging projection substantially centrally positioned between the base ends and adapted for receiving and removably engaging the hinge rod;

the hinge rod engaging projection includes a rod face for frictionally engaging, deflecting, and receiving the hinge rod into the hinge rod engaging projection;

the u-bolt receiving rib includes a u-bolt engaging projection substantially centrally positioned between the base ends and adapted for receiving and removably engaging the u-bolt;

the u-bolt engaging projection includes a u-bolt face for frictionally engaging, deflecting, and receiving the u-bolt into the u-bolt engaging projection;

the hinge rod further comprises a first hinge rod abutment and a second hinge rod abutment, the abutments, substantially centrally aligned with and extending from the ring sections for aligning the base and the ring for assembly, being received into the abutment receivers, and restraining displacement of the base relative to the ring, a first hinge pin and a second hinge pin, the hinge pins, extending substantially coaxially from each side of the abutments for being received into the hinge receivers and removably and rotably connecting the base to the ring, and a pair of tapers extending substantially coaxially from the hinge pins for transitioning to a smaller diameter in a central portion of hinge rod;

the first ring section includes a first ring u-bolt receiver and second ring section includes a second ring u-bolt leg receiver, the u-bolt leg receivers, each substantially opposite the abutments and extending inwardly in the ring sections and adjacent to the connecting rib for cooperating with the u-bolt slots and receiving the u-bolt legs;

the connecting rib extends along the base ends and substantially between the u-bolt leg receivers;

first ring section also includes a first ring bumper and second ring section includes a second ring bumper, the ring bumpers, each extending angularly from the ring sections and adjacent to the u-bolt leg receivers for protecting the u-bolt legs and bi-directionally guiding;

the ring sections have a radial stiffener extending outwardly and substantially between the abutments and the u-bolt leg receivers and a pair of ring section cross-sectional stiffeners extending outwardly and substantially perpendicular to and on each side of the radial stiffener and substantially equally spaced apart on each side of the central ring connecting rib for stiffening the ring sections and bi-directionally guiding;

the first abutment includes a first ring section rotational stop and the second abutment includes a second ring section rotational stop, the ring rotational stops, each substantially centered in and extending from the abutments for preventing over rotation and uncontrollable detachment of the base and the ring; and the first lightering channel has a first step and second lightering channel has a second step, the steps, extending from the abutment receivers along the lightering channels for contacting the ring rotational stops and defining an opening angle $\alpha$;

the first ring section has a first ring section face and second ring section has a second ring section face, the ring section faces, each substantially centered in the ring sections, extending around the ring sections substantially between the pair of cross-sectional stiffeners and substantially from the central connecting rib and the pair of cross-sectional stiffeners downward toward the ring inner surfaces;

the first base end has a pair of first base end slots and second base end has a pair of second base end slots, the base end slots, on each side of the base longitudinal stiffener;

the central rib has a plurality of central rib slots on each side of the base longitudinal stiffener extending substantially between the cross-sectional stiffeners;

the central rib has a pair of crushing resistors substantially opposite each other, substantially centered between the base ends, and extending substantially perpendicularly downward from the central rib and/or toward the tubes and/or coupling, and a distal end of each of the pair of crushing resistors has a bearing face adapted for matingly contacting the outside surface of at least one tube, the tubing string, and/or the coupling;

first base bumper has a first u-bolt rotational stop and second base bumper has a second u-bolt rotational stop, the u-bolt rotational stops, extending from the bumpers and toward each other partially across the u-bolt slots for limiting rotational and longitudinal displacement of the u-bolt and preventing over rotation and uncontrollable detachment of the u-bolt;

the first base end inner surface has at least one array of first base compressible non-slip teeth and the second base end inner surface has at least one array of second base compressible non-slip teeth, the base compressible non-slip teeth;

the first ring inner surface has at least one array of first ring compressible non-slip teeth and the second ring inner surface has at least one array of second ring compressible non-slip teeth, the ring compressible non-slip teeth; and each of the base compressible non-slip teeth and the ring compressible non-slip teeth and extend from and above the base inner surfaces and the ring inner surfaces, respectively, and are adapted for partially mating with a portion of at least one tube, the tubing string, and/or across the coupling, if any, for compressingly engaging at least one tube and/or the tubing string, resisting longitudinal and rotational movement, and preventing damage to the cable;

the first base end has a first pair of tearing resistors and the second base end has a second pair of tearing resistors, the base tearing resistors, extending outward from the hinge receivers and substantially adjacent to each side of the abutment receivers and along the respective base inner surfaces;

the base ends and has a third base tearing resistor extending from each of the u-bolt receivers and adjacent to the u-bolt slots and along each of respective base inner surfaces; and the hinge receiving rib has a first hinge support and a second hinge support, the hinge supports, extending from the hinge receivers and along the hinge receiving rib toward each other, and the u-bolt receiving rib has a first u-bolt support and a second u-bolt support, the u-bolt supports, extending from the u-bolt receivers and along the u-bolt receiving rib toward each other for stiffening the hinge receiving rib and the u-bolt receiving rib, providing support for resisting bending of the hinge rod and the u-bolt and resisting uncontrollable detachment;

whereby the cable guard is assembled, at least one cable is enclosed, and the cable guard is mounted, and the u-bolt is tensioned by tightening the nuts and the tension frictionally engages base inner surfaces and ring inner surfaces and to the first tube and the second tube and/or across a coupling in a tubing string.

33. The cable guard as claimed in claim 32 where the cable guard is mounted on a tubing string in a casing having a casing center wherein:

a fourth ellipsoid for bi-directionally guiding is defined by the semi-principal axes, A4, B4, and C4 along with the corresponding cartesian coordinate system with its origin at the casing center, where A4 is substantially equal to B4 or substantially one-half of the distance between the outermost points on hinge receiving rib and u-bolt receiving rib, and C4 is preferably selected by locating third elliptical yz-plane surface on the outermost points of hinge pin covers, base bumpers, and/or ring bumpers; and, the hinge pin covers, base bumpers, and ring bumpers do not extend across the boundary of the second ring elliptical xz-plane and the third elliptical yz-plane surface.

34. The cable guard as claimed in claim 33 wherein:
the base is integrally formed of ductile iron and the ring is integrally formed of ductile iron.

35. The cable guard as claimed in claim 34 wherein:
the ductile iron has a minimum tensile strength of 60 kips per square inch; minimum yield strength of 40 kips per square inch; and minimum elongation percentage in two (2) inches of eighteen percent (18%).

* * * * *